(12) United States Patent
Singh et al.

(10) Patent No.: US 7,499,874 B2
(45) Date of Patent: Mar. 3, 2009

(54) AUTOMATIC FLIGHT MANAGEMENT IN AN ONLINE MARKETPLACE

(75) Inventors: Narinder Pal Singh, Half Moon Bay, CA (US); Darren J. Davis, Rowland Heights, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/318,243

(22) Filed: Dec. 23, 2005

(65) Prior Publication Data

US 2006/0190328 A1 Aug. 24, 2006

Related U.S. Application Data

(63) Continuation of application No. 10/072,220, filed on Feb. 8, 2002, now Pat. No. 7,231,358, which is a continuation-in-part of application No. 09/918,241, filed on Jul. 30, 2001, now Pat. No. 6,983,272, which is a continuation of application No. 09/322,677, filed on May 28, 1999, now Pat. No. 6,269,361.

(51) Int. Cl.
G06Q 30/00 (2006.01)
G07G 1/14 (2006.01)
(52) U.S. Cl. ....................................................... 705/14
(58) Field of Classification Search ................... 705/14
See application file for complete search history.

(56) References Cited

U.S. PATENT DOCUMENTS

| | | | |
|---|---|---|---|
| 3,581,072 A | 5/1971 | Nymeyer | |
| 4,789,928 A | 12/1988 | Fujisaki | |
| 5,659,732 A | 8/1997 | Kirsch | |
| 5,704,560 A | 1/1998 | Wimmer | |
| 5,717,923 A | 2/1998 | Dedrick | |
| 5,724,424 A | 3/1998 | Gifford | |
| 5,724,521 A | 3/1998 | Dedrick | |
| 5,724,524 A | 3/1998 | Hunt et al. | |
| 5,748,954 A | 5/1998 | Mauldin | |
| 5,752,238 A | 5/1998 | Dedrick | |
| 5,768,521 A | 6/1998 | Dedrick | |
| 5,778,367 A | 7/1998 | Wesinger, Jr. et al. | |
| 5,794,210 A | 8/1998 | Goldhaber et al. | |

(Continued)

FOREIGN PATENT DOCUMENTS

EP 1282051 2/2003

(Continued)

OTHER PUBLICATIONS

Archive.org search results for Managebid.com (http://web.archive.org/web/*/http://managebid.com) Jan. 1, 2007.*

(Continued)

*Primary Examiner*—Arthur Duran
(74) *Attorney, Agent, or Firm*—Brinks Hofer Gilson & Lione

(57) ABSTRACT

A database search system includes a database of search terms, each search term associated with a bid amount payable by an advertiser of a plurality of advertisers and a search engine responsive to search queries from searchers for searching the database. A flight management agent is responsive to advertiser-specified parameters for adjusting bid amounts of search listings to manage expenditures over a time interval.

10 Claims, 32 Drawing Sheets

U.S. PATENT DOCUMENTS

| | | | |
|---|---|---|---|
| 5,826,241 A | 10/1998 | Stein et al. | |
| 5,835,896 A | 11/1998 | Fisher et al. | |
| 5,848,396 A * | 12/1998 | Gerace | 705/10 |
| 5,848,397 A | 12/1998 | Marsh et al. | |
| 5,848,407 A | 12/1998 | Ishikawa et al. | |
| 5,852,820 A | 12/1998 | Burrows | |
| 5,855,008 A | 12/1998 | Goldhaber et al. | |
| 5,862,223 A | 1/1999 | Walker et al. | |
| 5,864,845 A | 1/1999 | Voorhees et al. | |
| 5,864,846 A | 1/1999 | Voorhees et al. | |
| 5,903,882 A | 5/1999 | Asay et al. | |
| 5,918,014 A | 6/1999 | Robinson | |
| 5,920,854 A | 7/1999 | Kirsch et al. | |
| 5,920,859 A | 7/1999 | Li | |
| 5,948,061 A * | 9/1999 | Merriman et al. | 709/219 |
| 6,044,363 A | 3/2000 | Mori et al. | |
| 6,061,659 A | 5/2000 | Murray | |
| 6,078,866 A | 6/2000 | Buck et al. | |
| 6,205,432 B1 | 3/2001 | Gabbard et al. | |
| 6,243,104 B1 | 6/2001 | Murray | |
| 6,249,773 B1 | 6/2001 | Allard et al. | |
| 6,253,188 B1 | 6/2001 | Witek et al. | |
| 6,269,361 B1 | 7/2001 | Davis et al. | |
| 6,285,987 B1 | 9/2001 | Roth et al. | |
| 6,296,361 B1 | 10/2001 | Shirasaki et al. | |
| 6,324,519 B1 | 11/2001 | Eldering | |
| 6,379,251 B1 | 4/2002 | Auxier et al. | |
| 6,385,611 B1 | 5/2002 | Cardona | |
| 6,421,675 B1 | 7/2002 | Ryan et al. | |
| 6,535,888 B1 | 3/2003 | Vijayan et al. | |
| 6,640,218 B1 * | 10/2003 | Golding et al. | 707/2 |
| 6,763,334 B1 | 7/2004 | Matsumoto et al. | |
| 6,983,272 B2 | 1/2006 | Davis et al. | |
| 2001/0051940 A1 * | 12/2001 | Soulanille | 707/3 |
| 2002/0004735 A1 | 1/2002 | Gross | |
| 2002/0099600 A1 * | 7/2002 | Merriman et al. | 705/14 |
| 2002/0107735 A1 * | 8/2002 | Henkin et al. | 705/14 |
| 2002/0133397 A1 * | 9/2002 | Wilkins | 705/14 |
| 2002/0165849 A1 * | 11/2002 | Singh et al. | 707/1 |
| 2003/0014326 A1 * | 1/2003 | Ben-Meir et al. | 705/26 |
| 2003/0033292 A1 * | 2/2003 | Meisel et al. | 707/3 |
| 2003/0105677 A1 * | 6/2003 | Skinner | 705/26 |
| 2003/0149622 A1 | 8/2003 | Singh et al. | |
| 2003/0149937 A1 * | 8/2003 | McElfresh et al. | 715/517 |

FOREIGN PATENT DOCUMENTS

| | | |
|---|---|---|
| JP | 11316764 A | 11/1999 |
| WO | WO 97/22066 | 6/1997 |
| WO | WO 99/20486 | 9/1999 |
| WO | WO 99/48028 | 9/1999 |
| WO | WO 00/16218 | 3/2000 |
| WO | WO 00/41090 | 7/2000 |

OTHER PUBLICATIONS

ManageBid.com (http://web.archive.org/web/20011205072600/managebid.com/faq_steps.html) Dec. 5, 2001 (Examiner Figure 1).*
ManageBid.com (http://web.archive.org/web/20011205071946/managebid.com/faq_roi.html) Dec. 5, 2001 (Examiner Figure 2).*
PositionGuardian.com (http://web.archive.org/web/20010202131200/http://positionguardian.com) Feb. 2, 2001 (Examiner Figure 3).*
ClickPatrol.com (http://web.archive.org/web/20011006003323/clickpatrol.com/roi.php?token=,.0) Oct. 6, 2001 (Examiner Figure 4).*
"1st Tool for Pay-for-Ranking Search Bid Management", Aug. 1, 2001, (http://groups.google.com/group/comp.internet.net-happenings/browse_thread/thread/541ace0227ad79fa/4fa25d76f5eb015b?lnk=gst&q=managebid&rnum=1&hl=en#4fa25d76f5eb015b).*
"PPC Bid Management Software Showdown", Jan. 17, 2002, (http://www.high-search-engine-ranking.com/PPC_Bid_Management_Software_Showdown.htm).*
"Web Secrets" "Are you maximizing your pay-per-click returns?", Nov. 6, 2001, (http://websitesecretes.com/newsletters/wss-25.htm).*
Archive.org search results for Managebid.com (http://web.archive.org/web/*/http://managebid.com) Jan. 1, 2007.*
ManageBid.com (http://web/20011205072600/managebid.com/faq_steps.html) Dec. 5, 2001 (Examiner Figure. 1).*
ManageBid.com (http://web.archive.org/web/20011205071946/managebid.com/faq_roi.html) Dec. 5, 2001 (Examiner Figure 2).*
PositionGuardian.com (http://web.archive.org/web/20010202131200/http://positionguardian.com) Feb. 2, 2001 (Examiner Figure 3).*
ClickPatrol.com (http://web.archive.org/web/20011006003323/clickpatrol.com/roi.php?token=,.0) Oct. 6, 2001 (Examiner Figure 4).*
Archive.org, Managebid, 2001, Don't Waste Your Money, http://web.archive.org/web/20020120002225/http://managebid.com.*
Archive.org, Managebid, 2001, Example, http://web.archive.org/web/20020603010733/managebid.com/faq_managebid.html.*
Archive.org, Managebid, 2001, Services Comparison, http://web.archive.org/web/20020306050357/managebid.com/services/comparison.html.*
Press Releases 1999, eBay (printed from http://www.eBay.com).
From http://www.findarticles.com, Boot camp Internet (eBay), New Statesman (1996); Jan. 17, 2000.
From http://www.findarticles, eBay great collections hosts auctions of 36 Millennium dresses by world's top fashion designers, PR Newswire, Nov. 24, 1999.
From http://www.findarticles.com, Action Begins Today on eBay . . . , Business Wire, Nov. 1, 2000.
Rich, "New search engine allows sites to pay their way to top", MediaWeek, vol. 8, issue 8, p. 28, Feb. 1998.
Database of Corporate ResourceNet, "New Service puts ad auction, search engine under one roof", Electronic Advertising & Marketplace Report, vol. 12, issue 8, p. 6, Apr. 1998.
Espe, "Online search engines start to charge for listings", Washington Business Journal, vol. 18, issue 1, p. 31, May 1999.
Dawson et al., "2 search sites narrow their parameters", Adweek-Western edition, vol. 48 issue 42, p. 5, Oct. 1998.
Database of Corporate ResourceNet, "Bits", from Adweek-Eastern edition, vol. 40, issue 14, p. 46, Apr. 1999.
Komando, "Searching for search engine—from Dogpile to Deja News", Business First-Columbus, vol. 14, issue 43, p. 46, Jun. 1998.
Database of Corporate ResourceNet, "New services aim to boost efficiency of search engines", Electronic Advertising & Marketplace Report, vol. 12 issue 13, p. 6, Jul. 1998.
Database of Corporate ResourceNet "Goto.com choose Quest's SharePlex(R) for Oracle software to ensure uptime for business-critical Web site", PR Newswire, Jun. 2000.
Database of Corporate ResourceNet, "Capitalist tool", Time Canada, vol. 151 issue 8, p. 41, Mar. 1998.
Database of DialogClassic(tm), "Homestead Technologies' Continued Success Draws $17.5 Million In Second Round of Venture Funding", PR Newswire, Apr. 1999.
Tom Dahm (Chief Operations Officer, NetMechanic, Inc.), Advertising Tip: Get Your Banners on the Cheap, (including articles—12-pages-before May, 1999).
Unknown, ValueClick network unveils dynamic targeting solution, PR Newswire, Feb. 22, 1999 (from Dialog file 20, acc. No. 04408702).
From http://www.newsbytes.com, ValueClick expands Internet ad network to Japan, Mar. 25, 1998.
Supplementary Search Report for corresponding European Patent Application No. EP 00 936393, dated Feb. 20, 2004, 3 pages.
Brin, Sergey et al., "The Anatomy of a Large Scale Hypertextual Web Search Engine", Computer Networks and ISDN Systems, North Holland Publishing, Amsterdam, NL, dated Apr. 14, 1998, pp. 1-20.
Doran, G. David, "Pay to Play", Entepreneur, Jul. 1998, p. 18.

Kramer, Ralf et al., "Thesaurus federations: loosely integrated thesauri for document retrieval in networks based on Internet technologies", Int. J. Digit Libr, 1997, pp. 122-131.

Sullivan, Danny, "GoTo Sells Positions," The Search Engine Report, dated Mar. 3, 1998, 4 pages.

"APS Search Tools-Patent search client strategy" by US Patent & Trademark Office, Sep. 1997.

"Frequently Asked Questions NT Image Search & Rerieval (IS&R)" by US Patent & Trademark Office, Dec. 1997.

"Chapter 1-Introduction to Dialog" by Dialog Information Service, Inc., pp. 1-1 to 1-14.

Automated Patent System (APS) Workstation Reference Manual by US Patent & Trademark Office, Jul. 1996.

Frentzen, "Help for getting the word out about Web sites (Site promotion toos)", from PC Week, v14, n46, p. 27(1). Nov. 1997.

Miller, "Improve your ranking (building Web sites to attract Web searches)", from Home Office Computing, v16, n1, p. 51(2), Jan. 1998.

Lash, "Open text updates tools", from CNET News,com(http://www.news.com/News/Item/0,4,6118,00.html) Dec. 1996.

Anguillar, "New ad model charges by the click", from http://www.news.com/News/Item/0,4,1199,00.html Apr. 1996.

Wingfield, "Another engine takes ads by the click", from http://www.news.com/News/Item/0,4,1387,00.html, May 1996.

Pelline, "New search engine goes commercial", by CNET News.com, Feb. 1998.

Wang, "Engines battle irrelevance of results—New search service hope to fill the void", by Internet World, Feb. 1998.

Vonder Haar, "Searching for the highest bidder" from Inter@ctive week, Feb. 1998.

Reidman, "Search engine startup to auction listings" from Interactive—advertising, Feb. 1998.

Rich, "New search engine allows sites to pay this way to top", from http://www.adweek.com/ig/ignews02.asp, Feb. 1998.

Mardesich, "Web site operators pay for top billing—search engine allows site sponsors to buy place on special list", from Knight Ridder Newspapers, Mar. 1998.

Hilty, "GoTo.Hell—What happens when an online search engine accepts cash from Web sites?" from http://www.ocweekly.com/ink/archives/97/27byte-3.11.98-1.html Mar. 1998.

Flynn, "With Goto.com's Search Engine, the highest bidder shall be ranked first", by the New York Times, Mar. 1998.

Clark, "Start-up plans Internet search service tying results to advertising spending" from the Wall Street Journal, Feb. 1998.

"Going, Going . . . "from A closer look of the Wall Street Journal—Marketplace, Apr. 1998.

"Coursey.com" David Coursey's insider report on Personal Computing, the Internet, and Communications, Mar. 1998.

Glaser, "Who will Goto.com", from OnlinePress.com, Feb. 1998.

Mardesic, "Search engine charges hit sites", from http://www.sjmercury.com/bussiness/center/goto022198.htm Feb. 1998.

"News about search engines", from http://searchenginewatch.com/ness.html, Feb. 1998.

Wang, "Engines battle irrelevance of results", from Internet World, Feb. 1998.

Swartz, "Browser only lists paying Web sites. Critics fear approach will squeeze out most small Internet players" from http://www.sfgate.com/cgi-bin/publish on San Francisco Chronicle, Feb. 1998.

McWilliams, "Search engine to sell top positions on results lists", http://www.pcworld.com/news/daily/data/0298/ . . . html, Feb. 1998.

"Search engine startup to aution listings" from http://www.adage.com/interactive/daily/index.html, Feb. 1998.

Alyson, "Searching the search engines" from Bacon's, May 1998.

Pelline, "Pay-for-placement gets another shot", from http://www.news.com/News/item/0,4,19307,00.html, Sep. 1997.

IBM Technical Disclosure Bulletin, Organizing a ranked list of search matches, Nov. 1994.

Jeffrey Brewer, ClikZ Today, Aug. 18, 1998, "Pay-For-Performance: Creating More And Better Value", obtained at the internet address http://www.clickz.com, Aug. 18, 1998.

Jesse Berst, ZDNet, Aug. 17, 1998, "Search Sites' Shocking Secret", obtained at the internet address http://www.zdnet.com/anchordesk/story/story.sub.—2432.html, Aug. 17, 1998.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

Advertising Age-Interactive Daily Homepage; obtained at the internet address http://www.adage.com/interactive/daily/index.html, Jun. 8, 1998.

Kim Komando, "With About 320 Million Sites, Search Engines Offer Some Help", copyright 1998, Los Angeles Times Syndication.

Margot Williams, "How To Ease Your Online Searches", Lansing State Journal, Jun. 1, 1998.

"Go To.com Gets Venture Funding", Internet World Magazine, Jun. 1, 1998.

Sasha Alyson, "Searching The Search Engines", Front Page, May 8, 1998.

Advertising Age-Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti . . . le/archive/1998/02/21/BU102470.DTL.

Nelson Wang, "Engines Battle Irrelevance of Results". obtained at the internet address http://www.internetworld.com/print/current/news/19980223-battle.html, Feb. 23, 1998.

Search Engine Watch, Feb. 21, 1998, "GoTo Sells Positions", obtained at the internet address http://www.searchenginewatch.com/news.html, Feb. 23, 1998.

Jodi Mardesich, Mecury News Staff Writer, Feb. 20, 1998, "Search Engine Charges Hit Sites", obtained at the internet address http://www.sjmercury.com/business/center/goto022198.htm, Feb. 23, 1998.

Ken Glaser, OnlinePress.com, "Who Will GoTo.com?", Feb. 20, 1998.

Jeff Pelline, Staff Writer, CNET News.com, Feb. 19, 1998, "Pay-For-Placement Gets Another Shot", obtained at the inernet address http://www.news.com/News/item/0,4,19307,00.hml, Feb. 20, 1998.

The Wall Street Journal, "Going, Going . . . ", Apr. 2, 1998, p. B1.

David Coursey, "Coursey.com", Mar. 18, 1998.

Don Clark, "Start-Up Plans Internet Search Service Tying Results To Advertising Spending", The Wall Street Journal, Feb. 20, 1998.

Laurie J. Flynn, "With GoTo.com's Search Engine, The Highest Bidder Shall Be Ranked First", The New York Times, Mar. 16, 1998, p. C1.

Wyn Hilty, OCWeekly byte marks, "GoTo.Hell", obtained at the internet address http://www.ocweekly.com/ink/archives/97/27byte-3.11.98-1.shtml., Mar. 13, 1998.

Jodi Mardesich, "Web Site Operators Pay For Top Billing", The News—Herald (Willoughby, OH), Mar. 2. 1998.

Laura Rich, Adweek Online IQ News Online, Feb. 23, 1998, "New Search Engine Allows Sites to Pay Their Way to Top", obtained at the internet address http://www.adweek.com/iq/iqnews02.asp, Feb. 23, 1998.

Patricia Riedman, "Search Engine Startup To Auction Listings", Advertising Age Magazine, Feb. 23, 1998, p. 34.

Steven Vonder Haar, ZDNet,com, Feb. 19, 1998, "Searching For The Highest Bidder", obtained at the internet address http://www.zdnet.com/intweek/daily/980219i.html, Feb. 23, 1998.

Nelson Wang, "Engines Battle Irrelevance of Results", Internet World, Feb. 10, 1998, p. 1.

Interactive Week Magazine, Garden City, NY, May 25, 1998.

Jeff Pelline, Staff Writer, CNET News.com, Feb. 18, 1998, "New Search Engine Goes Commercial", obtained at the internet address http://www.news.com/News/Item/0,4,19281,00.html, Feb. 20, 1998.

Nick Wingfield, Staff Writer, CNET News.com, Jun. 21, 1996, "Engine Sells Results, Draws Fire", obtained at the internet address http://www.news.com/News/Item/Textonly/0,25,1635,00.htmL, Jul. 29, 1999.

Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.

Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.

Alex Lash, Staff Writer, CNET News.com, Dec. 11, 1996, "Open Text Updates Tools", obtained at the internet address http://www.news.com/News/Item/0,4,6118,00.html, Jul. 29, 1999.

"About SearchUP, Inc.", Jul. 15, 1999, obtained at the internet address http://www.searchup.com/about.cfm.

"Testimonials"., Jul. 15, 1999, obtained at the internet address http://www.searchup.com/testimonials.cfm.

"Benefits", Jul. 15, 1999, obtained at the internet address http://www.searchup.com/benefits.cfm.

"Information", Jul. 15, 1999, obtained at the internet address http://www.searchup.com/information.cfm.

"Tips & Tricks", Jul. 15, 1999, obtained at the internet address http://www.searchup.com/tipsandtricks.cfm.

Correspondence from Bryan Buck, President of SearchUp.com, Jul. 7, 1999.

Saul Hansell "Alta Vista Invites Advertisers to Pay for Top Ranking", The New York Times, Apr. 15, 1999, p. C2.

Galore—Super Search Engine, May 21, 1999, obtained at the internet address http://www.galore.com/1/mainframe.shtml.

Hitsgalore.com Search Engine, May 21, 1999, obtained at the internet address http://www.hitsgalore.com.

I Seek It "The Next Generation Search Engine", May 21, 1999, obtained at the internet address http://www.iseekit.com.

Correspondence from Emilia F. Cannella to Robert Brahms, CEO of BeFirst Internet Corporation regarding findwhat.com, Jul. 20, 1999.

Correspondence from Emilia F. Cannella to Michael Melcher, MC Services regarding SearchUP.com, Jul. 1, 1999.

Correspondence from Emilia F. Cannella to Robert G. Schuler, Esq., Kegler, Brown, Hill & Ritter regarding iseekit.com, Jul. 1, 1999.

Correspondence from Emilia F. Cannella to Andrew Conru, Vote Publishing regarding galore.com, Jun. 30, 1999.

SearchUp.com—Internet Directory, Automated Bid Placement System, obtained at the internet address http://www.searchup.com/search.cfm, Aug. 25, 1999.

SearchUp: URL Position Manager, obtained at the internet address https://www.securearea.net/searchup/login.cfm, Aug. 25, 1999.

SearchUp: URL Position Manager, obtained at the internet address https://www.securearea.net/searchup/newaccount.cfm, Aug. 25, 1999.

SearchUp: URL Position Manager, obtained at the internet address http://www.securearea.net/getaccount/login.cfm, Aug. 25, 1999.

Correspondence from Emilia F. Cannella to Mr. D. Reed, Reports Galore, regarding hitsgalore.com, Jun. 30, 1999.

Miller, Karen L., "Improve Your Ranking", Home Office Computer, v16, n1, p. 51(2) Jan. 1998.

Frentzen, Jeff, "Help for Getting the Word Out About Web Sites", PC Week, v14, n46, p. 27(1), Nov. 3, 1997.

Article, Mar. 3, 1998 from "The Search Engine Report," http://www.searchenginewatch.com/sereport/9803-to-to-html, GoTo Sells Positions.

Article from CNET News, "Engine Sells Results, Draws Fire," http://www.nees.com/News?Item/0,4,1635,00.html, Jun. 21, 1996.

Press release on Lightweight Directory Access Protocol (LDAP), Netscape Comm. Corp., Mountain View, CA Apr. 196.

ClickMail Central Directory, circa Apr. 1996, at www.oneclick.com/server/.

GoTo.com, circa 1998, at www.goto.com.

Northern Light, circa 1997-98, at sirocco.northernlight.com.

Smith, Laura B.—Article—"Going . . . gone." PC Week, v13, n34, p. E1 (2), Aug. 26, 1996—<http://www.dialogclassic.com/DialogClassic/dialog>.

"GoTo.com Announces First Round of Financing, Totaling More Than $6 Million, Led by Draper Fisher Jurvetson", Business Wire, dated May 19, 1998, printed from the Internet at http://www.dialogclassic.com/main.vingw on Nov. 9, 2000, 2 pages.

Database of Corporate ResourceNet, "New Service Puts An Auction Search Engine Under One Roof", Electronic Advertising & Marketplace Report, vol. 12, Issue 8, Apr. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

"Frequently Asked Questions NT Image Search & Retrieval (IS &R)", by US Patent & Trademark Office, Dec. 1997.

Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.

Axel Ockenfels, The Timing of bids in Internet auctions: market design, bidder behavior, and artifical agents, AI Magaziner, Fall 2000.

Peter R. Wurman, Specifying rules for electronic auctions, AI Magaziner, Fall 2002 (from http://www.findarticles.com).

From http://www.findarticles.com, IDG's PC World shows how to win at online auctions, PR Newswire, Jun. 28, 1999.

Andrew Marlatt, One who stands against the deal, Internet World, Mar. 15, 1999 (from http://www.findarticles.com).

News of the Week articles, *Telephone*, May 1, 1995, pp. 8 and 10.

Nuts 'N Bolts articles, *Target Marketing*, Oct. 1997, 1 page.

DoubleClick TestIt!, obtained at the Internet address: http://web.archive.org/web/19980205034316/www.doubleclick.com/nf/adinfo/testiset.htm, dated Oct. 16, 2002, 4 pages.

DoubleClick Frequently Asked Questions, obtained at the Internet address: http://web.archive.org/web/19980205033925/www.doubleclick.com/nf/adinfo/facts.htm, dated Oct. 16, 2002, 5 pages.

Google Search, communication from Jeffrey Brewer at Jeffrey@goto.com, titled "Need reverse stemming software," dated May 27, 1998, obtained at the Internet address: http://groups.google.com/groups?selm=356CEE4A8DE882A8%40goto.com, on Dec. 19, 2002, 1 page.

Ketchpel, Steven P. et al, "U-PAI: A Universal Payment Application Interface," conference material article from the Second USENIX Workshop on Electronic Commerce Proceedings, Oakland, California, Nov. 18-21, 1996, 17 pages.

Schwartz, Randal L., "Click-Through Tracking in Perl," *Web Techniques*, dated May 1998, located at the Internet address: www.webtechniques.com, 3 pages.

Van Roeden, Adriaan, "Your Own Search Engine with SWISH, A Custom Search Facility for Your Web Site," *Web Techniques*, dated Nov. 1996, located at the Internet address: www.webtechniques.com, pp. 63-66.

Full Catalog—Categories Menu, Sun Microsystems Sun Solutions Catalog, obtained at the Internet address: http://web.archive.org/web/19981205110211/solutions.sun.com/catalogs/all/index.htm, printed on Dec. 19, 2002, 2 pages.

Help on Making Queries—Search by Company or Product, obtained at the Internet address: http://web.archive.org/web/19981203050002/solutions.sun.com/search-help.htm, printed on Dec. 19, 2002, 4 pages.

Online Updating, Sun Microsystems Sun Solutions Catalog obtained at the Internet address: http://web.archive.org/web/19990220190636/solutions.sun.com/editmodule/help.htm, printed on Dec. 19, 2002, 2 pages.

* cited by examiner

AUTOMATIC FLIGHT MANAGEMENT IN AN ONLINE MARKETPLACE

RELATED APPLICATIONS

The present patent application is a continuation of U.S. patent application Ser. No. 10/072,220, filed Feb. 8, 2002, now U.S. Pat. No. 7,231,358, which is a continuation in part of application Ser. No. 09/918,241 filed on Jul. 30, 2001, now U.S. Pat. No. 6,983,272, which is a continuation of application Ser. No. 09/322,677, filed May 28, 1999, now U.S. Pat. No. 6,269,361, all of which are hereby incorporated herein in their entirety by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The method described in the U.S. Pat. No. 6,269,361 can be burdensome to manage for an advertiser. In particular, advertisers want to maintain favorable positions in the search results (so as to obtain a high volume of qualified traffic) at a favorable price. The system described in U.S. Pat. No. 6,269,361 provides no ready means to do that. Advertisers can resort to frequent inspection of their ranking on search terms that are important to them, for example by performing a search on www.overture.com. When they observe a change as a consequence of competing advertisers' bidding activities, they can log in to the pay for placement website and change their bids manually in response. In the case where they have been outbid for a position they want to retain, they can increase their bid to retake the position if the required cost per click ("CPC"), which is equal to the amount of their bid, is one they are willing to pay. In the case where the bid of the listing ranked below theirs has decreased, some advertisers may wish to lower their bid to reduce the amount they pay while still maintaining their position in the results set.

There are many other tasks that a large advertiser, or an advertising agency acting on behalf of a large advertiser, must perform. Large advertisers usually manage advertising "flights." A flight is typically concerned with a business activity promoting a particular set of products over some specific time interval. A flight typically has a budget, flight duration, and business objective, e.g., signing up 10,000 new credit card customers.

Creating a flight typically involves choosing a media outlet (TV, radio, print, online, etc.), and signing a contract that specifies the campaign (e.g., number of TV spots, their length, time of airing, and the markets in which they will be broadcast), customer exposure (e.g., number of viewers reached), and the cost. For online cost per impression ("CPM") markets, this typically involves identifying the web pages on which the banner ads will run, their frequency, the expected number of impressions over the flight, and the CPM cost. Once the contract terms have been settled on, there is not much work that is required by an advertiser to manage a flight, other than getting periodic reports on customer exposure.

It requires considerably more effort for an advertiser to manage flight in a CPC marketplace. The input parameter to flight management in a CPC marketplace are: 1) the flight duration (start and end dates and times), 2) the flight budget, 3) the set of listings to be used in the CPC marketplace (each listing has a term, title, description, and URL), and 4) the maximum average CPC for the listings (any higher CPC will result in a loss to the advertiser).

There are other inputs that depend on the CPC marketplace: 1) the bids for all ranks for the terms of the listings (e.g., it takes $4.43 to be at rank 3 for the term "web hosting"), and 2) the number of clicks at every rank of every term (e.g., the term "travel" at rank 2 has 1800 clicks/day).

The goals of flight management in a CPC marketplace are to: 1) spend the budget evenly over the flight, 2) spend the budget exactly by the end of the flight (or as close to it as possible), 3) ensure that the average bid for the selected listings is less than the maximum average CPC, 4) ensure that the advertiser profit is maximized. This means that for the fixed flight budget the advertiser receives the maximum possible clicks. The advertiser will receive the maximum number of clicks if the average CPC for all the listings is the lowest. Since the flight budget is fixed, having the maximum possible clicks is equivalent to maximizing the advertiser ROI.

Managing a flight in a CPC marketplace requires: 1) selecting the listings to bid on 2) selecting the bid amount for each selected listing (which determines the rank of every listing at the current time), and 3) periodically re-evaluating the bids to make sure the flight is still on track. Spending can go over or under the projections in the middle of a flight because of the dynamics of the CPC marketplace.

A CPC marketplace requires considerably more effort from an advertiser to manage a flight compared to other alternatives (TV, radio, print, other online, etc.) This is because: 1) the advertiser must generate a large number of listings, 2) the advertiser must determine the maximum CPC to remain profitable, 3) the advertiser must determine how to maximize profit by selecting the optimal bids for every listing, and 4) the advertiser must continually monitor and adjust the bids throughout the flight—all of which requires considerable effort. In some cases this can take multiple employees working full-time. The next few paragraphs briefly describe these difficulties.

An advertiser must generate a large set of listings (this can be in the hundreds). For each listing the advertiser must select a term, title, description, and URL. For example, a listing may have the term "LCD Projector", the title "*Your Super Source for LCD Projectors*", the description "*Infocus Proxima Sanyo Toshiba, Panasonic Hitachi. Incredible deals on the best in computer projection with the best support in the business*", and a URL pointing to the advertiser's web site.

This can be time consuming, as each listing typically requires a manual review process by the CPC marketplace operator to ensure that the title and description accurately reflect the destination URL and that the title and description are relevant to the term of the listing.

The advertiser must determine the maximum amount to bid on the listings, in order to ensure that there will not be a loss. The amount paid to transfer a searcher to an advertiser's web site must be less than the expected profit/click. This requires computing the conversion rate for all possible actions—computing the probability that a searcher will perform each of the possible actions once he is transferred to the advertiser's web site. The possible actions can include registering, buying an item, applying for a loan, etc. The conversion rates for the various actions are combined with the average profit/action to compute the expected profit/click.

For example, if 1% of the searchers transferred to an advertiser's web site buy a digital camera, which results in an average profit to the advertiser of $100, then the maximum CPC for the listing is $1.00 (anything higher will result in a loss).

In addition, an advertiser must set the CPC for every listing in order to maximize profit. A higher CPC for a listing results in a better rank, which generally leads to more clicks, but the average cost/click goes up (due to the higher CPC). The total profit is the product of 1) the number of clicks and 2) the average profit/click minus the average cost/click.

A higher CPC may or may not result in higher profit. In general, the total profit can go up or down with changes in rank. The following example shows the non-monotonic behavior of the total profit with rank for a single listing. The advertiser has an average profit/click of $4.90. Bidding to be at rank 6 results in the maximum profit to the advertiser, when budget for the listings is greater than or equal to $46. On the other hand, if budget limit is $20, then the optimal profit is at rank 8, since that rank has the highest profit while still coming under the budget.

| Rank | #Clicks | CPC | Profit/Click | Total Profit | Traffic Cost |
| --- | --- | --- | --- | --- | --- |
| 1 | 18 | $4.90 | $4.90 | $0.00 | $88.20 |
| 2 | 17 | $4.80 | $4.90 | $1.70 | $81.60 |
| 3 | 16 | $4.79 | $4.90 | $1.76 | $76.64 |
| 4 | 15 | $4.78 | $4.90 | $1.80 | $71.70 |
| 5 | 12 | $4.70 | $4.90 | $2.40 | $56.40 |
| 6 | 10 | $4.60 | $4.90 | $3.00 | $46.00 |
| 7 | 5 | $4.40 | $4.90 | $2.50 | $22.00 |
| 8 | 4 | $4.30 | $4.90 | $2.40 | $17.20 |
| 9 | 3 | $4.20 | $4.90 | $2.10 | $12.60 |

Figuring out the optimal bid for a listing is a trial and error process, if the marketplace operator does not publicize the average number of clicks as a function of rank for every term. In this example, the advertiser may start at rank 3, then try rank 4, which results in an increase in total profit, continue to examine rank 5, etc. Another problem is that finding a local maximum may miss the rank with optimal profit—rank 6 may have higher profit than its neighbors, but it is possible that rank 10 is better than rank 6.

To complicate matters, the conversion rate for different listings may not be the same. For example, a listing with the term "auto" may have 1% of the searchers buying information about the dealer costs for a car, while for a listing with the term "car" this may be 1.5%. This difference may be a function of the term of the listing, or its title, description, or the web page pointed to by the URL. Also, the conversion rates for a single listing may depend on the rank at which the listing is displayed. For example, it could be that when the listing is displayed at rank one 2% of the searchers buy the product, while if the listing is at rank five only 1% of the searchers buy the product.

The advertiser must manage the listings on a regular basis. This is to ensure that the budget is spent evenly or unevenly as desired, and that the entire budget is spent by the end of the flight. Spending the entire budget before the end of the flight can result in misallocation of resources—too many customers followed by none—and not spending the entire budget can result in missed revenue opportunities.

An advertiser must make an initial estimate of the optimal bids for all listings, and then continually monitor these to ensure that the flight is on track. There are many reasons why the bids may need to be modified over time. The initial estimates of the number of clicks at different ranks for every listing may be incorrect, the initial estimates of the conversion rates may be incorrect or the conversion rates may change over time. For example the listings may have relevance to a particular date (e.g., Father's Day), which has just passed.

In addition, due to the dynamics of the marketplace, the number of clicks for every rank of every term can change. For example, the listing with the term "auto" may have of bid of $1.43 and be at rank 3. Later another advertiser enters the market with a bid of $1.44 to displace the listing at rank 3 to rank 4. At rank 4 the "auto" listing will have fewer clicks—the cost/click for the term "auto" has just gone up in the marketplace. Other changes may be caused by advertisers leaving the marketplace, existing advertisers increasing/decreasing their bids, and the marketplace operator increasing/decreasing the number of searchers performing search (e.g., by adding or dropping affiliates). The dynamics of the CPC marketplace may result in these changes at any time.

There are other marketplace conditions that advertisers must keep track of in order to maximize profit. These include checking if the bid of a listing is too high for its current rank. For example, an advertiser $A_1$ may set the CPC of a listing to $0.50 for the listing to be at rank 2—advertiser $A_2$ is at rank 3 with a CPC of $0.49. A few hours later, $A_2$ changes the CPC of his listing to $0.45, while still remaining at rank 3. Advertiser $A_1$ can now reduce the CPC of his listing from $0.50 to $0.46, while still maintaining the listing at rank 2.

The previous examples illustrate the various actions that advertisers must perform manually to manage their flights. Some advertisers do these tasks several times a day. Some advertisers have a plurality of employees dedicated to the management of their participation in a pay for placement marketplace, monitoring the positions of their listings and adjusting their bids, managing their budget, etc.

The manual process of polling the status of listings, checking the competitors in the marketplace, and checking the account status is time consuming and wasteful. Therefore, a need exists for a method and apparatus for advertisers to manage their advertising flights more effectively.

BRIEF SUMMARY

There is a need to provide an automated flight management system for advertisers. Such a system would take as input the parameters of the advertising flight: the budget, duration, terms, maximum average CPC, conversion rates, and average profit/action for each term. The system would automatically set the CPC for every listing in order to maximize the advertiser's profit, and spend the budget over the flight as specified by the advertiser. The system would periodically recompute the CPC of listings, taking into account the historic performance of the flight to better optimize profit. The system would periodically generate reports on the performance of the automated flight management system and communicate these to the advertiser. The system should give advertisers the ability to customize the automated flight plan generated by the system.

If these inefficiencies are not addressed by a marketplace operator, then an economic incentive remains for advertisers to produce automated services of their own to interact with the account management systems of the marketplace operator to obtain the economic advantage available relative to the limited automated services provided by the marketplace operator. As a further consequence, such a situation provides economic incentive for third parties to produce automated services for advertisers, for a fee, or a cut of the alleged savings produced. This is already happening.

By way of introduction only, the present embodiments may be referred to collectively as Automatic Flight Management.

Automatic Flight Management is an improvement on existing pay for placement marketplace systems. In the basic marketplace system, an advertiser logs on to the advertiser interface and manages his advertising campaign by examining the marketplace information and the information related to his listings. For example, an advertiser can identify a set of terms, their description, and the CPC for each term, which is the amount that the advertiser will pay if a searcher clicks on the listing. An advertiser can also check the number of clicks at different ranks for a search term, examine the other competitive listings for a term, etc. Subsequently, when a search term matches a search query received from a searcher, the advertiser may give economic value to the marketplace operator. To manage an advertising flight, an advertiser also has to ensure that the budget is being spent according to plan throughout the flight.

The embodiments described herein use the concept of a bid, which corresponds to the economic value that an advertiser will give when network locations associated with the advertiser are referred to a searcher in response to a query from the searcher. The economic value may be a money amount charged or chargeable to the advertiser, either directly or indirectly. The economic value may be an amount debited from an account of the advertiser. The amount may be a money amount or another value, such as credit points. The economic value may be given by the advertiser to the operator of a database search system or to a third party.

The economic value is given when a searcher is referred to one or more network locations, such as advertiser web sites. The referral may be made by presenting the network locations on a screen used for data entry and receipt by the searcher, alone or with other search results. This is referred to as an impression. Alternatively, and in an embodiment generally described herein, the referral may occur when the searcher clicks on or clicks through to access the network locations of the advertiser, as will be described in greater detail below. Or the referral may be by some other action taken by the searcher after accessing the network locations of the advertiser.

The embodiments herein automate many of the steps performed by an advertiser in managing an advertising flight. Currently an advertiser must periodically examine the state of his listings, the state of the marketplace, the past expenditures and conversion rates of searchers clicking through to an advertiser's web site, and whether the business objectives of the flight are being met. This manual examination of the marketplace and adjustment of the bids of the listings is time consuming and error prone, as an advertiser may have to guess at the number of clicks that a listing will receive at different ranks, if this information is not provided by the marketplace operator.

The disclosed embodiments of Automatic Flight Management enable an advertiser to specify the parameters of the advertising flight. The system provides an automated agent that acts on behalf of the advertiser, periodically checking the conditions in the marketplace and making adjustments to the bids of the listings to ensure that the objectives of the flight are met and that the advertiser profit is maximized.

The agent is a software process or application operating in conjunction with data maintained by the marketplace system. If all is well—the flight expenditures are on schedule and the current bids for the listings maximize advertiser profit—then the agent takes no further action. Otherwise, the agent adjusts the bids of one or more listings to get the flight expenditures in line with the budget and to maximize advertiser profit, and sends a message to alert the advertiser of the changes. Messages can be sent whenever adjustments are made, or they can be aggregated and sent periodically, at the control of the advertiser.

Inputs, Outputs, and Goals

An advertiser describes the parameters of the advertising flight by specifying:

$\{T_1, T_2, \ldots, T_k\}$: the listings and their terms

B: the budget for the flight

I: the flight interval (starting and ending dates and times)

one or more of the following:

C: the maximum average CPC over all the terms

R: the conversion rate, which is the fraction of the searchers that perform an action at the advertiser's web site, and P: the average profit/action. The expected profit/click is P×R It is assumed that the budget B is to be spent evenly over the flight. If this is not the case, the advertiser can specify a collection of separate flights, where each flight has an even spend rate. For example, suppose that the flight budget is $100,000, where $20,000 is to be spent in month one, $30,000 is to be spent in month two, and $50,000 is to be spent in month three. The uneven flight can be broken into three separate flights with even spend rates: Flight one for the first month with a budget of $20,000, Flight two for the second month with a budget of $30,000, and Flight three for the third month with a budget of $50,000.

The marketplace operator has access to the current state of the marketplace, which can be used to optimize the flight. This includes:

$b_{i,j}$: the bid for term $T_i$ at rank j $C_{i,j}$: the number of clicks for term $T_i$ at rank j The Automatic Flight Management algorithm is run periodically to optimize the flight on an ongoing basis. At each step, the agent acting on behalf of the advertiser selects the optimal bid for every term in $\{T_1, T_2, \ldots, T_k\}$. The bid selected for term $T_i$ is $b_i$, which is expected to result in $c_i$ clicks from searchers over the flight interval.

For every term $T_i$ in $\{T_1, T_2, \ldots, T_k\}$, given its bid $b_i$ and its estimated number of clicks $c_i$ it is possible to determine:

the estimated total number of clicks from searchers over the flight interval $c_t = c_1 + c_2 + \ldots + c_k$.

the estimated total expense of the flight to the advertiser $e_t = b_1 c_1 + b_2 c_2 + \ldots + b_k c_k$, which must be less than the budget B.

the estimated average bid over the flight $$b_a = \frac{e_t}{c_t} = \frac{b_1 c_1 + b_2 c_2 + \ldots b_k c_k}{c_1 + c_2 + \ldots c_k} \approx \frac{B}{c_t}$$

the estimated number of actions taken by searchers at the advertiser's web site $A_t = c_t \times R = (c_1 + c_2 + \ldots + c_k) \times R$ the total advertiser profit, which is the sum of the profit for every term. The profit for term $T_i$ is the product of 1) the number of clicks and 2) the profit/click minus the cost/click, which is $c_i(P \times R - b_i)$. Therefore, the total profit is $$T = \sum_{i=1}^{k} c_i (P \times R - b_i).$$

This is approximately equal to $c_t \times P \times R - B$, if the total cost over the flight $$\sum_{i=1}^{k} c_i \times b_i$$

is approximately equal to the flight budget B.

The total advertiser profit for the flight, $T \equiv c_t \times P \times R - B$, can be optimized by maximizing the total number of clicks $c_t$. This is because the average profit/action P and the conversion rate R are constants, and the goal is to spend close to the constant flight budget B. The total number of clicks is approximately equal to the budget divided by the average bid, that is $$c_t \approx \frac{B}{b_a}.$$

Therefore, we can maximize the total number of clicks $c_t$ by minimizing the average bid $b_a$.

The goals of Automatic Flight Management are to:

spend the budget B evenly over the flight. This is accomplished by setting the bids for the terms $\{T_1, T_2, \ldots, T_k\}$ so that the total cost is approximately equal to the budget, that is $b_1 c_1 + b_2 c_2 + \ldots + b_k c_k \equiv B$.

optimize the advertiser's profit. This is accomplished by maximizing the total number of clicks $c_t$ while spending the budget B. This is equivalent to minimizing the average bid $b_a$ while spending the budget B.

If the advertiser specifies a maximum average CPC C, then ensure that $$b_a = \frac{e_t}{c_t} = \frac{b_1 c_1 + b_2 c_2 + \ldots b_k c_k}{c_1 + c_2 + \ldots c_k} \leq C.$$

If the advertiser specifies a conversion rate R and the average profit/action P, then use this information to select the bids for the terms so that the total profit $$T = \sum_{i=1}^{k} c_i (P \times R - b_i)$$

is maximized. This is different from condition 2, since it may be possible to get a higher total profit without spending the entire budget B.

Multiple Actions by a Searcher

It is possible that a searcher can perform one or more actions with economic value to the advertiser at his web site. For example, an advertiser can buy a TV, buy a TV and an extended service contract, or register to receive future promotional information. In general there will be a number of independent actions $<a_1, a_2, \ldots, a_n>$, where the profit for the actions is $<p_1, p_2, \ldots p_n>$, and the conversion rate for the actions is $<r_1, r_2, \ldots, r_n>$. That is, a searcher clicking through to an advertiser's web site has the probability $r_1$ of performing action $a_1$, and the probability $r_2$ of performing action $a_2$, etc. In this case, the average profit/click is $$P \times R = \sum_{i=1}^{n} p_i \times r_i.$$

Different Conversion Rates for Different Terms and Ranks

It is also possible that different terms have different conversion rates. So instead of having a single conversion rate R, the advertiser specifies a conversion rate $R(T_i)$ for every term $T_i$ in $\{T_1, T_2, \ldots, T_k\}$. Let $R_{max}$ be the highest conversion rate for the term $T_j$.

We can standardize all terms to have the same conversion rate $R_{max}$ by:

scaling the number of clicks of every rank of every term $T_i$ in $\{T_1, T_2, \ldots, T_k\}$ by the factor $$\frac{R(T_i)}{R_{max}},$$

and scaling the bid of every rank of every term $T_i$ in $\{T_1, T_2, \ldots, T_k\}$ by the factor $$\frac{R_{max}}{R(T_i)}$$

Scaling the number of clicks normalizes the conversion rate of every term, and the inverse scaling of the bids ensures that the cost of a rank remains unchanged.

It is also possible that every rank of every term has a different conversion rate. So instead of having a single conversion rate R, the advertiser specifies a conversion rate $R(T_i, j)$ for every term $T_i$ in $\{T_1, T_2, \ldots, T_k\}$ at every rank j. Let $R_{max}$ be the highest conversion rate for the term $T_j$ at rank 1. Similar to the previous case, we can standardize all terms to have the same conversion rate $R_{max}$ at every rank by:

scaling the number of clicks of every term $T_i$ in $\{T_1, T_2, \ldots, T_k\}$ at every rank j by the factor $$\frac{R(T_i, j)}{R_{max}},$$

and scaling the bid of every term $T_i$ in $\{T_1, T_2, \ldots, T_k\}$ at every rank j by the factor $$\frac{R_{max}}{R(T_i, j)}$$

Optimal Flight Management

In the first embodiment of Automatic Flight Management, the system takes as input from an advertiser: 1) a set of listings for the flight with the terms $\{T_1, T_2, \ldots, T_k\}$, 2) the budget B, 3) the maximum CPC C, and 4) the conversion rate R and average profit/action P.

This embodiment is optimal, since it examines all possible combination of bids for the terms $\{T_1, T_2, \ldots, T_k\}$, and selects the combination that results in the highest profit to the advertiser, without going over the budget or going over the maximum average CPC.

For any term $T_i$ in $\{T_1, T_2, \ldots, T_k\}$, the advertiser can be at rank 1 by bidding $0.01 over the existing bid of the advertiser at rank 1. In this example we have assumed that the marketplace operator has selected the minimum bid increment of $0.01, but this could be arbitrary. Suppose that the current listing at rank 2 has a bid of $0.87. The advertiser can be at rank 2 with a bid of $0.88—unless there is an existing listing with a bid of $0.88, in which case the advertiser cannot be at rank 2! This process is repeated by examining the existing listing at rank 3, 4, ..., etc., until all ranks have been examined. This process is repeated for every listing in $\{T_1, T_2, \ldots, T_k\}$.

As we consider all combination of bids for the terms in $\{T_1, T_2, \ldots, T_k\}$, suppose that in the current combination each term $T_i$ has bid $b_i$ and expected clicks is $c_i$. The total clicks for the current combination is $c_t = c_1 + c_2 + \ldots + c_k$, the total expense for the current combination is $e_t = b_1 \times c_1 + b_2 \times c_2 + \ldots + b_k \times c_k$, and the average bid for the current combination is $$b_a = \frac{e_t}{c_t} = \frac{b_1 \times c_1 + b_2 \times c_2 + \ldots b_k \times c_k}{c_1 + c_2 + \ldots c_k}$$

The current combination is discarded if:

the total cost is greater than the budget ($e_t > B$), or the average CPC is greater than the maximum average CPC ($b_a > C$).

Otherwise, the system checks to see if the current combination is the best so far. If the current combination is the best so far, then the new best combination is set to the current combination.

If the advertiser only specifies a maximum average CPC C, then the current combination is the best if the total clicks $c_t$ is greater than the total clicks of the previous best combination.

If the advertiser specifies the conversion rate R and the average profit/action P, then the current combination is the best if the current total profit, $c_t(P \times R - b_a)$, is greater than total profit of the previous best combination.

After computing the total advertiser profit for bidding at all possible ranks for the terms $\{T_1, T_2, \ldots, T_k\}$, the system returns the optimal combination that results in the highest advertiser profit.

The following example illustrates the operation of Optimal Flight Management. Consider the case where there are two terms $\{T_1, T_2\}$ where each term has the following rank/clicks/bid combinations available for a new advertiser (we have simplified the example by having both terms be identical):

| Rank | Clicks | Bid |
|---|---|---|
| 1 | 1782 | $0.72 |
| 2 | 1434 | $0.71 |
| 3 | 973 | $0.70 |
| 4 | 641 | $0.68 |
| 5 | 457 | $0.65 |
| 6 | 527 | $0.64 |
| 7 | 466 | $0.62 |
| 8 | 458 | $0.53 |
| 9 | 389 | $0.51 |
| 10 | 436 | $0.44 |

Optimal flight management considers 100 combinations, where each combination picks one of the ten ranks/bids for each term. The optimal combinations for different budgets is shown below:

| Terms | Clicks | Bid | Cost |
|---|---|---|---|
| [T1@1, T2@1] | 3564 | $0.7200000 | $2,566.08 |
| [T1@2, T2@1] | 3216 | $0.7155410 | $2,301.18 |
| [T1@2, T2@2] | 2868 | $0.7100000 | $2,036.28 |
| [T1@4, T2@1] | 2423 | $0.7094181 | $1,718.92 |
| [T1@3, T2@2] | 2407 | $0.7059576 | $1,699.24 |
| [T1@6, T2@1] | 2309 | $0.7017410 | $1,620.32 |
| [T1@7, T2@1] | 2248 | $0.6992705 | $1,571.96 |
| [T1@8, T2@1] | 2240 | $0.6811518 | $1,525.78 |
| [T1@10, T2@1] | 2218 | $0.6649594 | $1,474.88 |
| [T1@10, T2@2] | 1870 | $0.6470481 | $1,209.98 |
| [T1@8, T2@3] | 1431 | $0.6455905 | $923.84 |
| [T1@10, T2@3] | 1409 | $0.6195458 | $872.94 |
| [T1@8, T2@4] | 1099 | $0.6174886 | $678.62 |
| [T1@10, T2@4] | 1077 | $0.5828412 | $627.72 |
| [T1@10, T2@6] | 963 | $0.5494496 | $529.12 |
| [T1@8, T2@8] | 916 | $0.5300000 | $485.48 |
| [T1@10, T2@8] | 894 | $0.4861074 | $434.58 |

For example, with a budget B of $1,250, the optimal flight that maximizes the advertiser's profit involves being at rank 10 for $T_1$ (with a bid of $0.44) and being at rank 2 for $T_2$ (with a bid of $0.71). The total cost for this flight is approximately $1,209.98, and the total number of expected clicks is 1,870. From this it follows that the average bid is 1,209.98/1870=0.6470481

Unfortunately, this algorithm has exponential cost. Suppose that the k terms in $\{T_1, T_2, \ldots, T_k\}$ each have approximately r ranks. The algorithm must consider all combinations of ranks to bid at. There are r+1 possibilities for each term (to not bid on this term, or to bid at rank 1, or to bid at rank 2, ..., or to bid at rank r). Since the choice for each term is independent, there are $(r+1)^k$ possibilities to considering. Consequently, this algorithm is impractical for large problems.

Periodic Re-execution

At the start of the flight, the system computes the ideal combination of bids for the terms in $\{T_1, T_2, \ldots, T_k\}$ as described above. Because of the dynamics of the marketplace, the bids and number of clicks for the various ranks can change during a flight.

The system periodically re-computes the optimal bids to ensure that the advertiser's flight remains on track to spend the budget evenly, and to ensure that the advertiser's profit continues to be maximized.

The marketplace operator, or the advertiser, can select the best times to re-plan the flight for an advertiser. This could be every hour, every day, or it could be when an event occurs that could change the bids or number of clicks (e.g., the marketplace operator increases the number of searchers significantly by adding a new high-traffic affiliate).

Before the algorithm is re-run the information about the flight is updated to reflect the remaining flight:

the budget B is replaced by the remaining budget the flight duration I is replaced by the remaining flight duration the conversion rate of every term $\{T_1, T_2, \ldots, T_k\}$ at every rank is replaced by the actual conversion rates observed by the advertiser from the start of the flight—if sufficient data has been accumulated to be statistically relevant.

the number of clicks/time for every term $\{T_1, T_2, \ldots, T_k\}$ at every rank is replaced by the actual number of clicks/time from the start of the flight—if sufficient data has been accumulated to be statistically relevant.

the bid for every term at every rank is updated with the latest information from the marketplace. For example, if the top bid for the term "car" is $1.34, then it is possible to be at rank 1 for "car" with a bid of $1.35.

It is possible that at the start of the flight the budget is $30,000 for 30 days, and after one day the budget is $28,500 for 29 days. In this case the initial cost estimates were too low (underestimating the number of clicks, or some competing advertisers have dropped out, thus increasing rank). The algorithm is re-run with the latest information to make the best decisions going forward.

Price Protection

Price Protection is a variation of the first embodiment, where the system sets a price-protected bid for every selected rank of every term in $\{T_1, T_2, \ldots, T_k\}$, instead of setting a fixed CPC bid. This is an improvement over the first variation, since it provides another opportunity to optimize the advertiser's profit in response to changing its bids in the marketplace in between the periodic re-execution of the flight management.

Suppose that the optimal combination of bids for the terms $\{T_1, T_2, \ldots, T_k\}$ from the most recent execution of Automatic Flight Management is $\{b_1, b_2, \ldots, b_k\}$. Instead of setting a fixed bid $b_i$ for the term $T_i$, the system sets a Price Protected (PP) bid.

A PP bid indicates that the advertiser is willing to pay up to the maximum $b_i$ for the term $T_i$ and wishes the system to place him at the best rank possible with this bid, but to reduce the bid if it is possible to do so while maintaining its position at the best possible rank. It may be possible to reduce the CPC, for example, if the advertiser one rank below reduces his bid or drops out. PP can adjust the CPCs of advertisers on an ongoing basis, e.g., every time any bid changes.

Having the system continually adjust the bids to be at the best rank at the lowest possible cost to the advertiser ensures that the advertiser's profit is maximized on an ongoing basis. The system can adjust the bids immediately upon changes in other bids in the marketplace, without requiring the computationally more expensive task of re-executing automatic flight management.

Guided Flight Management

Guided Flight Management is a computationally efficient variation of Optimal Flight Management, where the system uses heuristics to get close to an optimal flight. While Guided Flight Management may be optimal for some cases, this cannot be guaranteed in general.

For most problems of any reasonable size, the cost of optimal flight management is intractable. Consequently, Guided Flight Management is an improvement that generates close to optimal results at a manageable cost.

As described earlier, generating the highest number of clicks for the budget maximizes the total advertiser profit. This is equivalent to having the lowest average bid for all the terms being bid on, while spending the total flight budget.

The heuristic used by Guided Flight Management is to explore combinations that lead to the least increase in the average bid. While Optimal Flight Management examines bidding at all possible combination of ranks for the terms in $\{T_1, T_2, \ldots, T_k\}$, Guided Flight Management only explores a small subset of these.

The preferred embodiment for Guided Flight Management uses a hill-climbing algorithm to increase efficiency. There are many variations of such "greedy" algorithms that would be obvious to one ordinarily skilled in the art.

The system starts by considering the combination of ranks for the terms in $\{T_1, T_2, \ldots, T_k\}$ that results from making the lowest possible bids. The marketplace operator can choose the minimum bid, e.g., it can be $0.05 for every term. The "current combination" and "best combination" are assigned this initial combination.

The system next goes through a number of iterations, and at each iteration it explores all single-step extensions to the "current combination". Each single step extension improves the rank of one of the terms in the "current combination" to the next-better rank available by increasing its bid by the minimum to get to this next better rank. For example, if in the "current combination" term $T_1$ has a bid of $0.05 and is at rank 40, and there is another advertiser with a bid of $0.07 who is at rank 39, then the next better rank possible for $T_1$ is rank 39, with a minimum bid of $0.08. So one of the extensions considered is improving the rank of $T_1$ from 40 to 39 by increasing the bid from $0.05 to $0.08. All single step extensions for the other terms in $\{T_2, T_3, \ldots, T_k\}$ are explored similarly.

The extension that results in the lowest average bid is the new value of the "current combination."

When a new value of "current combination" is found, the system checks if it should update its "best combination" to be the "current combination". In addition, the system checks if it should terminate and return the "best combination" or if it should continue the iteration process to find the next "current combination."

If the advertiser only specifies a maximum average CPC C, then the "current combination" is the best if the total clicks $c_t$ is greater than the total clicks of the previous "best combination."

If the advertiser specifies the conversion rate R and the average profit/action P, then the current combination is the best if the current total profit, $c_t(P \times R - b_a)$ is greater than total profit of the current "best combination."

If the "current combination" is better than the previous "best combination", the algorithm replaces the "best combination" with the "current combination."

The algorithm terminates and returns the current "best combination", if any of the following is true:

the total cost is greater than the budget ($e_t > B$), the average bid is greater than the maximum ($b_a > C$), or there are no more one-step extensions to the "current combination." This is true if every term in $\{T_1, T_2, \ldots, T_k\}$ is bid to rank 1.

Otherwise, the algorithm proceeds with the next iteration to find the next value for the "current combination."

The following example illustrates the operation of Guided Flight Management. The same data is used for the terms $\{T_1, T_2\}$, as presented earlier for Optimal Flight Management. The answers returned by Guided Flight Management for different budgets is given below:

| Terms | Clicks | Bid | Cost |
|---|---|---|---|
| [T1@1, T2@1] | 3564 | $0.7200000 | $2,566.08 |
| [T2@2, T1@1] | 3216 | $0.7155410 | $2,301.18 |
| [T1@1, T2@3] | 2755 | $0.7129365 | $1,964.14 |
| [T2@4, T1@1] | 2423 | $0.7094181 | $1,718.92 |
| [T2@6, T1@1] | 2309 | $0.7017410 | $1,620.32 |
| [T1@1, T2@7] | 2248 | $0.6992705 | $1,571.96 |
| [T2@8, T1@1] | 2240 | $0.6811518 | $1,525.78 |
| [T1@2, T2@8] | 1892 | $0.6664270 | $1,260.88 |
| [T2@8, T1@3] | 1431 | $0.6455905 | $923.84 |
| [T1@4, T2@8] | 1099 | $0.6174886 | $678.62 |

-continued

| Terms | Clicks | Bid | Cost |
|---|---|---|---|
| [T1@6, T2@8] | 985 | $0.5888528 | $580.02 |
| [T2@8, T1@7] | 924 | $0.5753896 | $531.66 |
| [T1@8, T2@8] | 916 | $0.5300000 | $485.48 |
| [T1@8, T2@10] | 894 | $0.4861074 | $434.58 |
| [T2@10, T1@10] | 872 | $0.4400000 | $383.68 |

For example, with a budget B of $2,100, Guided Flight Management finds the solution: being at rank 1 for $T_1$ (with a bid of $0.72) and being at rank 3 for $T_2$ (with a bid of $0.70). The total expected cost for this flight is $1,964.14, and the total expected clicks is 2,755. From this it follows that the average bid is 1,964.14/2755=0.7129365.

For this same example, Optimal flight management will find the solution: being at rank 2 for $T_1$ and $T_2$ (with a bid of $0.71 for each). The expected total cost is $2,036.28, and the expected total clicks is 2,868. The average bid is $0.71. Note that Optimal Flight Management has a lower average bid ($0.71 vs. $0.7129365), which results in more clicks (2,868 vs. 2,755), though with a slightly higher expected cost ($2,036.28 vs. $1,964.14).

Guided Exploration is a hill-climbing algorithm—starting at the combination with the lowest bid, and then moving one step from the current combination to the neighboring combination that has the best value.

Hill-climbing exploration is much more efficient than checking every combination, as it has polynomial complexity. Suppose that the k terms in $\{T_1, T_2, \ldots, T_k\}$ each have approximately r ranks. At each iteration the algorithm will examine k single-step extensions to the current combination (and pick the one having the lowest average bid as the new "current combination"), and it will perform k×r iterations (going from the worst rank for all terms in $\{T_1, T_2, \ldots T_k\}$ to the best). This results in a total time cost of $k^2 \times r$.

Guided Exploration may not be optimal for some inputs, since it does not consider bidding at all combination of ranks for the terms $\{T_1, T_2, \ldots, T_k\}$. Therefore, it cannot guarantee to find the combination of bids that maximizes the advertiser's profit for the flight. However, the heuristic to search for the combinations with the lowest bid results in solutions that may be optimal and that are often very close to optimal.

Optimizations

In another embodiment of the invention, there are a number of optimizations that are applied to Guided Flight Management. The optimized embodiments have the advantage of reduced computation time and space.

The optimizations ignore considering some of the ranks of the input terms $\{T_1, T_2, \ldots, T_k\}$ that are unlikely to be a part of the final solution, given the flight budget B and other constraints from the advertiser. This has the advantage of significantly reducing the computation time and computation space. These optimizations can be applied to both Optimal Flight Management and Guided Flight Management.

The first optimization ignores ranks of the terms $\{T_1, T_2, \ldots, T_k\}$ with fewer clicks than some threshold. This is to ignore ranks that cannot contribute significantly to sending searchers to an advertiser's web site.

The second optimization only considers a band of possible ranks for each term $\{T_1, T_2, \ldots, T_k\}$. For example, the advertiser may specify that no ranks worse than rank 3 should be considered for any term, or specify that for term $T_1$ only ranks 3 through 10 should be considered, while for all other terms only ranks 2 through 5 should be considered. These constraints enable an advertiser to better accomplish his business goals, e.g., projecting an image of higher quality and trust by being at the premium ranks, or being at better ranks than its competitors.

The third optimization is a variation where the system automatically decides the band of possible ranks to consider for each term $\{T_1, T_2, \ldots, T_k\}$. As automatic flight management is run periodically throughout a flight, the results of the previous run are used to select the appropriate band of ranks to consider for each term $\{T_1, T_2, \ldots, T_k\}$.

The previous run of flight management picks a specific bid/rank for every term $\{T_1, T_2, \ldots, T_k\}$, which is expected to maximize the advertiser's profit. The next run of automatic flight management only considers a window of ranks around the selected rank of the previous run. This window can be selected by the marketplace operator, e.g., selecting a window of 5 ranks to either side of the optimal rank from the previous run of automatic flight management. The larger the window the better the results, but the greater the computation time and cost for the marketplace operator.

For every term $T_i$ in $\{T_1, T_2, \ldots, T_k\}$ the optimization ignores all ranks $r_{i,j}$ of $T_i$ when:

rank $r_{i,j}$ is more than some constant α ranks away from the rank of $T_i$ with the previous optimal bid $b_{i,o}$, or the bid $b_{i,j}$ of rank $r_{i,j}$ is not within a factor β of the previous optimal bid $b_{i,o}$, that is, delete rank $r_{i,j}$ if the following is not true: $(1-\beta)*b_{i,o} \leq b_{i,j} \leq (1+\beta)*b_{i,o}$. Here $0 \leq \beta \leq 1$.

The first time automatic flight management is run, there are no previous optimal bids $b_{i,o}$ for every term $T_i$ in $\{T_1, T_2, \ldots, T_k\}$ For the very first run, we can estimate the previous optimal bids $b_{i,o}$ to be equal to the average optimal bid $b_o$ for all terms $\{T_1, T_2, \ldots, T_k\}$. The average optimal bid is computed such that if all the terms $\{T_1, T_2, \ldots, T_k\}$ are assigned this bid, then this will result in spending close to the budget B. The first time automatic flight management is run, ranks "far" from this initial estimate are not considered.

The following example illustrates the process of automatically pruning ranks. There are three terms {hotel, Travel, vaction}. Suppose that the budget B is $525. Then the resulting average optimal bid $b_o$ is $0.45, and by bidding on all terms at this level we approximately spend the entire budget.

| Hotel | | | | Travel | | | | Vacation | | | |
|---|---|---|---|---|---|---|---|---|---|---|---|
| Rank | Cost | Clicks | Bid | Rank | Cost | Clicks | Bid | Rank | Cost | Clicks | Bid |
| 1 | $979.12 | 1176 | $0.83 | 1 | $1,677.91 | 2326 | $0.72 | 1 | $393.58 | 353 | $1.11 |
| 2 | $990.22 | 1199 | $0.83 | 2 | $1,264.76 | 1799 | $0.70 | 2 | $191.34 | 179 | $1.07 |
| 3 | $399.90 | 500 | $0.80 | 3 | $502.11 | 1115 | $0.45 | 3 | $58.60 | 77 | $0.76 |
| 4 | $300.80 | 381 | $0.79 | 4 | $237.18 | 518 | $0.46 | 4 | $66.99 | 88 | $0.76 |
| 5 | $110.71 | 153 | $0.72 | 5 | $233.55 | 543 | $0.43 | 5 | $97.80 | 151 | $0.65 |
| 6 | $74.45 | 106 | $0.70 | 6 | $163.56 | 394 | $0.42 | 6 | $70.68 | 127 | $0.56 |
| 7 | $73.73 | 113 | $0.65 | 7 | $31.92 | 82 | $0.39 | 7 | $33.89 | 66 | $0.51 |

-continued

| Hotel | | | | Travel | | | | Vacation | | | |
|---|---|---|---|---|---|---|---|---|---|---|---|
| Rank | Cost | Clicks | Bid | Rank | Cost | Clicks | Bid | Rank | Cost | Clicks | Bid |
| 8 | $200.19 | 308 | $0.65 | 8 | $40.13 | 111 | $0.36 | 8 | $19.17 | 41 | $0.47 |
| 9 | $67.49 | 104 | $0.65 | 9 | $65.97 | 187 | $0.35 | 9 | $30.84 | 73 | $0.42 |
| 10 | $19.83 | 31 | $0.64 | 10 | $65.07 | 187 | $0.35 | 10 | $20.78 | 51 | $0.41 |
| 11 | $32.59 | 51 | $0.64 | 11 | $47.59 | 138 | $0.34 | 11 | $25.60 | 64 | $0.40 |
| 12 | $16.38 | 26 | $0.63 | 12 | $32.68 | 97 | $0.34 | 12 | $16.47 | 42 | $0.39 |
| 13 | $73.03 | 117 | $0.62 | 13 | $27.53 | 84 | $0.33 | 13 | $24.00 | 63 | $0.38 |
| 14 | $125.99 | 204 | $0.62 | 14 | $20.72 | 65 | $0.32 | 14 | $13.15 | 35 | $0.38 |
| 15 | $6.80 | 13 | $0.52 | 15 | $31.26 | 100 | $0.31 | 15 | $9.57 | 27 | $0.35 |
| 16 | $3.16 | 8 | $0.40 | 16 | $3.62 | 12 | $0.30 | 16 | $2.45 | 7 | $0.35 |
| 17 | $4.68 | 13 | $0.36 | 17 | $4.20 | 14 | $0.30 | 17 | $1.38 | 4 | $0.35 |
| 18 | $2.64 | 8 | $0.33 | 18 | $5.35 | 18 | $0.30 | 18 | $3.66 | 11 | $0.33 |
| 19 | $5.25 | 16 | $0.33 | 19 | $6.12 | 21 | $0.29 | 19 | $1.31 | 4 | $0.33 |
| 20 | $0.96 | 3 | $0.32 | 20 | $7.52 | 26 | $0.29 | 20 | $2.24 | 7 | $0.32 |
| 21 | $— | 0 | $— | 21 | $4.83 | 17 | $0.28 | 21 | $1.91 | 6 | $0.32 |

Rank 16 of Hotel, rank 3 of Travel, and rank 8 of vacation have bids closest to $0.45. The boldfaced ranks are the ones remaining after the pruning process, when α=5 (all ranks more than 5 ranks away from the yellow rank are deleted) and β=1 (all ranks with bids greater than $0.90 are deleted). Other ranks are pruned for different values of α and β.

DETAILED DESCRIPTION OF THE PRESENTLY PREFERRED EMBODIMENTS

The database search system includes in this embodiment a database of search listings. Each search listing is associated with a respective advertiser and each search listing includes a search term and a variable cost per click (CPC) or a variable display rank. The database search system in this embodiment further includes a search engine configured to identify search listings matching a search query received from a searcher. The matching search listings are preferably ordered in a search result list according to the display rank and the bid amount of the matching search listings. An agent is responsive to a condition definition from an advertiser to provide condition update information to the advertiser. The condition definition specifies a condition to be monitored. The condition update information, if present, specifies the circumstances under which the condition will be updated.

Another embodiment is implemented as a method for operating a database search system. In this embodiment, the method includes storing a plurality of search listings in a database. Each search listing is associated with an advertiser who gives economic value when a search listing is referred to a searcher. The method further includes determining a display position for associated search listings. In one example, the associated search listings are associated by common data, such as a search term or proximity to a search term. The display position may be determined in any appropriate way, from ways, which are completely deterministic to ways, which are completely random. The position determining way may be based on advertiser input or some other information. In one embodiment, each search listing is assigned a cost per click (CPC) and the display position is determined based on CPC, with the highest CPC listing for a search term being listed highest when that search term or a variant thereof is received. The method further includes receiving from an advertiser an indication of search listings for which the advertiser desires automatic flight management. The indication and the status reports to an advertiser may be sent according to any suitable communication method available, convenient communication channel.

Figure 1:
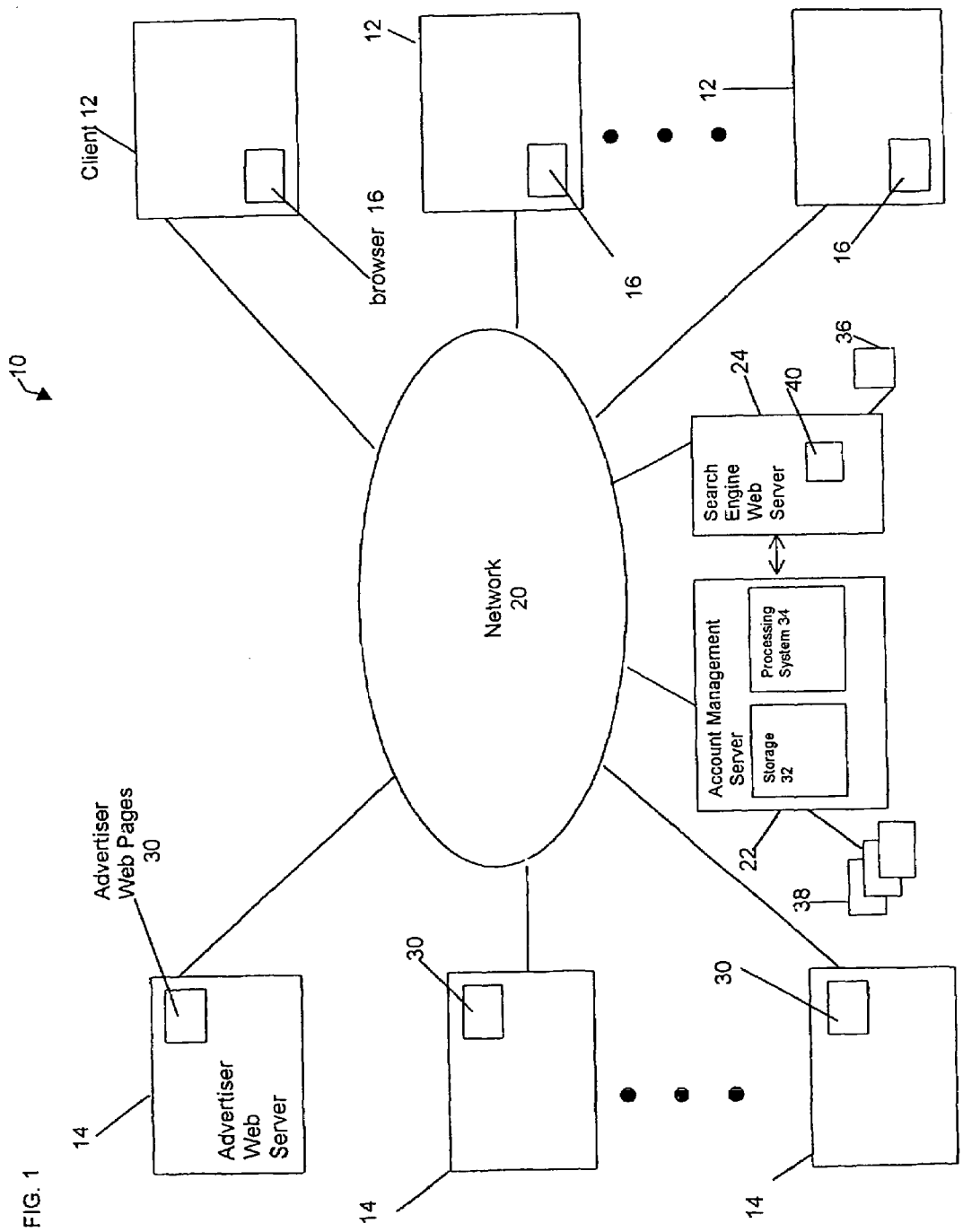
FIG. 1 is a block diagram illustrating the relationship between a large network and one embodiment of the system and method for generating a pay-for-placement search result of the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the NAVIGATOR, EXPLORER, or MOSAIC browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TEL-NET, and a number of other protocols known in the art, may be used. Preferably, search engine server 24, account management server 22, and advertiser servers 14 are located on the World Wide Web.

As discussed above, at least two types of server are contemplated in a preferred embodiment of the present invention. The first server contemplated is an account management server 22 comprising a computer storage medium 32 and a processing system 34. A database 38 is stored on the storage medium 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server transmits this list, in the form of a web page, to the network user, where it is displayed on the browser 16 running on the client computer 12. A presently preferred embodiment of the search engine web server may be found by navigating to the web page at URL http://www.goto.com/. In addition, the search result list web page, an example of which is presented in FIG. 7, will be discussed below in further detail.

Search engine web server 24 is connected to the Internet 20. In a preferred embodiment of the present invention, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processor 34 of account management server 22, where the computer program will evaluate the search term and corresponding web site according to a set of predefined editorial rules.

The higher bids receive more advantageous placement on the search result list page generated by the search engine 24 when a search using the search term bid on by the advertiser is executed. In a preferred embodiment of the present invention, the amount bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 18 located on advertiser web servers 14. In a preferred embodiment of the present invention, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database 40 by an editorial team. Most preferably, the non-paid listings follow the paid advertiser listings on the search results page.

Figure 2:
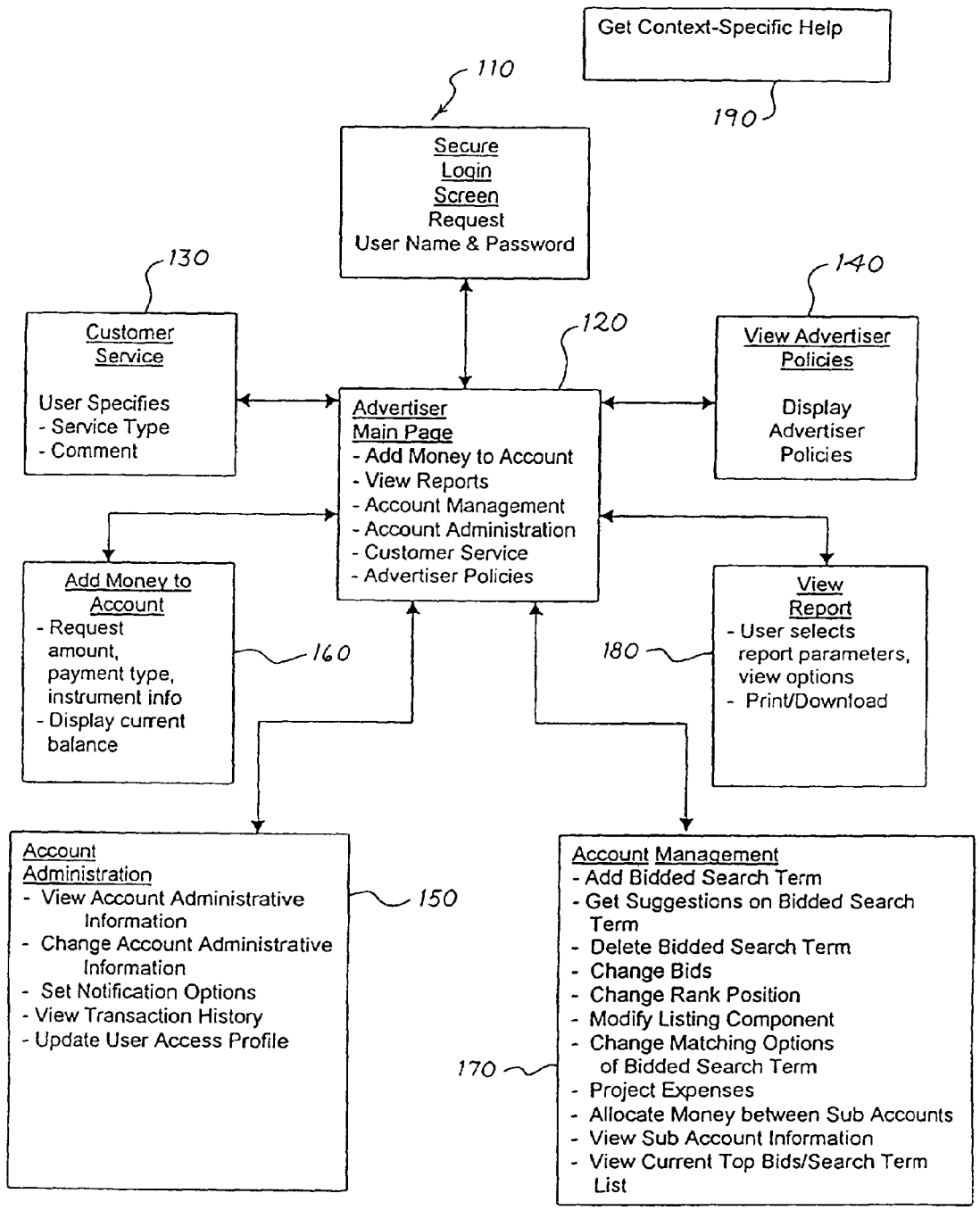
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request. In one embodiment of the present invention, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options.

Figure 3:
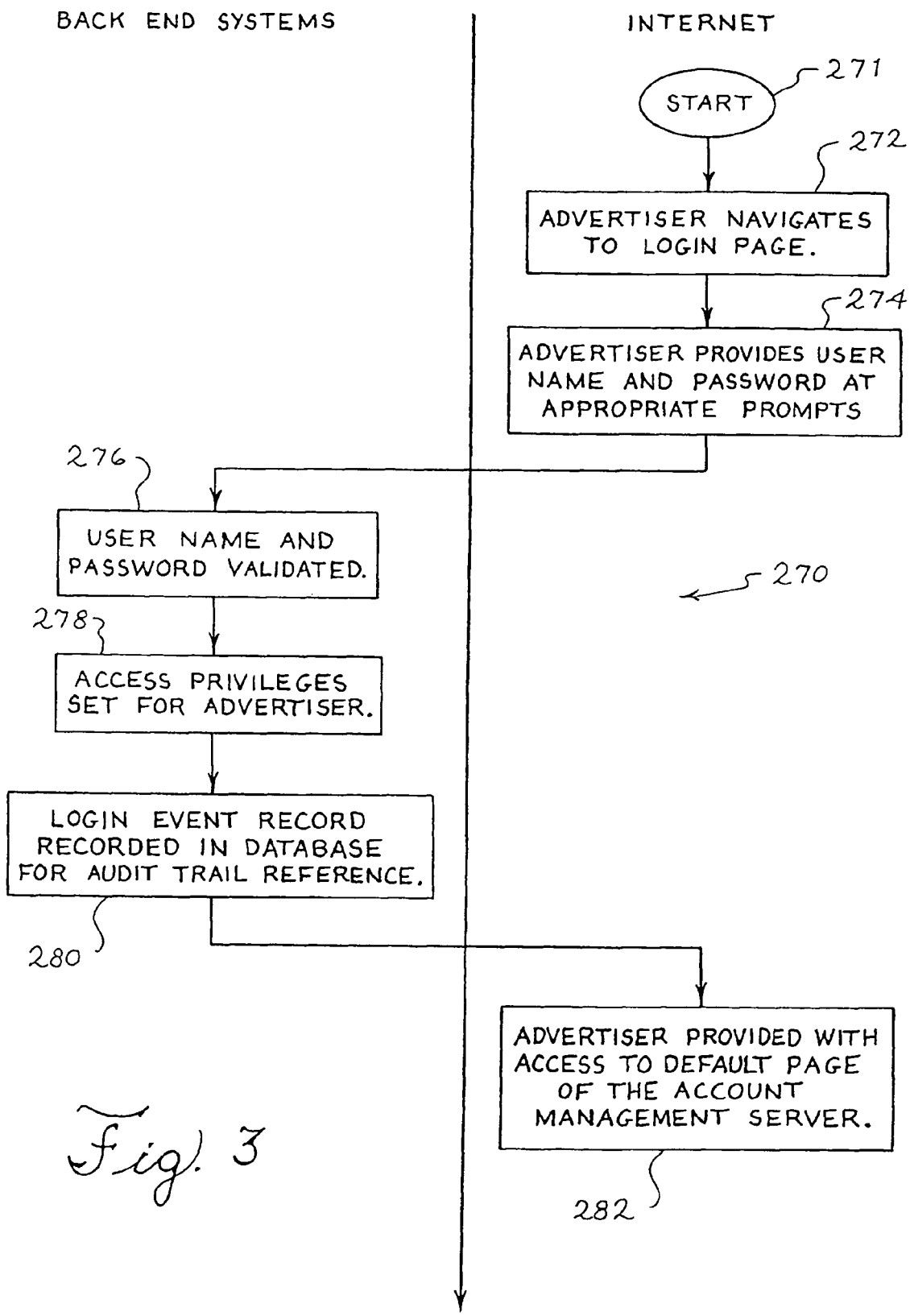
FIG. 3 is a flow chart illustrating the advertiser user login process performed in one embodiment of the present invention.
Figure 4:
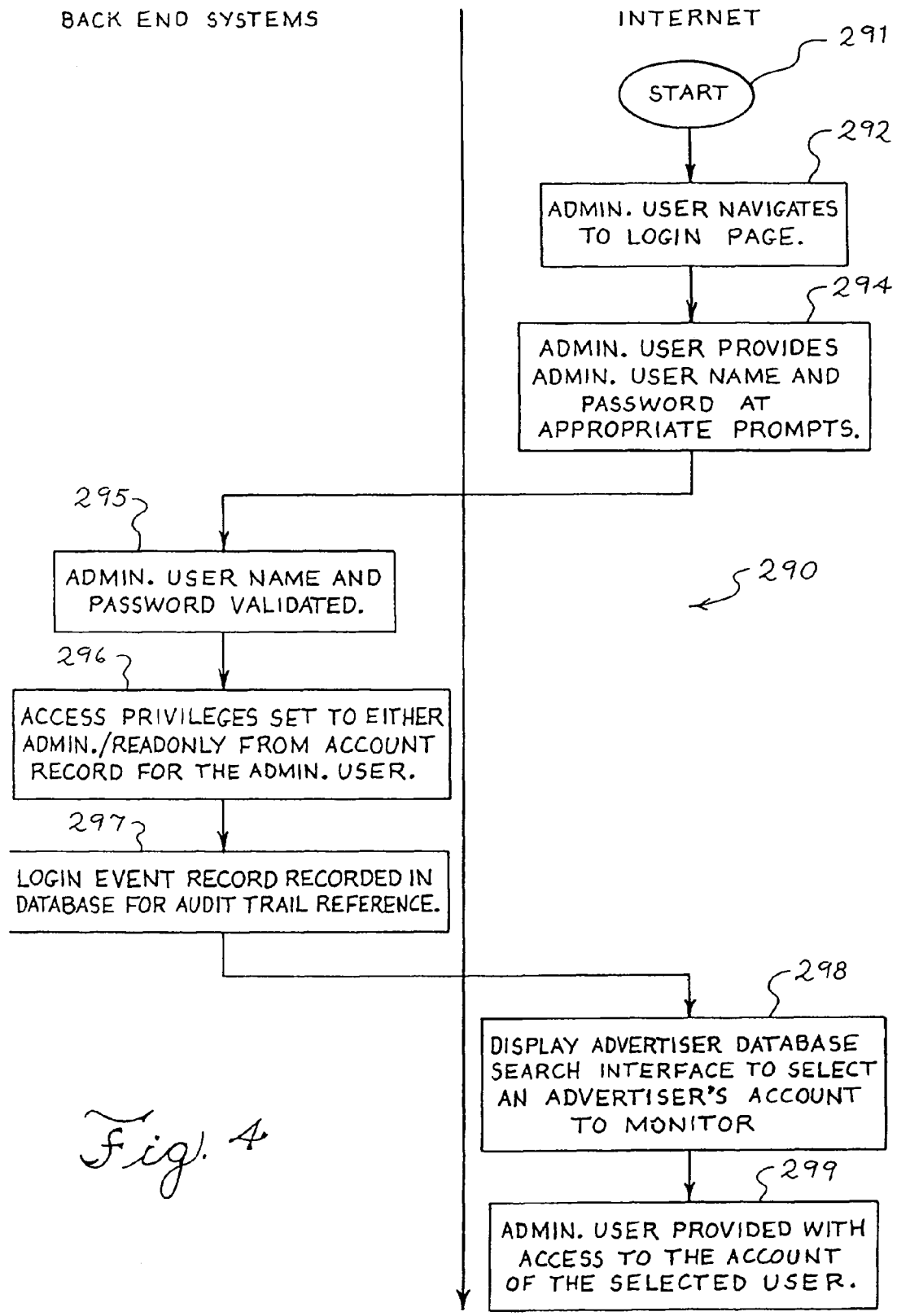
FIG. 4 is a flow chart illustrating the administrative user login process performed in one embodiment of the present invention.

The login procedure of the preferred embodiment of the present invention is shown in FIGS. 3 and 4 for two types of user. FIG. 3 shows the login procedures 270 for an advertiser. FIG. 4 shows the login procedures 290 for an administrator managing and maintaining the system and method of the present invention. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 296 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertiser's account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrator's account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor. For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present invention.

Figure 5:
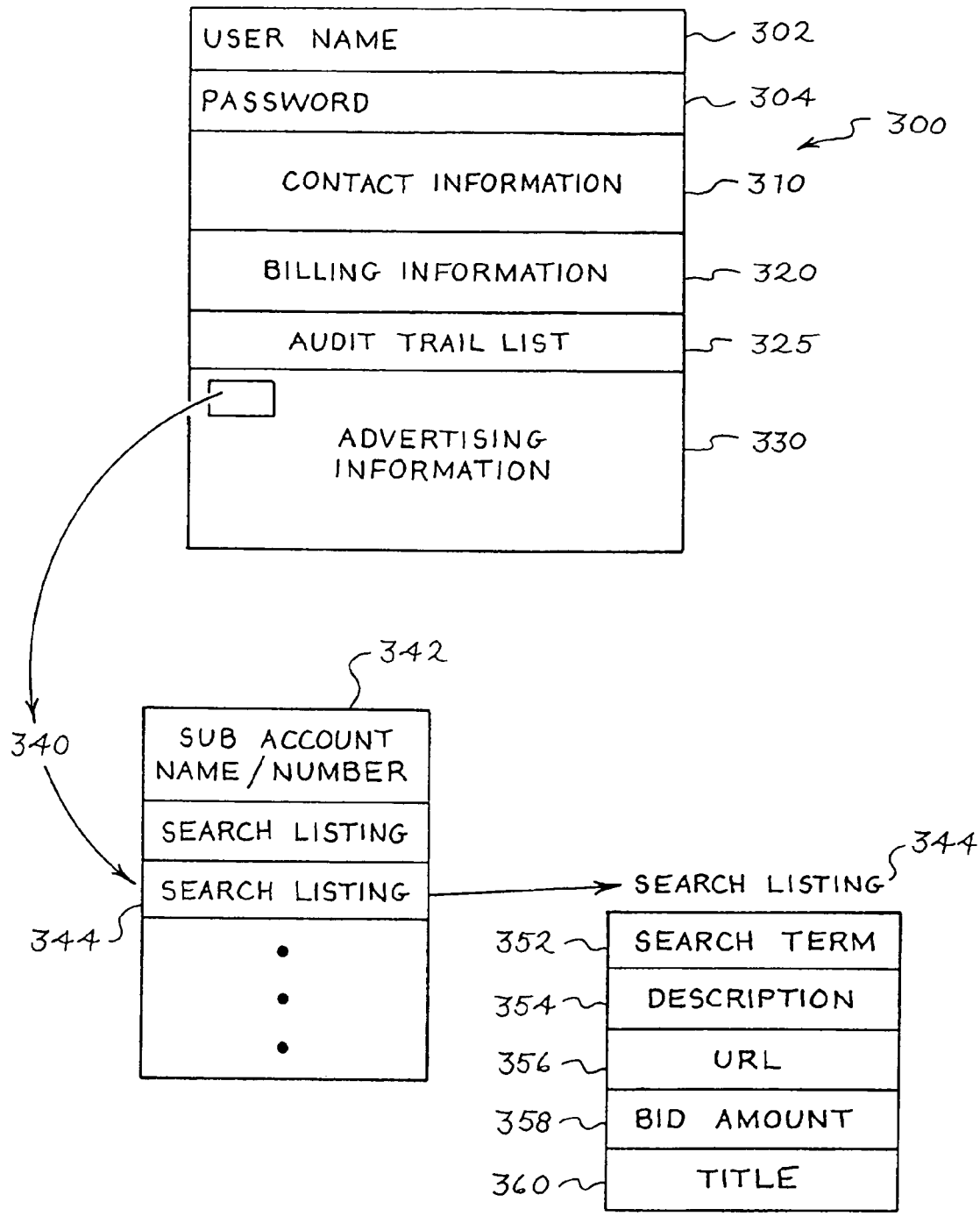
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310 (e.g., contact name, company name, street address, phone, e-mail address).

Contact information 310 is preferably utilized to direct communications to the advertiser when the advertiser has requested notification of key advertiser events under the notification option, discussed below. The account record 300 also contains billing information 320 (e.g., current balance, credit card information). The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information section 330 contains information needed to conduct the online bidding process of the present invention, wherein a position is determined for a web site description and hyperlink within a search result list generated by a search engine. The advertising data 330 for each user account 300 may be organized as zero or more subaccounts 340. Each subaccount 340 comprises at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the present invention. Alternatively, the advertising information section need not include the added organizational layer of subaccounts, but may simply comprise one or more search listings.

The search listing 344 corresponds to a search term/bid pairing and contains key information to conduct the online competitive bidding process. Preferably, each search listing comprises the following information: search term 352, web site description 354, URL 356, bid amount 358, and a title 360. The search term 352 comprises one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

The web site description 354 is a short textual description (preferably less than 190 characters) of the content of the advertiser's web site and may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed above. The URL may also be displayed as part of the advertiser's entry in a search result list.

The bid amount 358 preferably is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. Finally, a rank value is a value generated dynamically, preferably by the processing system 34 of the account management server 22 shown in FIG. 1, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value, and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect (e.g., "All search listing descriptions must clearly relate to the search term").

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded search terms, or changing a bid amount). Additional routines may be implemented to permit advertisers to display a history of transactions of a specified type, or that occur within a specified time. The transaction information may be obtained from the audit trail list 325 of FIG. 5, described above. Clickable buttons that may be implemented in software, web-based forms, and/or menus may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended (meaning the advertiser's listings will no longer appear in search result lists). Another key event for which the advertiser may wish notification is a change in position of an advertiser's listing in the search result list generated for a particular search term. For example, an advertiser may wish to have the system send a conventional electronic mail message to the advertiser if the advertiser has been outbid by another advertiser for a particular search term (meaning that the advertiser's listing will appear in a position farther down on the search result list page than previously). When one of the system-specified key events occurs, a database search is triggered for each affected search listing. The system will then execute the appropriate notification routine in accordance with the notification options specified in the advertiser's account.

Referring back to FIG. 2, a selection also appears in menu 120 that permits an advertiser to add money to the advertiser's account, so that the advertiser will have funds in their account to pay for referrals to the advertiser's site through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the search engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In the preferred embodiment of the present invention, an advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards, in a manner similar to that set forth in U.S. Pat. No. 5,724,424 to Gifford. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address). In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,836,241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertiser's billing information, and appends the billing information to the advertiser's payment history. The advertiser's updated billing information is stored to the persistent state (e.g., the account record database) from the temporary instance.

Within the function invoked at step 612, a credit card payment function may be invoked by the system at step 614. In an alternate embodiment of the present invention, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just-completed credit card transaction.

In an alternate embodiment of the present invention, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

Figure 6:
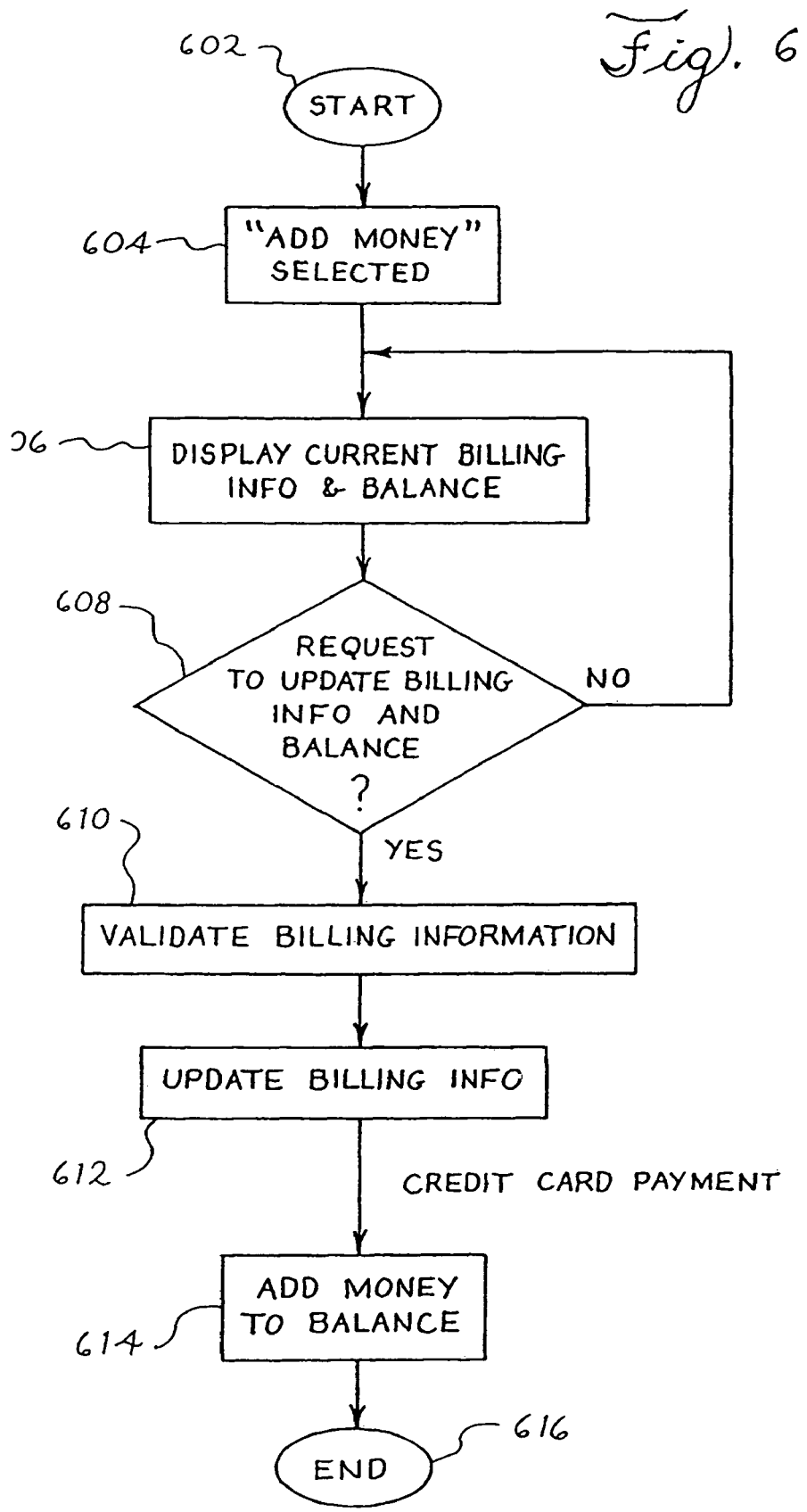
FIG. 6 is a flow chart illustrating a method of adding money to an account record used in one embodiment of the present invention.

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account management server 22. Finally, internationalization methodologies may be employed to refine searches for users outside the United States. For example, country or language-specific search results may be generated, by a cross-reference of the advertiser account database, for example.

Figure 7:
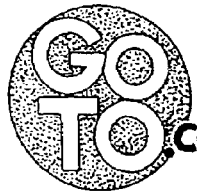
FIG. 7 illustrates an example of a search result list generated by one embodiment of the present invention.

An example of a search result list display used in an embodiment of the present invention is shown in FIG. 7, which is a display of the first several entries resulting from a search for the term "zip drives". As shown in FIG. 7, a single entry, such as entry 710a in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710a, as shown in FIG. 7. The "click through" of a search result item occurs when the remote searcher viewing the search result item display 710 of FIG. 7 selects, or "clicks" on the hyperlink 730 of the search result item display 710. In order for a "click through" to be completed, the searcher's click should be recorded at the account management server and redirected to the advertiser's URL via the redirect mechanism discussed above.

Search result list entries 710a-710h may also show the rank value of the advertiser's search listing. The rank value is an ordinal value, preferably a number, generated and assigned to the search listing by the processing system 34 of FIG. 1. Preferably, the rank value is assigned through a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value and bid amount is illustrated in FIG. 7, where each of the paid search list entries 710a through 710f display the advertiser's bid amount 750a through 750f for that entry. Preferably, if two search listings having the same search term also have the same bid amount, the bid that was received earlier in time will be assigned the higher rank value. Unpaid listings 710g and 710h do not display a bid amount and are displayed following the lowest-ranked paid listing. Preferably, unpaid listings are displayed if there are an insufficient number of listings to fill the 40 slots in a search results page. Unpaid listings. are generated by a search engine utilizing objective distributed database and text searching algorithms known in the art. An example of such a search engine may be operated by Inktomi Corporation. The original search query entered by the remote searcher is used to generate unpaid listings through the conventional search engine.

Figure 8:
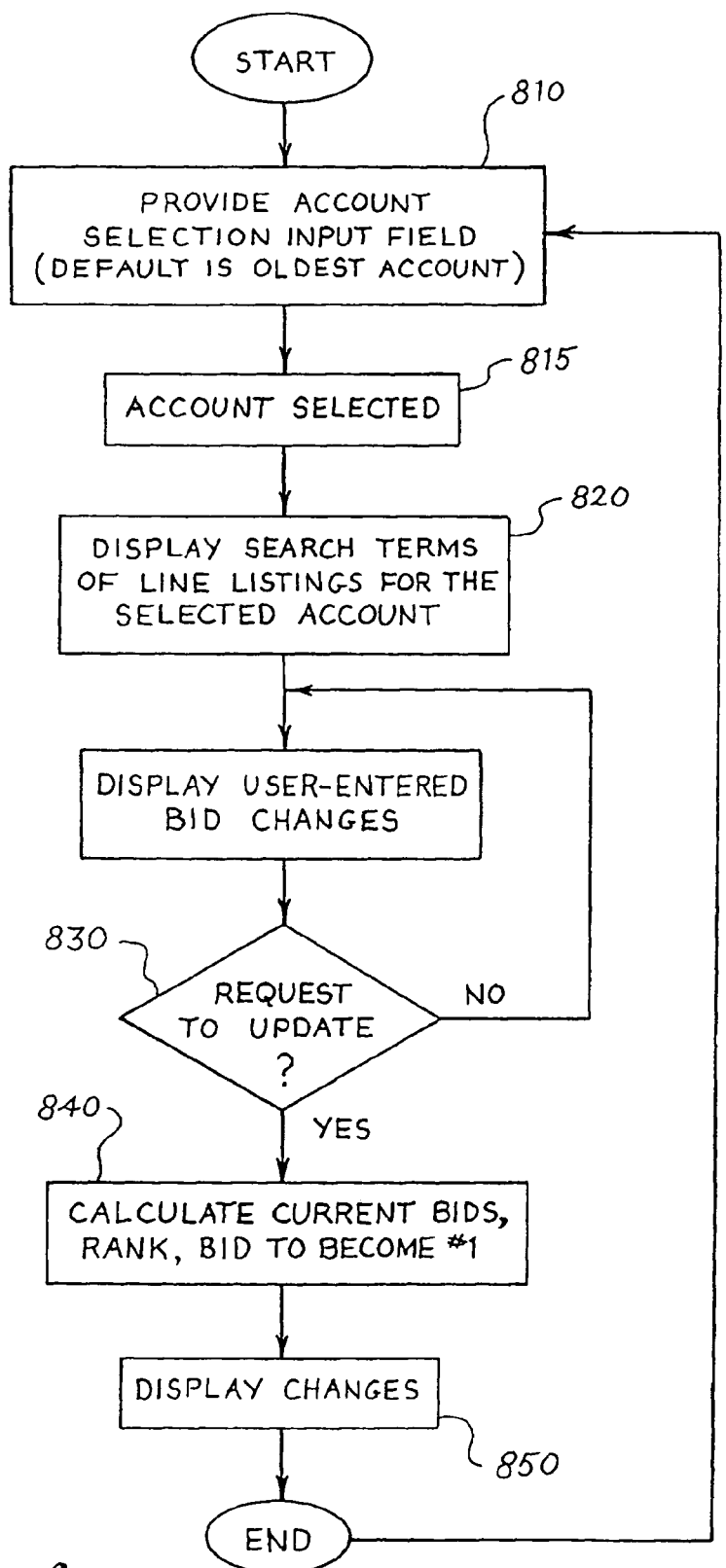
FIG. 8 is a flow chart illustrating a change bids process used in one embodiment of the present invention.

As shown in the campaign management menu 170 of FIG. 2, several choices are presented to the advertiser to manage search listings. First, in the "Change Bids" selection, the advertiser may change the bid of search listings currently in the account. The process invoked by the system for the change bids function is shown in FIG. 8. After the advertiser indicates the intent to change bids by selecting the "Change Bids" menu option, the system searches the user's account in the database and displays the search listings for the entire account or a default subaccount in the advertiser's account, as shown in step 810. Search listings may be grouped into subaccounts defined by the advertiser and may comprise one or more search listings. Only one subaccount may be displayed at a time. The display should also preferably permit the advertiser to change the subaccount selected, as shown in step 815. The screen display will then show the search listings for the selected subaccount, as indicated in step 820.

Figure 9:
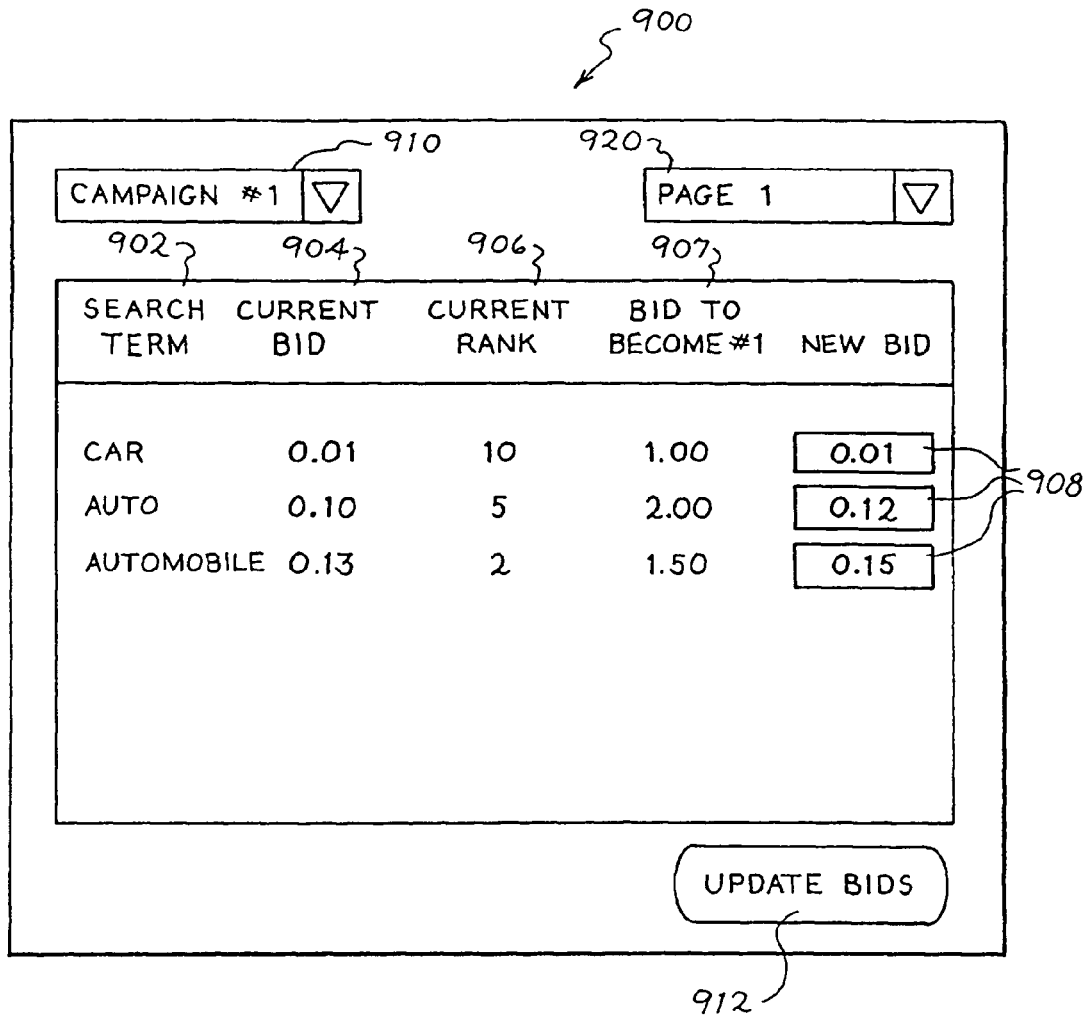
FIG. 9 illustrates an example of a screen display used in the change bids process of FIG. 8.

An example of screen display shown to the advertiser in step 810 is shown in FIG. 9 and will be discussed below. To change bids, the advertiser user may specify new bids for search terms for which the advertiser already has an existing bid by entering a new bid amount into the new bid input field for the search term. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid amounts for every search listing displayed, the rank values, and the bid amount needed to become the highest ranked search listing matching the search term field. Preferably, the system then presents a display of changes at step 850. After the user confirms the changes, the system updates the persistent state by writing the changes to the account in the database.

The search listing data is displayed in tabular format, with each search listing corresponding to one row of the table 900. The search term 902 is displayed in the leftmost column, followed by the current bid amount 904, and the current rank 906 of the search listing. The current rank is followed by a column entitled "Bid to become #1" 907, defined as the bid amount needed to become the highest ranked search listing for the displayed search term. The rightmost column of each row comprises a new bid input field 908 which is set initially to the current bid amount.

As shown in FIG. 9, the search listings may be displayed as "subaccounts." Each subaccount comprises one search listing group, with multiple subaccounts residing within one advertiser account. Each subaccount may be displayed on a separate display page having a separate page. The advertiser should preferably be able to change the subaccount being displayed by manipulating a pull-down menu 910 on the display shown in FIG. 9. In addition, search listing groups that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed search listing by entering a new bid amount into the new bid input field 908 for the search listing. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field would be replaced by a "New Rank" field, in which the advertiser enters the new desired rank position for a search term. After the advertiser requests that the ranks be updated, the system then calculates a new bid price by any of a variety of algorithms easily available to one skilled in the art. For example, the system may invoke a routine to locate the search listing in the search database having the desired rank/search term combination, retrieve the associated bid amount of said combination, and then calculate a bid amount that is N cents higher; where N=1, for example. After the system calculates the new bid price and presents a read-only confirmation display to the advertiser, the system updates the bid prices and rank values upon receiving approval from the advertiser.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a search listing via web-based forms set up for each search listing. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state (e.g., the user account database) after the advertiser approves the changes.

A process similar to those discussed above may be implemented for changing any other peripheral options related to a search listing; for example, changing the matching options related to a bidded search term. Any recalculations of bids or ranks required by the changes may also be determined in a manner similar to the processes discussed above.

In the "Delete Bidded Search Term" option, the system retrieves all of the search listings in the account of the advertiser and displays the search listings in an organization and a format similar to the display of FIG. 9. Each search listing entry may include, instead of the new bid field, a check box for the advertiser to click on. The advertiser would then click to place a check (X) mark next to each search term to be deleted, although any other means known in the art for selecting one or more items from a list on a web page may be used. After the advertiser selects all the search listings to be deleted and requests that the system update the changes, the system preferably presents a read-only confirmation of the requested changes, and updates the advertiser's account only after the advertiser approves the changes. The "deleted" search listings are removed from the search database 36 and will not appear in subsequent searches. However, the search listing will remain as part of the advertiser's account record for billing and account activity monitoring purposes.

In the "Add Bidded Search Term" option, the system provides the advertiser with a display having a number of entry fields corresponding to the elements of a search listing. The advertiser then enters into each field information corresponding to the respective search listing element, including the search term, the web site URL, the web site title, the web site description, and the bid amount, as well as any other relevant information. After the advertiser has completed entering the data and has indicated thus to the system, the system returns a read-only confirmation screen to the advertiser. The system then creates a new search listing instance and writes it into the account database and the search database upon receiving approval from the advertiser.

Preferably, the "Account Management" menu 170 of FIG. 2 provides a selection for the advertiser to "Get Suggestions On Bidded Search Term". In this case, the advertiser enters a bidded search term into a form-driven query box displayed to the advertiser. The system reads the search term entered by the advertiser and generates a list of additional related search terms to assist the advertiser in locating search terms relevant to the content of the advertiser's web site. Preferably, the additional search terms are generated using methods such as a string matching algorithm applied to a database of bidded search terms and/or a thesaurus database implemented in software. The advertiser may select search terms to bid on from the list generated by the system. In that case, the system displays to the advertisers the entry fields described above for the "Add Bidded Search Term" selection, with a form for entering a search listing for each search term selected. Preferably, the selected search term is inserted as a default value into the form for each search listing. Default values for the other search listing components may also be inserted into the forms if desired.

The "Account Management" menu 170 of FIG. 2 also preferably provides advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month (or other specified time period) for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

One embodiment of the present invention bases the cost projection algorithm on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View Search Term List" selection displays the list of the advertiser's selected search terms along with the corresponding URLs, bid price, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page 120 of FIG. 2. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions (times that the search listing appeared in a search result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, a preferred embodiment of the present invention implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

The procedures illustrated in FIGS. 10-24 may be performed in software or hardware or any combination of these.

In one embodiment, the procedures are initiated as software procedures running on the processing system 34 of the account management server 22 (FIG. 1). In other embodiments, the procedures may run on a separate machine with network access to the search listings database. The procedures together form an Automatic Flight Management function.

The procedures illustrated in FIGS. 10-24 implement an automatic flight management system in a computer database system. The method includes acts such as receiving a automatic flight management instructions from an owner associated with some search listings stored in the computer database system, monitoring the performance of the flight and making any adjustments necessary to optimize the owner/advertiser's total profit, and sending a notification to the owner periodically and upon any changes regarding the status of the flight.

In one embodiment, the computer database system is a pay for placement search system as described herein and includes a database of search listings and a search engine. The search listings are each associated with an advertiser or owner of the search listing. The search listings each include data such as a search term, a bid amount or maximum cost per clickthrough specified by the advertiser, a cost per clickthrough (CPC) and a rank or display rank. The CPC and the rank may be varied automatically depending on values specified by the advertiser and by other advertisers associated with search listings that include the same search term. For example, the system may automatically reduce the CPC of a listing to a minimum while still maintaining a specified rank. The search engine matches search terms or other portions of the search listings with a search query received from a searcher. The matching search listings are organized according to CPC and display rank and returned to the searcher. If a search listing is referred to the searcher, an economic value of an amount equal to the CPC is payable by the advertiser or owner, who may keep an account for this purpose. A referral of a search listing in this case might be an impression, such as including information about the search listing in the display results, a click through by the searcher, or some post-click through action by the searcher. This embodiment is exemplary only. The notification method may be applied to other types of database search systems as well for advising owners or others associated with listings in a database of a changed condition of a search listing.

In accordance with the present embodiment, each advertiser can create a new Automatic Flight Management function by specifying: 1) the terms $\{T_1, T_2, \ldots, T_k\}$ to be bid on for the flight, 2) the budget B for the flight, 3) the duration I of the flight, 4) the conversion rate R, and 5) the average profit/action P. The flight duration may extend across multiple days, and the advertiser can update the conversion rate R and the average profit/action P at any time.

As mentioned earlier, there are two major embodiments of automatic flight management: Optimal Flight Management and Guided Flight Management, with variations that make further efficiency improvements. In each of these embodiments, the system re-computes the optimal bids throughout the flight, to respond to dynamics of the marketplace.

Optimal Flight Management

The procedure Optimal Flight Management optimizes the advertiser's total profit. The procedure initializes the parameters of the flight, and then enters a loop. Each iteration of the loop computes the optimal bids for the terms $\{T_1, T_2, \ldots, T_k\}$ that maximize profit. This is accomplished by initializing the flight parameters for each iteration, and then computing the optimal bids. The newly computed bids are then instantiated by setting the bids for the terms in the live marketplace, and the optimal bids are set with price-protection, which maximizes the advertiser's profit by reducing the CPC of the terms, whenever this is possible without negatively impacting the rank of a term. It is possible that it is optimal to not bid on a term, in which case it is given a bid of zero. A report of the current bids is sent to the advertiser for review. The advertiser can manually override any of the bids using direct traffic center (DTC), if he so desires.

After setting the bids, the procedure waits for some time period, or a random time, or for some event (e.g., an increase in the number of searchers by the marketplace operator). For example, the system could wait for one day. At the end of this waiting period the system re-computes the remaining budget in the flight and the remaining flight duration. The process repeats itself at the next iteration, re-computing the optimal bids for the remainder of the flight. The iteration stops when the ending time of the flight is reached.

Every term has a list of possible rank/bid combinations. The array ranks&bids records the possible rank/bid combinations for every term. The value of ranks&bids($T_i$) is a list of tuples [<rank-a,bid-a>, ..., <rank-n,bid-n>] for term $T_i$. The array index defines which tuple to use for every term. The value of index($T_i$) is the tuple to user for term $T_i$. If index($T_i$)= 0, then term $T_i$ has a bid of zero (it is not selected). If index ($T_i$)=1, then the bid of the first tuple is used for $T_i$, and similarly for other values of index($T_i$).

The function "rank-of" takes as input the list of tuples [<rank-a,bid-a>, ..., <rank-n,bid-n>] and an index i. It returns the rank of the ith tuple, which is rank-i. Similarly, the function "bid-of" takes as input the list of tuples and an index i. It returns the bid of the ith tuple, which is bid-i.

Figure 10:
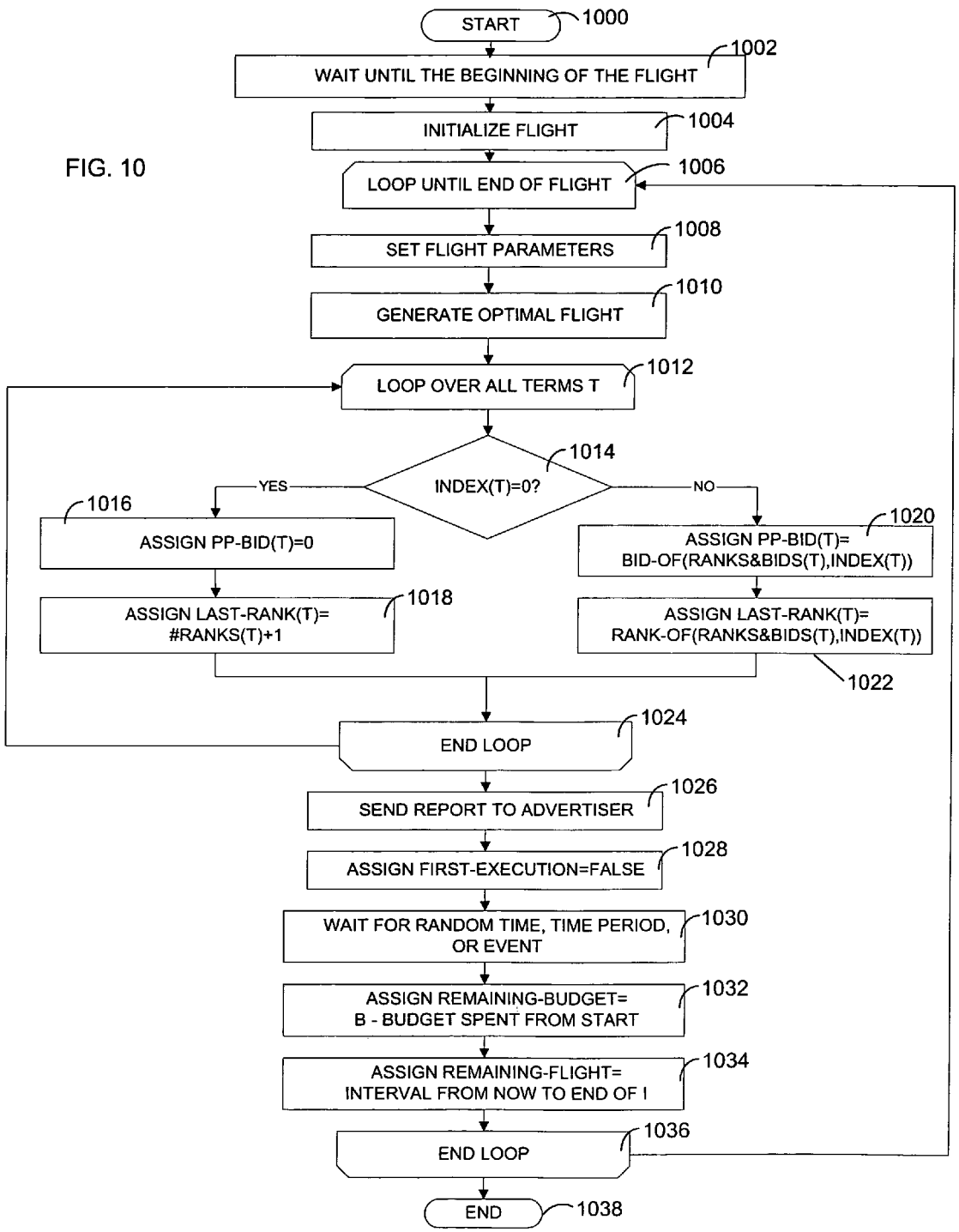
FIGS. 10-32 are flow diagrams illustrating operation of a system in accordance with the present embodiments.

One embodiment of the procedure optimal flight management is illustrated in FIG. 10. The procedure begins at block 1000. At block 1002, the procedure waits until the beginning of the advertising flight. At block 1004, a procedure initialize flight is called. One embodiment of the procedure initialize flight will be described below in conjunction with FIG. 11.

At block 1006, a looping operation begins. This loop continues until the end of the flight. At block 1008, flight parameters are initialized by calling a procedure set flight parameters. One embodiment of this procedure will be described below in conjunction with FIG. 12. At block 1010, a procedure generate optimal flight is called. One embodiment of this procedure will be described below in conjunction with FIG. 13.

At block 1012, a looping operation begins for all search terms specified by an advertiser. At block 1014, is determined if the index of the current search term is equal to 0. If so, at block 1016, a variable value PP-BID for the current such term is set equal to a value 0. At block 1018, a variable value last-rank for the current search term is set equal to the number of ranks for the current search term plus 1.

If, at block 1014, the index for the current search term is not equal to zero, at block 1020, the value of the variable PP-BID for the current search term is set equal to the value of BID-OF (ranks&bids (T), index (T)). The value last rank (T) is set equal to the value of rank-of (ranks&bids (T), index (T)). The looping operation is repeated, block 1024, until all search terms of the advertiser have been processed.

At block 1026, a report is sent to the advertiser. That report shows the current bid that is determined by the procedure. At block 1028, a flag first-execution is set to a value false. At block 1030, some time period, which may be a random time or may depend on some external event, is awaited. At block 1032, the value remaining-budget is set equal to the total budget B minus the budget spent from the start of the flight. At block 1034, the value remaining-flight is set equal to the time interval from the current time until the end of the current interval. At block 1036, the looping operation returns to block 1006 if the ending time for the flight has not been reached. When the flight end has been reached, the process ends at block 1038.

The procedure optimal flight management may also be embodied in accordance with the pseudocode shown below.

```
Procedure Optimal Flight Management ( )
   Wait until the beginning of the flight;
   Initialize Flight;
   Loop until the end of the flight
      Set flight parameters;
      Generate Optimal Flight;
      For every term T_i in {T_1,T_2,...,T_k}
         If index(T_i) = 0
            Assign price-protected-bid(T_i) = 0;
            Assign last-rank(T_i) = #ranks(T_i)+1;
         Else
            Assign price-protected-bid(T_i) =
               bid-of(ranks&bids(T_i),index(T_i));
            Assign last-rank(T_i) = rank-of(ranks&bids(T_i),index(T_i));
         End If;
      End For;
      Send report to advertiser;
      Assign first-execution = false;
      Wait for a random time, or some time period, or for an event;
      Assign remaining-budget = B - budget spent from start;
      Assign remaining-flight = interval from now to end of I ;
   End Loop;
End Procedure;
```

The procedure Initialize Flight initializes the parameters at the start of automatic flight management. This includes setting the remaining budget, setting the new duration of the flight to start from the current time, recording that this is the first time the bids for the flight will be computed, and initializing the state variables to record that every term is not currently selected (it's "last-rank" value is zero).

Figure 11:
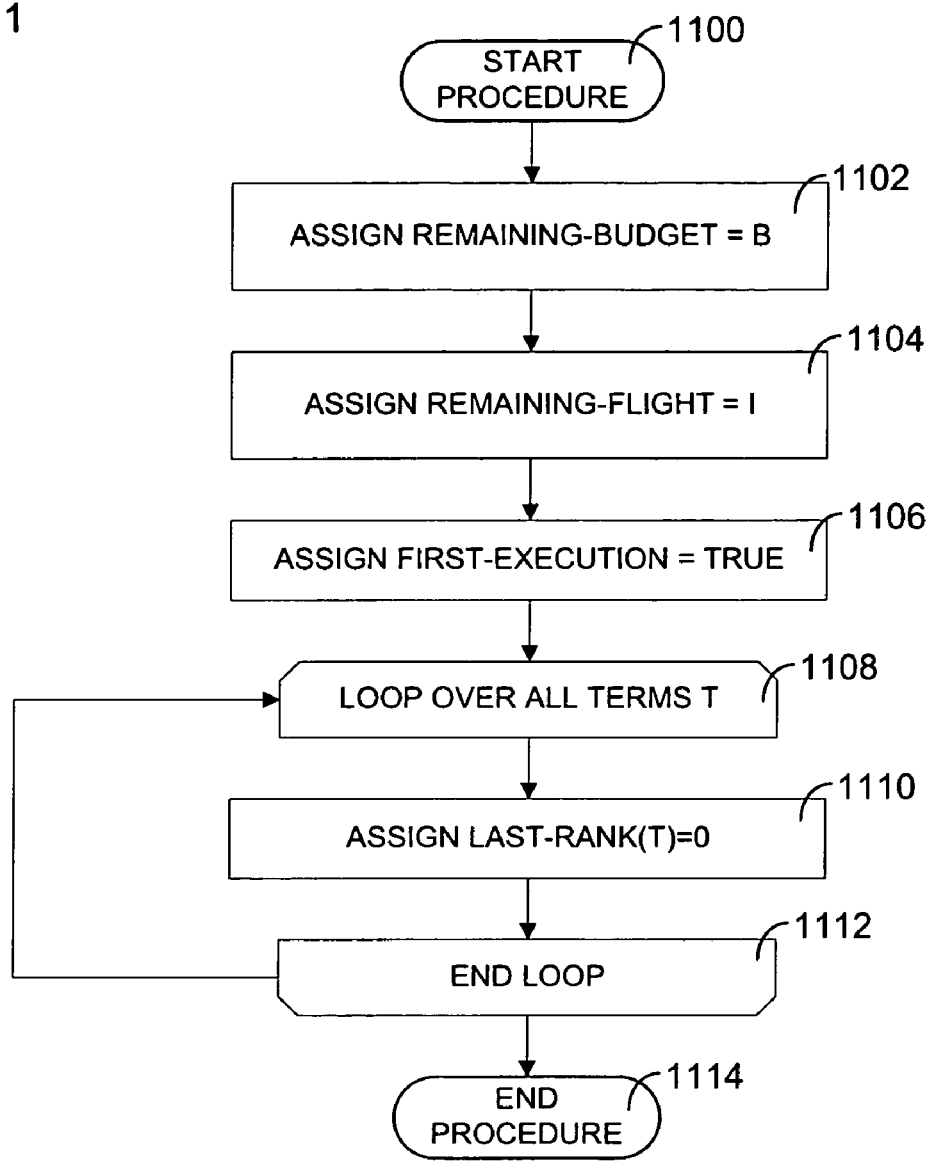

FIG. 11 shows a flow diagram illustrating one embodiment of the procedure initialize flight. The procedure begins at block 1100. At block 1102, the value of the variable remaining-budget is set equal to the value of the variable B. At block 1104, the value of the variable remaining-flight is set equal to the value of the variable I. At block 1106, the flag first-execution is set equal to a value true.

A loop begins at block 1108, processing all search terms of the advertiser index by the variable T. At block 1110, the variable last-rank (T) is initialized to a value zero. At block 1112, the looping operation continues, returning control to block 1108. The procedure initialize flight ends at block 1114.

Another embodiment of the procedure initialize flight is illustrated in the pseudocode below.

```
Procedure Initialize Flight ( )
   Assign remaining-budget = B ;
   Assign remaining-flight = I ;
   Assign first-execution = true;
   For every term T_i in {T_1,T_2,...,T_k}
      Assign last-rank(T_i) = 0;
   End For;
End Procedure;
```

The procedure Set Flight Parameters resets the parameters at the start of every execution of automatic flight management. As mentioned earlier, the optimal bids for the terms are recomputed periodically throughout a flight. Before each computation, the current state of the marketplace and any feedback from the advertiser are used to update the parameters used to compute the optimal bid values.

At any time the advertiser can update the conversion rate of any term at any rank. This can take into account the latest information from the advertiser's web site. The system first computes $R_{max}$, the highest conversion rate, $R(T_i,j)$, of any term $T_i$ in $\{T_1, T_2, \ldots, T_k\}$ at any rank j. It next "normalizes" the number of clicks and bid of every term at every rank, so that all terms at all ranks have the same conversion rate $R_{max}$. The normalization involves multiplying the number of clicks of every term $T_i$ at every rank j by the factor $$\frac{R(T_i, j)}{R_{max}},$$

and multiplying the bid of every term $T_i$ at every rank j, by the factor $$\frac{R_{max}}{R(T_i, j)}.$$

The procedure historical-clicks uses historical data from the marketplace to estimate the number of clicks for a given term and rank over a time period. The procedure current-bid returns the current bid of a term at a rank.

Figure 12:
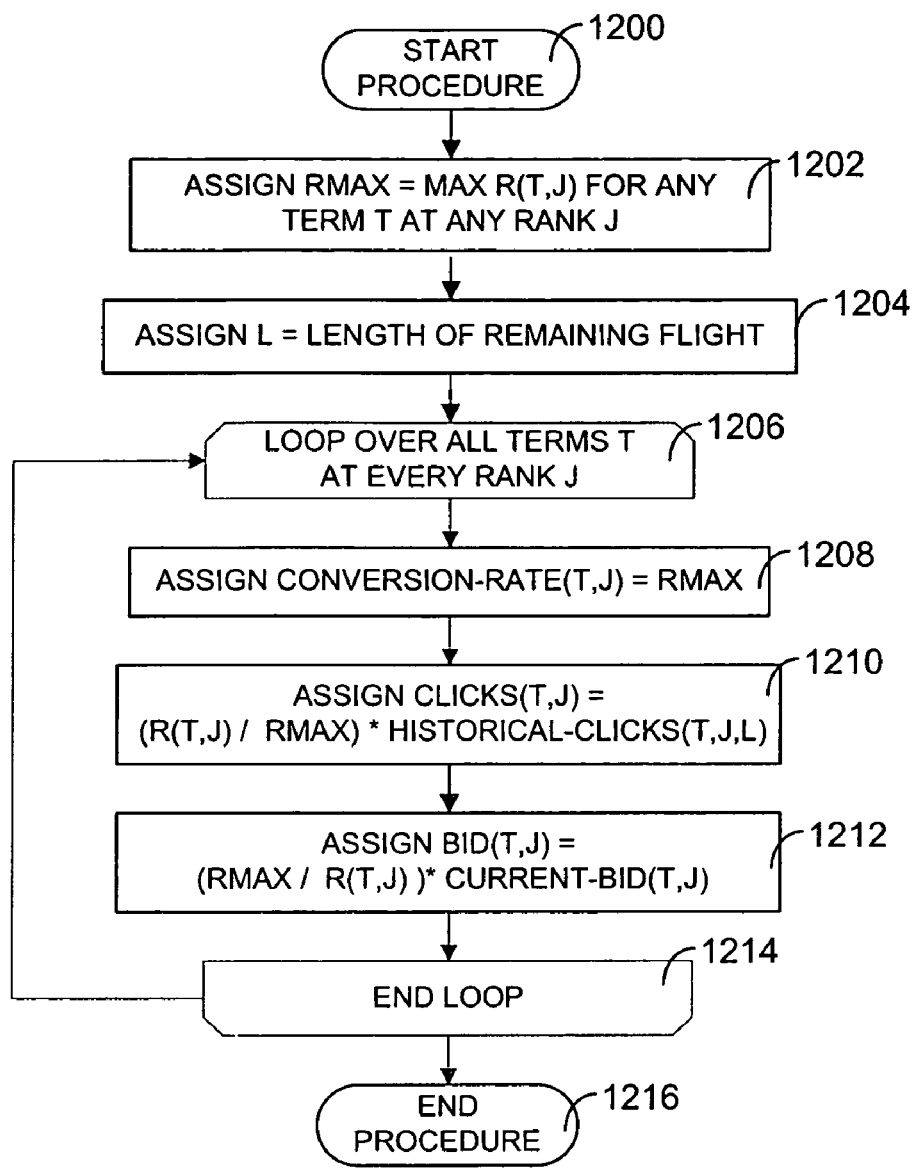

FIG. 12 is a flow diagram illustrating one embodiment of the procedure set flight parameters. The procedure begins at block 1200. At block 1202, the variable $R_{max}$, corresponding to the highest conversion rate, is set equal to the maximum conversion rate for any search term T at any rank J. At block 1204, the variable L is set equal to the length of the remaining flight.

A looping operation begins at block 1206, looping over all search terms T and all ranks J. At block 1208, the conversion-rate for the current term and rank is set equal to the maximum conversion rate, $R_{max}$. At block 1210, the variable clicks for the current search term and rank is set equal to the ratio of the conversion rate for the current term and rank to the maximum conversion rank multiplied by the total number of clicks for the current search term, rank and the current remaining length of the flight. At block 1212, the current bid for the search term T at rank J is set equal to the ratio of the maximum conversion rate to the current conversion rate for the search term T at rank J multiplied by the current bid for the search term T at the current rank J. At block 1214, the looping operation returns control to block 1206 until all search terms at every rank have been processed. The procedure set flightparameters ends at block 1216.

A second embodiment of the procedure set flight parameters is illustrated in the pseudocode below.

---

Procedure Set Flight Parameters ( )
Assign $R_{max}$ = maximum $R(T_i, j)$ of any term $T_i$ at any rank j;
Assign L = length of remaining-flight;
For every term in $T_i$ in $\{T_1, T_2, \ldots, T_k\}$ at every rank j
    Assign conversion-rate$(T_i, j) = R_{max}$;

$$\text{Assign clicks}(T_i, j) = \frac{R(T_i, j)}{R_{max}} * \text{historical-clicks}(T_i, j, L);$$

$$\text{Assign bid}(T_i, j) = \frac{C_{R,max}}{C_{R,i,j}} * \text{current-bid}(T_i, j);$$

End Procedure;

---

The procedure Generate Optimal Flight computes the optimal bids for the terms $\{T_1, T_2, \ldots, T_k\}$ to maximize the advertiser's total profit. The procedure first initializes the calculation parameters—these keep track of the best bids found so far, and the possible ranks that the advertiser can be bid at for each term, and the minimum bids for these ranks.

The main body of the procedure is a loop. Each cycle of the loop examines a new combination of bids for the terms. If the current combination is the best so far, then it is recorded as the new best combination. When all combinations have been examined, the procedure terminates and returns the best combination found.

Each cycle of the loop first examines the current combination of bids for every term $\{T_1, T_2, \ldots, T_k\}$. It computes the total number of clicks, the average bid, the total cost, and the total advertiser profit for the current combination. The current combination is ignored if its average bid is greater than the maximum average CPC specified by the advertiser (C), or the total cost is greater than the remaining budget. Otherwise, the current combination is compared to the previous best combination. If the current combination is better, then it replaces the previous best combination with the current combination. The last step of the loop picks a new combination of bids for the terms $\{T_1, T_2, \ldots, T_k)\}$. The procedure exits and returns the best combination of bids when it has finished examining all combinations.

Figure 13:
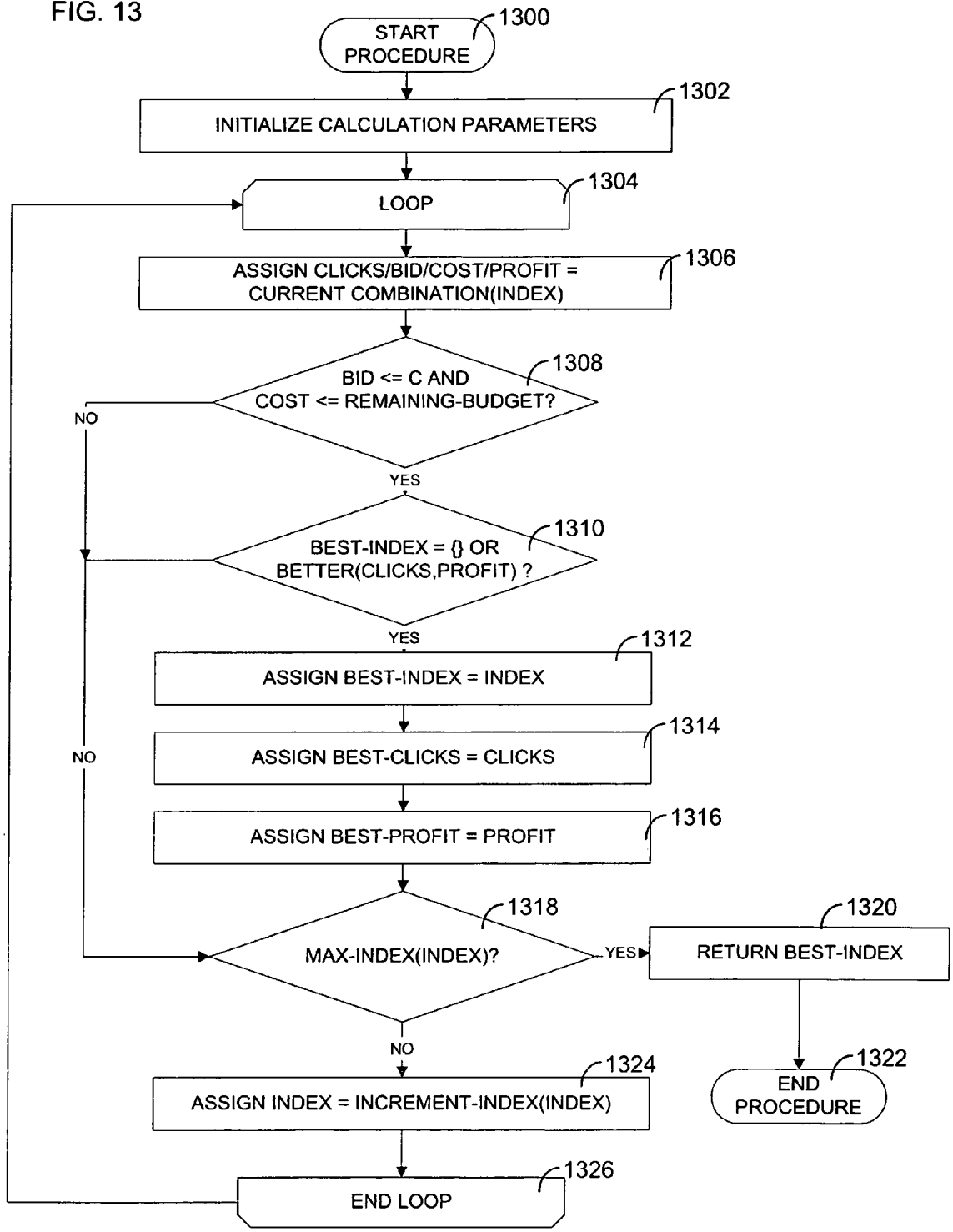

FIG. 13 is a flow diagram illustrating one embodiment of the procedure generate optimal flight The procedure begins at block 1300. At block 1302, a procedure initialize calculation parameters is called. One embodiment of this procedure will be described below in conjunction with FIG. 15.

At block 1304, a looping operation is entered. At block 1306, the values of the variables clicks/bid/cost/profit is set equal to the resulting values returned by a procedure current combination. One embodiment of this procedure will be described below in conjunction with FIG. 17. At block 1308, a comparison is made to determine if the current bid is less than or equal to the maximum cost per click specified by the advertiser and if the cost of the flight is less than or equal to the remaining budget. If not, control proceeds to block 1318. Otherwise, at block 1310, the comparison is made to determine if the current combination is better than the previous best combination. A procedure better is called to perform this operation. One embodiment of the procedure better will be described below in conjunction with FIG. 14. If a comparison of block 1310 does not produce a true result, control proceeds to block 1318. Otherwise, at block 1312, the value of the variable best-index is set equal to the index of the current combination. Similarly, at block 1314, the value of the variable best-clicks is set equal to the value of the variable clicks for the current combination and at block 1316, the value of the variable best-profit is set equal to the value of the variable profit for the current combination.

At block 1318, it is determined if all combinations have been examined. If not, the value of the variable index is incremented at block 1324 and at block 1326 the looping operation returns to block 1304 to process another combination. If, at block 1318, all combinations have been considered, at block 1320, the index of the best combination of terms and bids is returned by the procedure. The procedure ends at block 1322.

A second embodiment of the procedure generate optimal flight is illustrated by the pseudocode below.

```
Procedure Generate Optimal Flight (Terms)
    Initialize Calculation Parameters;
    Loop
        Assign clicks/bid/cost/profit = current combination(index);
        If bid <= C and cost <= remaining-budget
            If best-index = { } or better(clicks,profit)
                Assign best-index = index;
                Assign best-clicks = clicks;
                Assign best-profit = profit;
            End If;
        End If;
        If max-index?(index) return best-index;
        Assign index = increment-index(index, T₁);
    End Loop;
End Procedure;
```

The procedure Better checks if the current combination is better than the best combination seen in the past. The advertiser can specify the average profit/action P for searchers transferred to the advertiser's web site If the advertiser has not specified the average profit/action (the value of P is minus one), then the current combination is better if it has more clicks. Otherwise, the current combination is better if it leads to a higher total profit for the advertiser.

Figure 14:
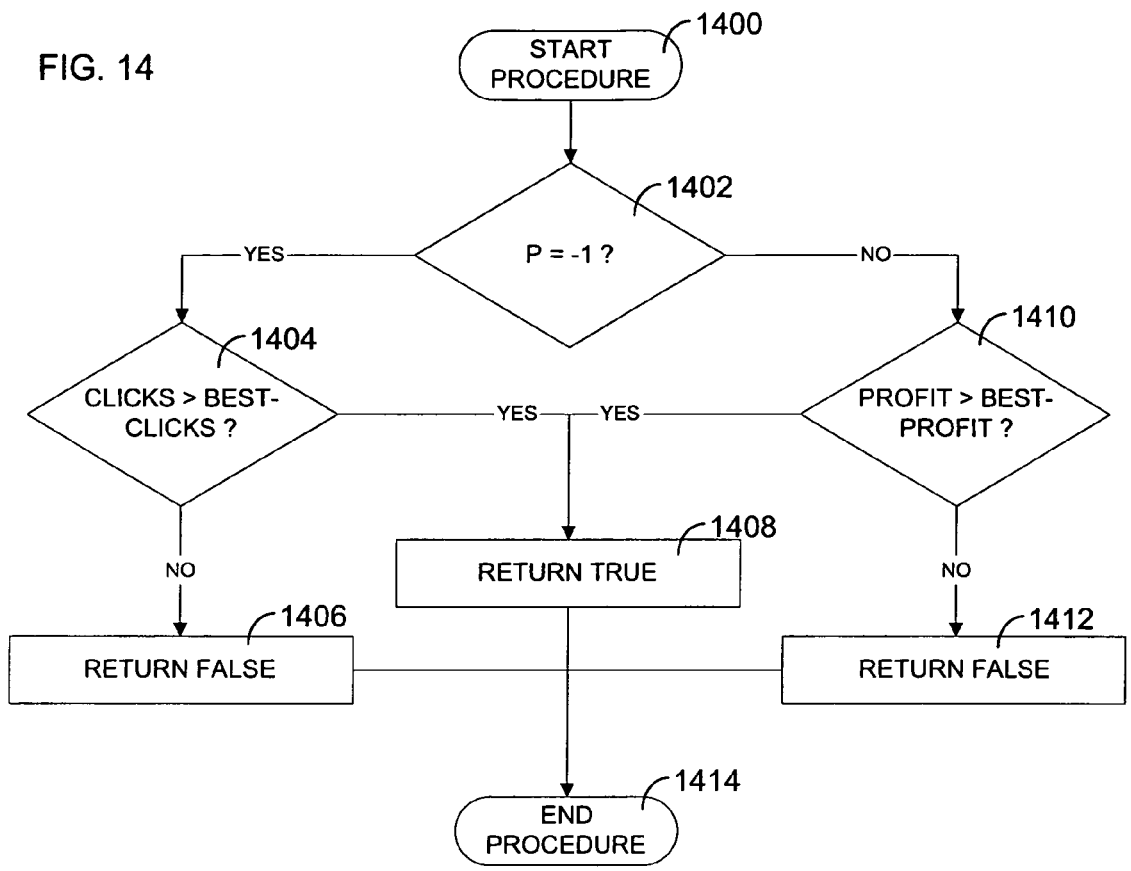

One embodiment of the procedure better is illustrated in flow chart of FIG. 14. The procedure begins at block 1400. At block 1402, the value of the variable P, corresponding to the average profits per action is compared with the value −1. If P is equal to −1, at block 1404, it is determined if the value of the variable clicks is greater than the value of the variable best-clicks. If not, at block 1406, the procedure returns the logical value false. If clicks is greater than best-clicks, at block 1408, the procedure returns the logical value true. If, at block 1402, P is not equal to −1, at block 1410, it is determined if the value of the variable profit is greater than the value of the variable best-profit. If not, at block 1412, the procedure returns the logical value false. If profit is greater than best-profit at block 1410, at block 1408, the procedure returns the logical value true. The procedure ends at block 1414.

An alternative embodiment of the procedure better is shown in the pseudocode below.

```
Procedure Better(clicks,profit)
    If P = −1
        If clicks > best-clicks return True Else return False;
    Else If profit > best-profit return True Else return False;
    End If;
End Procedure;
```

The procedure Initialize Calculations resets the parameters at the start of computing the optimal bids. First, it records that no best combination of bids (best-index) has been found so far, and that no clicks and profit have been recorded for any combination. The second step is to compute the possible ranks, and the minimum bids for these possible ranks, for every term $\{T_1, T_2, \ldots, T_k\}$. It also records the number of possible ranks that the advertiser can bid on (#ranks). The last step sets the current combination to have a zero bid for every term (index($T_i$) is set to zero for every term).

Figure 15:
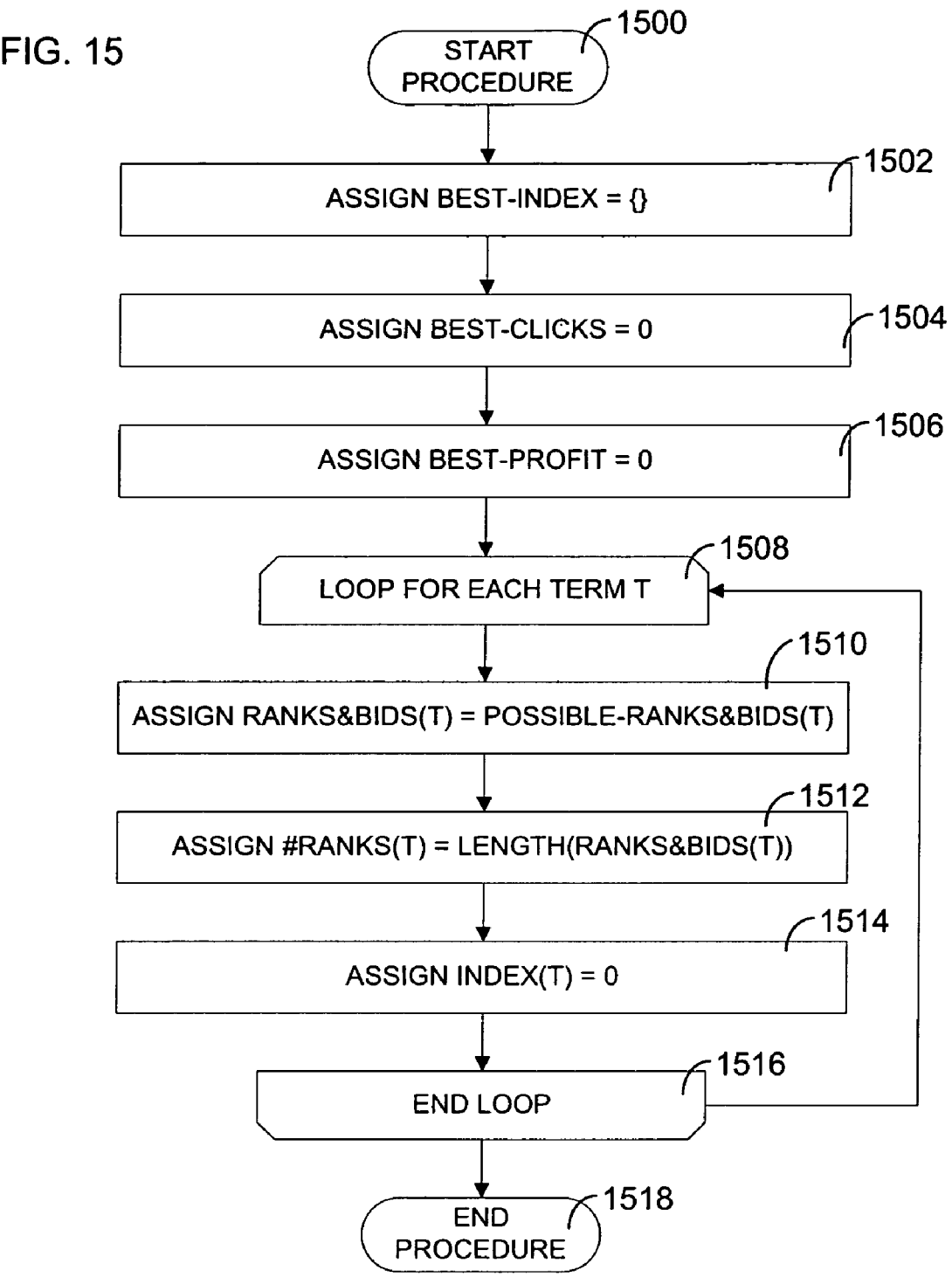

FIG. 15 is a flow diagram illustrating one embodiment of a procedure initialize calculation parameters. The procedure begins at block 1500. At block 1502, the variable best-index is set to an empty value. At block 1504 the variable best-clicks is initialized to 0. At block 1506, the variable best-profit is initialized to 0 as well. A looping operation begins at block 1508. At block 1510, the variable ranks&bids for the current search term is set equal to the value returned by a procedure possible-ranks&bids. One embodiment of the procedure possible-ranks&bids is shown below in conjunction with FIG. 16. At block 1512, the variable #ranks for the current search term is set equal to the length of the array ranks&bids for the current search term. At block 1514, the contents of the index array for this current search term is initialized to 0. At block 1516, the looping operation ends and control is returned to block 1508 until all search terms have been processed. The procedure ends at block 1518.

Another embodiment of the procedure initialize calculation parameters is shown in the pseudocode below.

```
Procedure Initialize Calculation Parameters( )
    Assign best-index = { };
    Assign best-clicks = 0;
    Assign best-profit = 0;
    For each term Tᵢ in {T₁,T₂,...,Tₖ}
        Assign ranks&bids(Tᵢ) = possible-ranks&bids(Tᵢ);
        Assign #ranks(Tᵢ) = length(ranks&bids(Tᵢ));
        Assign index(Tᵢ) = 0;
    End For;
End Procedure;
```

The procedure Possible Ranks & Bids computes the possible ranks that a new advertiser can be at for a term $T_i$, and the minimum bids for these ranks. The term $T_i$ has some existing bids in the marketplace for rank 1 to some maximum number of ranks r. It is always possible to be at rank r+1 by selecting the minimum bid. It is also possible to be at rank 1 by selecting the current bid for rank 1 plus $0.01. It may or may not be possible to be at other ranks in between rank 1 and rank r. For example, if the current listings at rank 3 and rank 4 have a bid of $0.35, then it is not possible for a new advertiser to be at rank 4. The new advertiser can only be at rank 3 or rank 5, because all listings with the same bid are ordered chronologically. For any two listings with the same bid, the one with the earlier time at which its bid was set has a better rank.

The procedure starts by finding the existing bids for every rank. These existing bids are then sorted from minimum bid (for the worst rank) to the maximum bid (for rank 1). The variable "worst-rank" records the number of the worst rank. The procedure next initializes the loop variables "current-rank", "current-bid", and "ans" (the answer).

The procedure loops through every existing bid, starting from the second-lowest bid (rest(bids)) to the highest bid. At each iteration of the loop, the system checks if the bid for a rank is the same as the bid for the next worse rank. If it is not, then there is "room" to add the new advertiser at the next worse rank with a bid of one cent over the current bid for the next worse rank. At the end of each iteration, the procedure sets the current rank to be one rank better than the current rank, and assigns "bid" to the bid of the current rank.

The procedure returns the list of possible ranks, and the minimum bid to be at this rank. Each element of the list is a tuple: <rank,bid>. This list of tuples is sorted from the lowest bid to the highest bid.

Figure 16:
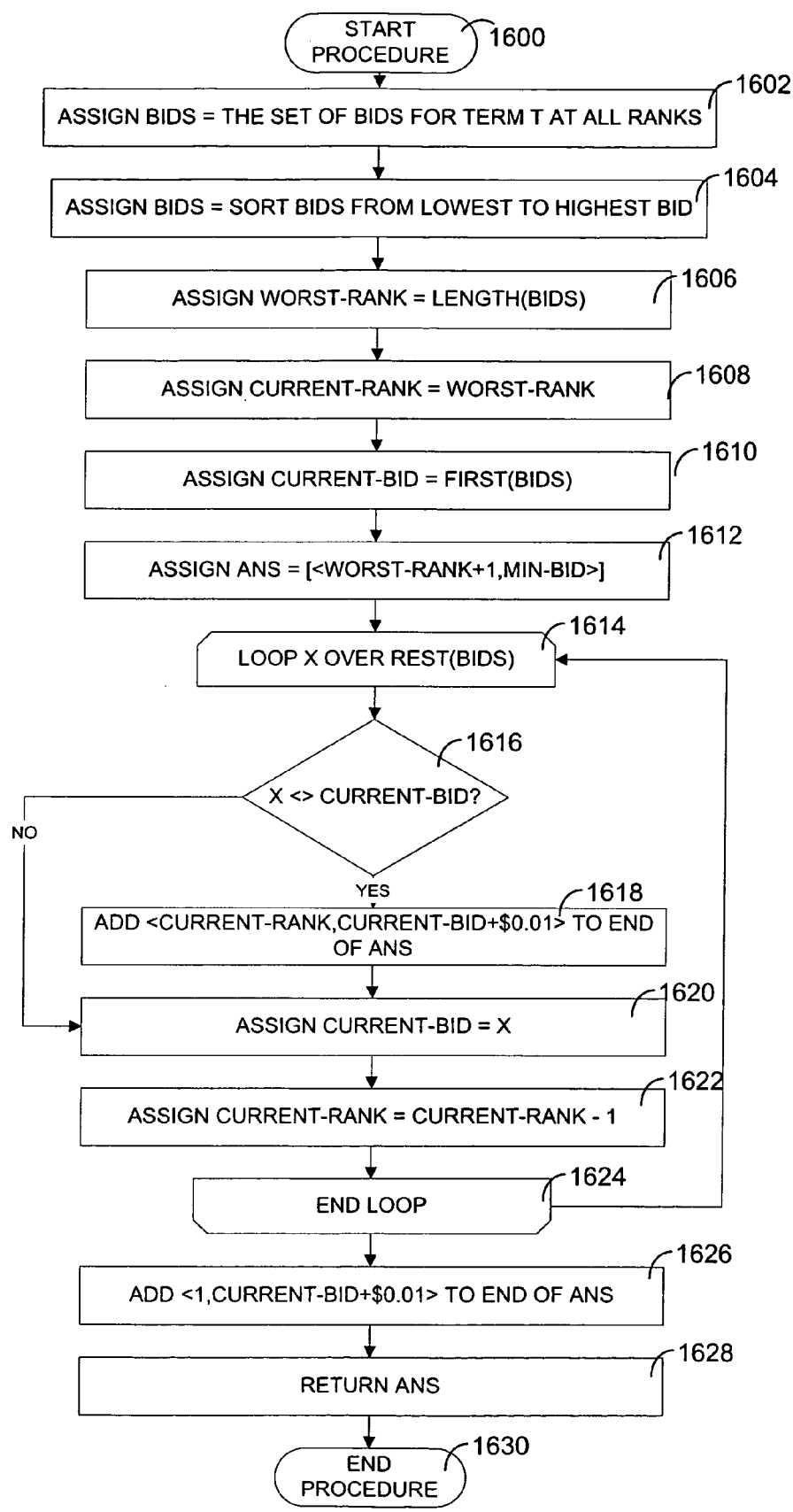

FIG. 16 is a flow diagram illustrating one embodiment of a procedure possible ranks&bids. The procedure begins at block 1600. At block 1602 the value of the variable bids is set equal to the set of bids for the current search term T at all ranks. At block 1604, the bids are sorted from lowest to highest bid. At block 1606, the variable worst-rank is set equal to the rank of the lowest rank bid. At block 1608, the variable current-rank is initialized to the value of worst-rank. At block 1610, the variable current-bid is initialized to the first entry in the array bids. At block 1612, the variable is initialized to the pair of values: the value of worst-rank plus one, and the minimum bid.

A looping operation begins at block 1614, using the variable x over the set of other bids. At block 1616, the variable x is compared with the value of the current bid. If x is equal to the current-bid, control proceeds to block 1620. If x is not equal to the current-bid, at block 1618 the pair of values current-rank and current-bid plus the minimum possible bid value are added to the end of the array ans. At block 1620, the value of the variable current-bid is set equal to the value of x. At block 1622, the value of the variable current-rank is decremented by 1. The looping operation ends at block 1624 and control is returned to block 1614, unless the highest bid has been reached.

At block 1626, an entry having a pair of values consisting of rank 1 and a bid equal to the current bid plus the minimum bid amount is added to the array ans. At block 1628, the procedure returns the array ans. The procedure ends at block 1630.

A second embodiment of the procedure possible ranks&bids is shown in accordance with the pseudocode.

```
Procedure Possible Ranks & Bids(T_i)
  Assign bids = the set of bid(T_i,j) for all ranks j ;
  Assign bids = sort bids from lowest to highest bid;
  Assign worst-rank = length (bids);
  Assign current-rank = worst-rank;
  Assign current-bid = first(bids);
  Assign ans = [<worst-rank + 1,min-bid>];
  Loop x over rest(bids);
    If x <> current-bid
      Add <current-rank,current-bid + $0.01> to end of ans;
    End If;
    Assign current-bid = x;
    Assign current-rank = current-rank – 1;
  End Loop;
  Add <1,current-bid + $0.01> to end of ans;
  Return ans;
End Procedure;
```

The procedure Current Combination takes as input the current combination, which is the bid/rank combination for every term $\{T_1, T_2, \ldots, T_k\}$, and computes its: 1) total number of clicks, 2) average bid, 3) total cost, and 4) total advertiser profit. The total number of clicks is the sum of the clicks for each term at its selected rank over the remaining flight duration. The total cost is the sum of the costs of each of the terms at its selected rank over the remaining flight duration. The average bid is the total cost divided by the total number of clicks. The total advertiser profit is the sum of the profit for each term.

The previous procedure Possible Ranks & Bids calculates the list of possible <rank,bid> tuples for a term. The procedure Initialize Calculation Parameters initialized ranks&bids ($T_i$) to the list of possible <rank,bid> tuples for term $T_i$. The "current combination" being considered is defined by the selected <rank,bid>tuple for each term. The tuple selected for term $T_i$ is defined by index($T_i$). If index($T_i$)=0, then term $T_i$ has a bid of zero (it is not selected in the current combination). If index($T_i$)=1, then the first tuple ranks&bids(1) defines the bid and rank for term $T_i$, and similarly for other values of index($T_i$). Recall that the list of tuples are sorted by increasing bid, so the first tuple has the lowest bid, which corresponds to the worst rank.

At iteration i the procedure extracts the current rank and bid of term $T_i$. The number of clicks of $T_i$ at its current rank, over the remaining flight time (L), is estimated from the historical marketplace data. The cost for $T_i$ is the number of clicks times the bid. The profit for $T_i$ is the product of: 1) number of clicks and 2) the profit/action times the conversion rate, minus the bid. At the end of the iteration the total cost is incremented by the cost for $T_i$, the total clicks is incremented by the clicks for $T_i$, and the total profit is incremented by the profit for $T_i$.

The loop terminates when all terms $T_i$ in $\{T_1, T_2, \ldots, T_k\}$ have been considered. The procedure finally returns four values: 1) the total clicks, 2) the average bid, 3) the total cost, and 4) total profit for the terms $\{T_1, T_2, \ldots, T_k\}$.

Figure 17:
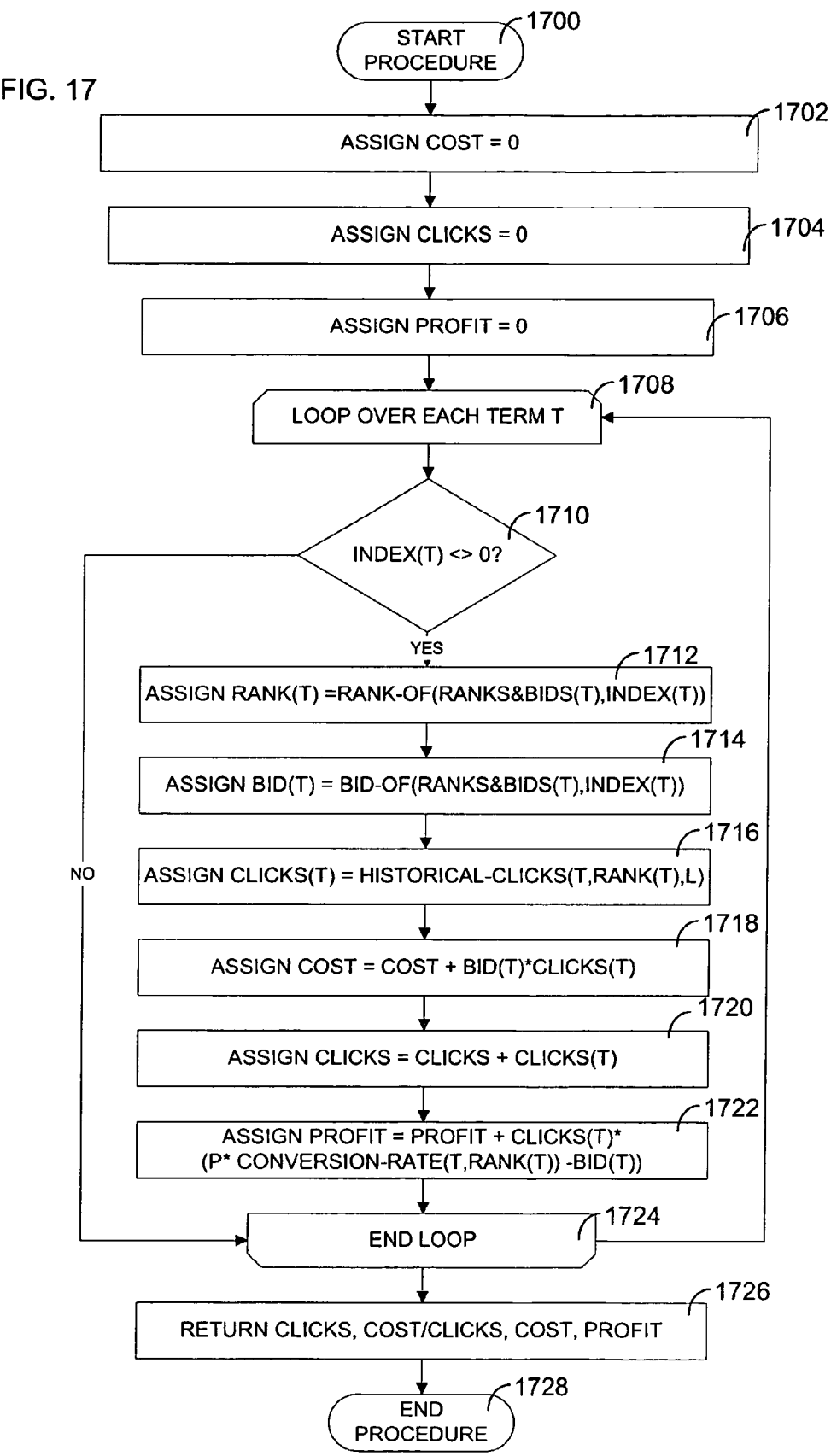

FIG. 17 is a block diagram showing one embodiment of the procedure current combination. The procedure begins at block 1700. At block 1702, the variable cost is initialized to a value of 0. At block 1704, the variable clicks is initialized to a value of 0. At block 1706, the variable profit is initialized to a value of 0.

At block 1708, a looping operation begins, using search terms of the advertiser as the looping index. At block 1710, it is determined if the index value for the current search term is not equal to 0. If the index for the current search term is equal to 0, control proceeds to block 1724. Otherwise, at block 1712, the variable rank is assigned the rank of the index(T) element of the array ranks&bids for the search term T. At block 1714, the variable bid is assigned the bid of the index(T) element of the array ranks&bids for the search term T. At block 1716, the number of clicks for the search term T at the current rank is estimated. At block 1718, the current cost value is set equal to the sum of the cost and the product of the bid and number of clicks for the search term T. At block 1720, the number of clicks is incremented by the number of clicks for the search term T. Finally, at block 1722, the profit is incremented by the product of the number of clicks and the profit per action multiplied by the conversion rate, minus the bid for the search term. At block 1724, control returns to block 1708 for another iteration to the loop when the value of the variable index for the current search term is equal to 0, the loop is exited and, at block 1726, the procedure returns the values of the four variable clicks, cost per clicks, cost and profit. The procedure ends at block 1728.

A second embodiment of the procedure current combination is shown in the pseudocode below.

```
Procedure Current Combination(index)
  Assign cost = 0;
  Assign clicks = 0;
  Assign profit = 0;
  Loop over each term T_i in {T_1,T_2,...,T_k}
    If index(T_i) <> 0
      Assign rank(T_i) = rank-of(rankS&bids(T_i),index(T_i));
      Assign bid(T_i) = bid-of(rankS&bids(T_i),index(T_i));
      Assign clicks(T_i) = historical-clicks(T_i,rank(T_i),L);
      Assign cost = cost + bid(T_i)* clicks(T_i);
      Assign clicks = clicks + clicks(T_i);
      Assign profit = profit +
         clicks(T_i)*(P* conversion-rate(T_i,rank(T_i))– bid(T_i));
    End If;
  End For;
  Return clicks, cost/clicks, cost, profit;
End Procedure;
```

The procedure Max-Index? Checks if there are no more combinations to consider. The starting combination has a zero bid for all terms. There are no more combinations if the current combination is at rank 1 for all terms.

As mentioned earlier, the "current combination" is defined by the selected <rank,bid> tuple for each term. The tuple selected for term $T_i$ is defined by index($T_i$). If index($T_i$)=0, then term $T_i$ has a bid of zero (it is not selected in the current combination). If index($T_i$)=1, then the first tuple ranks&bids (1) defines the bid and rank for term $T_i$, and similarly for other values of index($T_i$). There are no more combinations if the index for every term is at its maximum value. This corresponds to every term being bid to rank 1 (recall that the list of tuples is sorted from the lowest bid to highest bid—which corresponds to rank 1).

Figure 18:
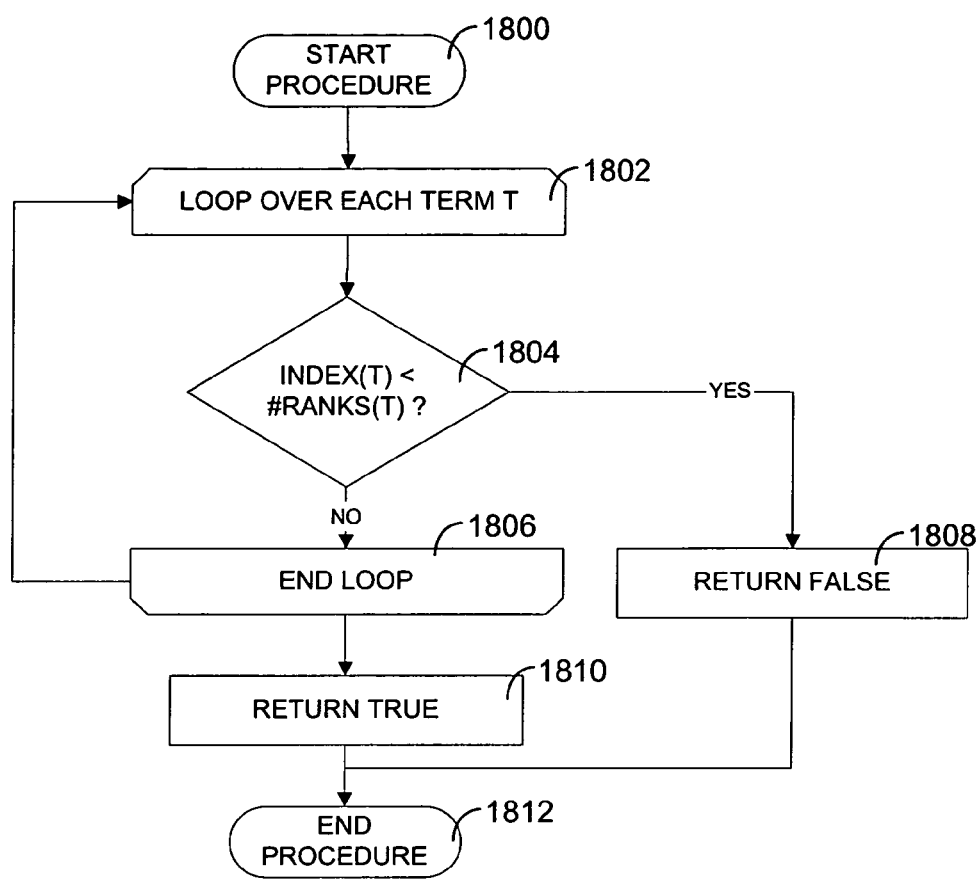

FIG. 18 is a flow diagram illustrating one embodiment of the procedure max-index?. The procedure begins at block 1800. At block 1802, a looping operation begins using the search terms of the advertiser as the looping index. At block 1804, a determination is made whether the value of the variable index for the current search term is less than the number of ranks for the search term. If so, at block 1808, a logical value False is returned and control proceeds to block 1812. Otherwise, at block 1806, the looping operation returns control to block 1802 for processing a next search term. After the loop is exited, at block 1810, the procedure returns a logical value True. The procedure ends at block 1812.

An alternative embodiment of the procedure max-index? is shown in the pseuocode below.

```
Procedure Max-Index?(index)
    For each term T_i in {T_1,T_2,...,T_k}
        If index(T_i) < #ranks(T_i) return False;
    End For;
    Return True;
End Procedure;
```

The procedure Increment-Index selects the next combination to consider. Each term $T_i$ in $\{T_1, T_2, \ldots, T_k\}$ has an index value index($T_i$), which is an index into a list of <rank,bid> tuples. These tuples are sorted in the list from lowest bid to highest bid. The procedure first attempts to increase the index of $T_1$ (to select the tuple with the next higher bid and next better rank). If the index of $T_1$ is already at its maximum, then the index of $T_1$ is set to zero (we are no longer bidding on $T_1$), and the same process is repeated for $T_2$. This is similar to incrementing a k-digit number. We first increment one digit. If we reach the maximum for one digit, we set it to zero and increment the next digit, and so on. Here each digit has its own range (0 for not bidding on the term, 1 for the worst rank, 2 for the second worst rank, up to #ranks($T_i$) for rank 1). The function next takes a term $T_i$ as input and returns the next term $T_{i+1}$ in $\{T_1, T_2, \ldots, T_k\}$, i.e., next($T_i$)=$T_{i+1}$.

Figure 19:
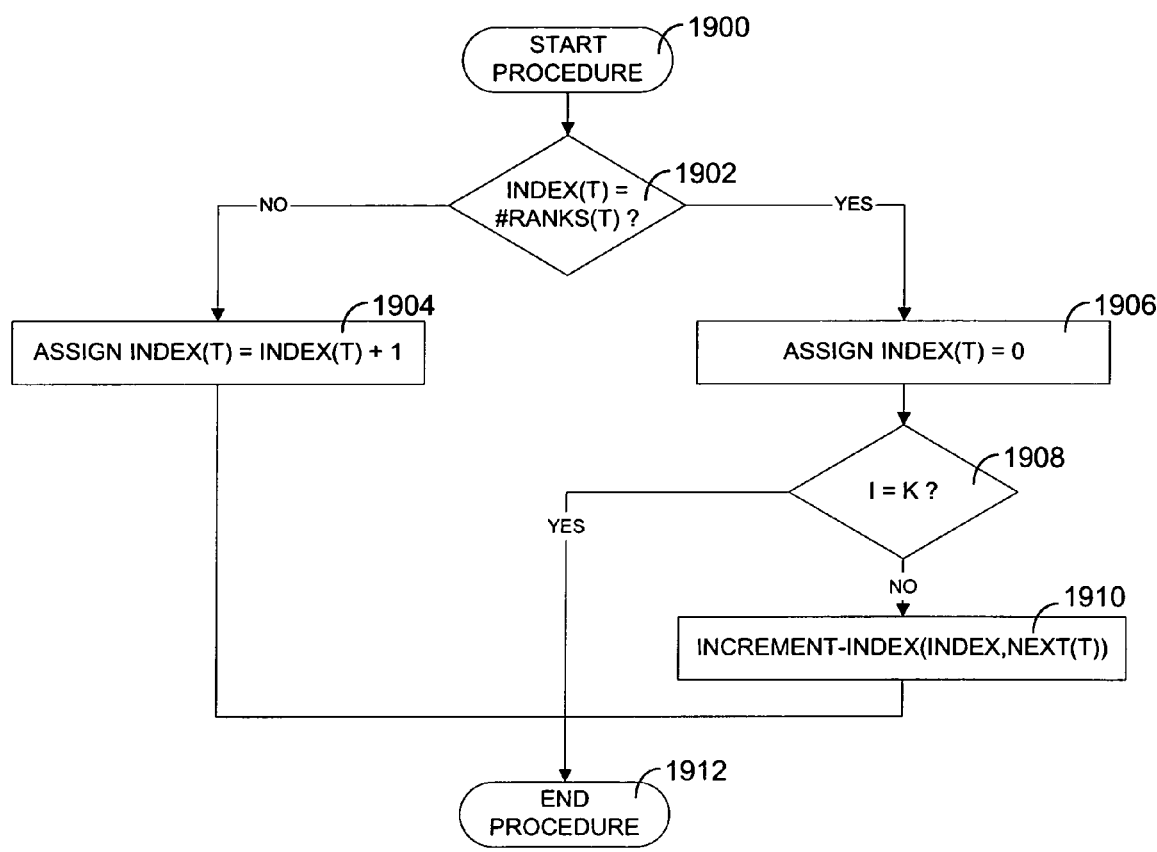

FIG. 19 is a flow diagram illustrating one embodiment of the procedure increment-index. The procedure begins at block 1900. At block 1902, it is determined if the index value for the current search term is equal to the number of ranks of this current search term. If not, at block 1904, the index value for the search term is incremented by 1. Control then proceeds to block 1912.

If, at block 1902, the index for the search term is equal to the number of ranks for the search term, then, at block 1906, the index for the search term is set to 0 and, at block 1908, it is determined if i and k are equal. If so, control proceeds to block 1912 then the procedure exits. Otherwise, at block 1910, the procedure calls itself recursively to increment the index of the next term. The procedure ends at block 1912.

An alternative embodiment for implementing the procedure increment-index is shown in the pseudocode below.

```
Procedure Increment-Index(index, T_i)
    If index(T_i) = #ranks(T_i)
        Assign index(T_i) = 0;
        If i = k return;
        Increment-index(index, T_{i+1});
    Else
        Assign index(T_i) = index(T_i) + 1;
    End If;
End Procedure;
```

Guided Flight Management

The previous procedures have defined the first variation in which the system computes the optimal bids for the terms $\{T_1, T_2, \ldots, T_k\}$ to maximize advertiser profit. As mentioned earlier, the cost of finding the optimal solution can be computationally intractable for large problems.

The second variation, called Guided Flight Management, addresses this problem by finding a solution that may be optimal in most situations (though not all), and has greatly reduced computation cost.

The key to the efficiency of Guided Flight Management is that it only considers the combinations that are likely to be in the optimal solution. This greatly reduces the number of combinations that need to be considered. In order to maximize advertiser profit, automatic flight management must set the bids of the terms $\{T_1, T_2, \ldots, T_k\}$ to get the most clicks for the budget B. This is equivalent to having the minimum average bid for the term $\{T_1, T_2, \ldots, T_k\}$.

Guided Flight Management starts by looking at the combination with the lowest bid and greatest clicks. This is with the minimum bid for all terms. It then enters a loop—at each iteration increasing the bid to improving the rank of one term in $\{T_1, T_2, \ldots, T_k\}$ so as to increase the average bid by the least amount. The iterations are repeated as long as the total cost is less than the flight budget and as long as the average bid is less than the advertiser specified maximum average CPC. At the end, the best combination which spends the flight budget and which has the lowest average bid is returned.

The procedure Guided Flight Management is identical to the procedure Optimal Flight Management (described earlier), except that it uses the procedure Generate Guided Flight, instead of Generate Optimal Flight. This is the line in boldface below. The same descriptions presented earlier apply for the other common procedures.

Figure 20:
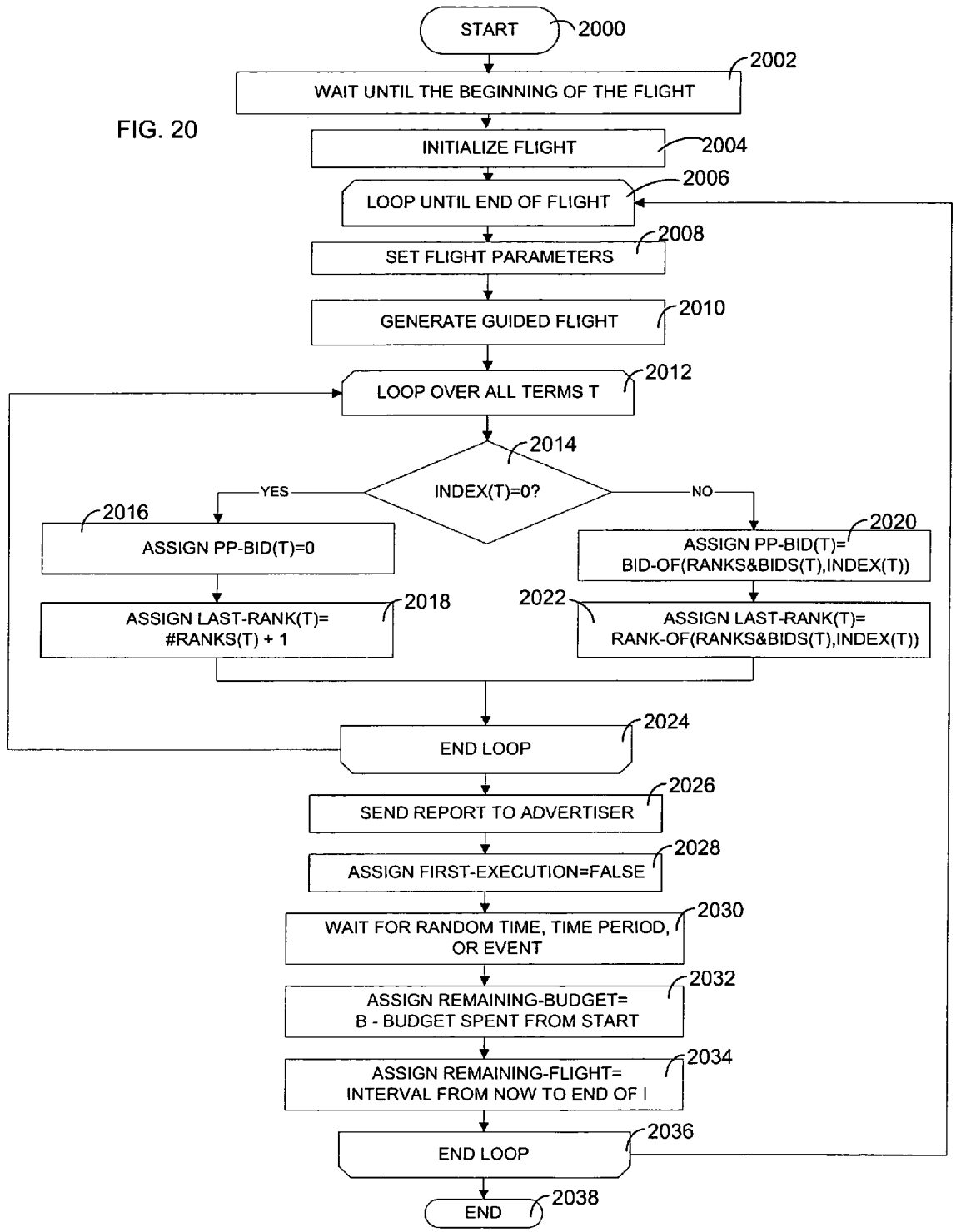

FIG. 20 is a flow diagram illustrating one embodiment of a guided flight management method. The method begins at block 2000. At block 2002, the operation of the procedure awaits the beginning of the advertising flight. At block 2004, the flight is initialized. In one embodiment, this may be performed in accordance with the method described above in conjunction with FIG. 11.

At block 2006, a looping operation begins which extends throughout the duration of the flight. The first looping operation is block 2008, in which flight parameters are established. This may be performed in accordance with the acts described above in conjunction with FIG. 12. At block 2010, a procedure generate guided flight is initiated. One embodiment of this procedure will be described below in conjunction with FIG. 21.

A looping operation begins at block 2012 during which all search terms T of the advertiser associated with the advertising flight are processed. At block 2014, it is determined if the index of the current search term is equal to 0. If so, at block 2016, a variable PP-BID for the search term is set equal to 0 and at block 2018, a variable last-rank for the search term is set equal to the number of ranks for which there are bids for the search term T, plus 1. Control then proceeds to block 2024 and return to block 2012 for another pass through the loop. Thus, at block 2014, the index of the current search term is not equal to 0, at block 2020, the value of the variable PP-BID for the current search term is set equal to the value of the variable contained in BID-OF (ranks&bids (T), index (t)). At block 2022, the value of the variable last-rank for the current search term is set equal to the rank of the current search term.

After exiting the loop which includes blocks 2012, 2014, 2016, 2018, 2020, 2022, 2024, at block 2026, a report of current bids and ranks as determined by the looping operation is sent to the advertiser associated with the advertising flight. At block 2028, a logical variable First-Execution is set to a value False. At block 2030, the procedure waits for a time before resuming. This time may be determined by a random timing, elapse of a predetermined time period or by the occurrence of an event. At block 2032, a variable remaining-budget is set equal to the difference between the overall budget for the flight, B, and the budget spent from the start of the flight of advertising. At block 2034, the variable remaining-flight is set equal to the difference between the current time and the end of the predetermined flight interval. At block 2036, the end of the loop is reached and control returns to block 2006 for additional processing. Upon termination of the flight, the method of FIG. 20 is terminated at block 2038.

A second embodiment of the procedure guided flight management is shown in the pseudocode below.

```
Procedure Guided Flight Management ( )
Wait until the beginning of the flight;
Initialize Flight;
Loop until the end of the flight
    Set flight parameters;
    Generate Guided Flight;
    For every term T_i in {T_1,T_2,...,T_k}
        If index(T_i) = 0
            Assign price-protected-bid(T_i) = 0;
            Assign last-rank(T_i) = #ranks(T_i)+1;
        Else
            Assign price-protected-bid(T_i) =
                bid-of(ranks&bids(T_i),index(T_i));
            Assign last-rank(T_i) =
                rank-of(ranks&bids(T_i),index(T_i));
        End If;
    End For;
    Send report to advertiser;
    Assign first-execution = false;
    Wait for a random time, or some time period, or for an event;
    Assign remaining-budget = B - budget spent from start;
    Assign remaining-flight = interval from now to end of I ;
End Loop;
End Procedure;
```

The procedure Generate Guided Flight only explores the combinations that are likely to be in the optimal solution. The procedure starts by initializing the calculation parameters, as described earlier for the procedure Generate Optimal Flight. It next enters a loop. Each iteration of the loop explores a new combination, where the rank of one of the terms is improved by one position—this always results in a higher total cost and higher average bid.

At each iteration the system checks if the current combination is better than the best combination seen so far. The best combination is replaced with the current combination if this is the case.

The loop exits if the current combination has a total cost greater than the flight budget B, or if the average bid of the current combination is greater than the maximum average CPC C, or if there are no more combinations. The procedure returns the best combination that was found.

Figure 21:
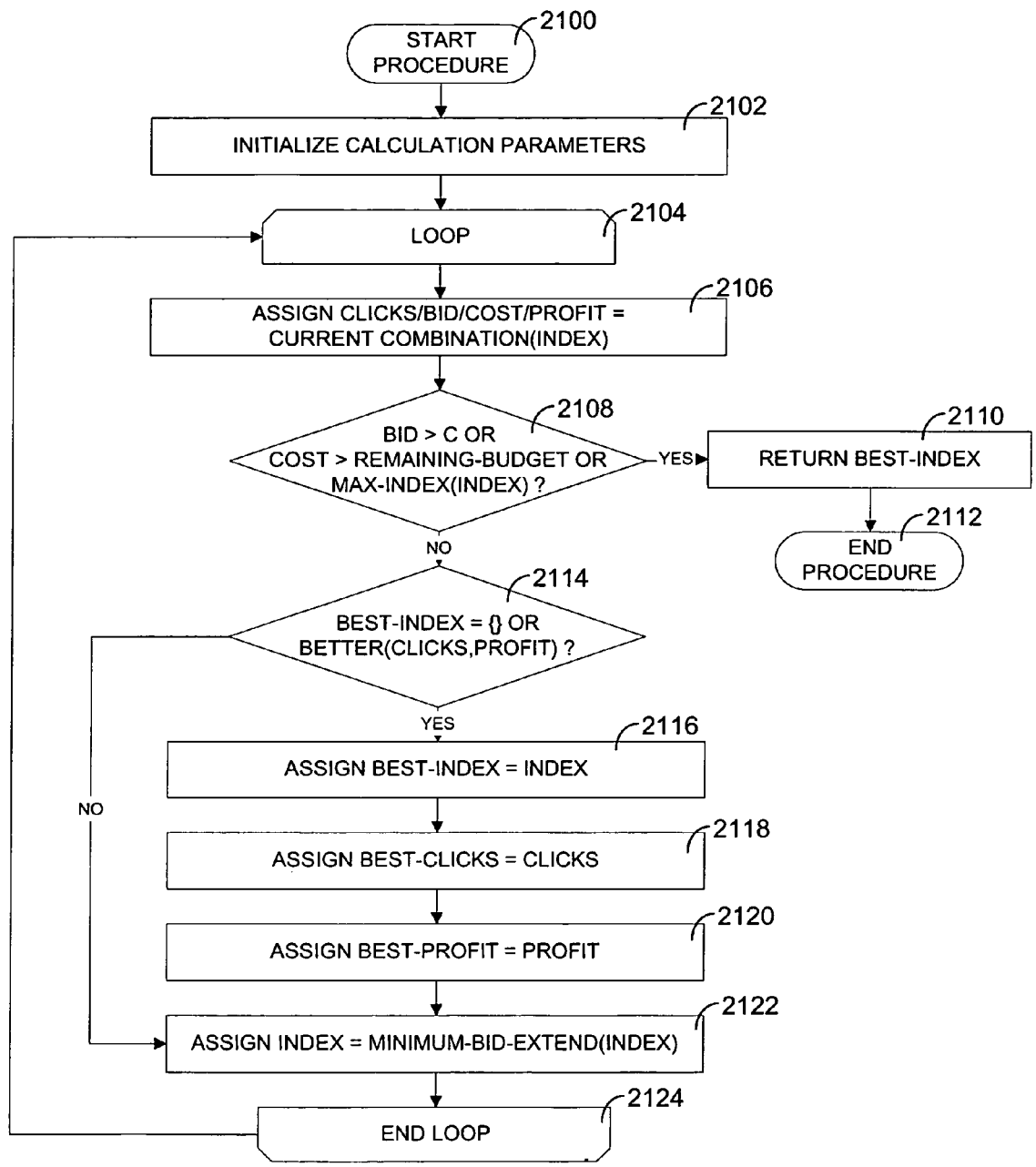

FIG. 21 is a flow diagram showing one embodiment of the procedure generate guided flight The procedure begins at block 2100. At block 2102, a procedure initialize calculation parameters is called. One embodiment of this procedure is described above in conjunction with FIG. 15.

At block 2104, a looping operation begins. At block 2106, the values of the four variables clicks/bid/cost/profit is set equal to the values returned by the procedure current combination. One embodiment of this procedure is described above in conjunction with FIG. 17. At block 2108, it is determined if the current bid is greater than the maximum CPC C or if the cost is greater than the variable remaining-budget or if the procedure max-index? returns the logical value True. One embodiment of the procedure max-index? is described above in conjunction with FIG. 18. If the text of block 2108 is true, at block 2110 the procedure returns the value of the variable best index and the procedure ends at block 2112. Otherwise, at block 2114, it is determined if the variable best-index stores an empty value or if the value returned by the procedure better has a true value. One embodiment of the procedure better is described above in conjunction with FIG. 14. If the test of block 2114 is true, at block 2116, the value of the variable best-index is set equal to the value of the variable index. At block 2118, the value of the variable best-clicks is set equal to the value of the variable clicks. At block 2120, the value of the variable best-profit is set equal to the value of the variable profit. If the test of block 2114 is not true or after processing block 2120, at block 2112 the value of the variable index is set equal to the value returned by the procedure minimum-bid-extend. One embodiment of this procedure is described below in conjunction with FIG. 22. The looping procedure ends at block 2124, and control is returned to block 2104.

An alternative embodiment of the procedure generate guided flight is shown in the pseudocode below.

```
Procedure Generate Guided Flight (Terms)
Initialize Calculation Parameters;
Loop
    Assign clicks/bid/cost/profit = current combination(index);
    If bid > C or cost > remaining-budget or max-index?(index)
        Return best-index;
    End If;
    If best-index = { } or better(clicks,profit)
        Assign best-index = index;
        Assign best-clicks = clicks;
        Assign best-profit = profit;
    End If;
    Assign index = minimum-bid-extend(index);
End Loop;
End Procedure;
```

The main difference between Guided Flight Management and Optimal Flight Management Is in generating the next "current combination." For Optimal Flight Management we consider all combinations. For Guided Flight Management we look at the current combination, and see how to improve the rank of one of the terms, so that the average bid is increased by the least amount. This is accomplished by the procedure Minimum Bid Extend.

The current combination is defined by the rank and bid of every term $\{T_1, T_2, \ldots, T_k\}$. Each term $T_i$ has a list of <rank,bid> tuples, sorted from lowest bid to highest bid. The tuple selected for $T_i$ is defined by the value of index($T_i$). If this is zero then the bid is zero for $T_i$.If this is one, Then this is the first rank/bid combination (minimum bid and worst rank).

The procedure Minimum Bid Extend starts by initializing the variables "lowest-bid-index" (the index of the combination explored that results in the lowest average bid) and "lowest-bid" (the average bid of the combination explored that results in the lowest average bid).

The procedure next enters a loop, where each iteration of the loop considers improving the rank of one of the terms $\{T_1, T_2, \ldots, T_k\}$. This is accomplished by incrementing the index of the selected term by one. Each iteration computes the total clicks, average bid, total cost, and total profit for the new combination being considered. If the average bid of the current combination is less than the best average bid considered on any previous iteration, then the best extension is replaced with the current combination.

The procedure exits the loop when all extensions have been considered, and it returns the new combination that increments the average bid by the least amount.

Figure 22:
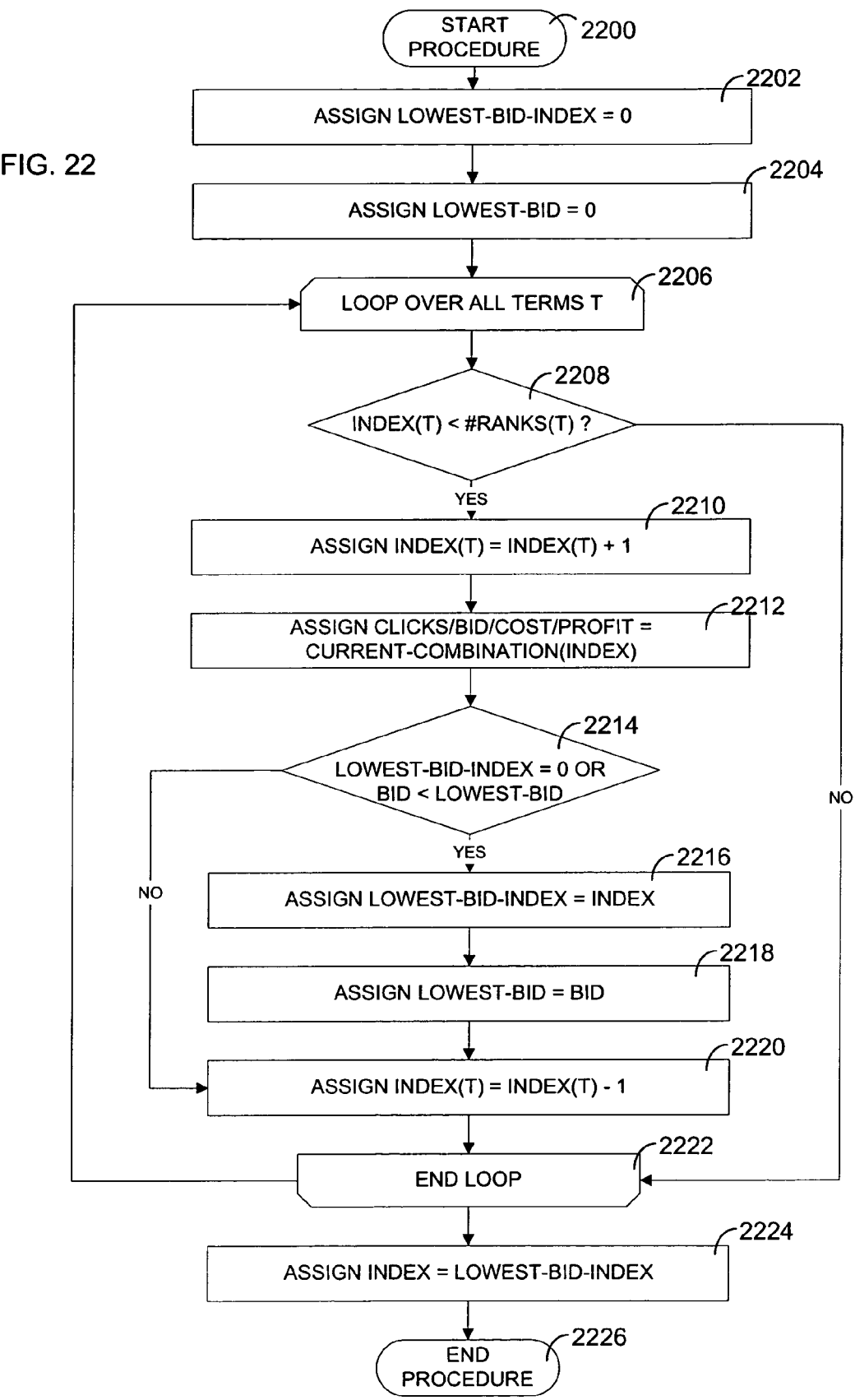

FIG. 22 is a flow chart illustrating one embodiment of a procedure minimum bid extend. The procedure begins at block 2200. At block 2202, the variable lowest-bid-index is initialized to 0 and at block 2204, the variable lowest-bid is initialized to 0.

A looping operation begins at block 2206, looping over all search terms of the advertiser. At block 2208, it is determined if the index of a current search term is less than the number of ranks of the search term. If not, the end of the loop is reached and control proceeds to block 2222. Otherwise, at block 2210, the value of the variable index is incremented by 1 and at block 2212, the value of the four variables clicks/bid/cost/profit is set equal to the four values returned by the procedure current-combination. One embodiment of this procedure is described above in conjunction with FIG. 17.

At block 2214, it is determined if the value of the variable lowest-bid-index is equal to 0 or if the current bid is less than the value of the variable lowest-bid. If not, control proceeds to block 2220. Otherwise, at block 2216, the variable lowest-bid-index is set equal to the current value of the variable index, at block 2218 the variable lowest-bid is set equal to the current bid for the current search term, and at block 2220 the index for the current search term is decremented by 1. At block 2222, the loop returns control to block 2206. When the loop ends, after all search terms of the advertiser has been processed, at block 2224, the variable index is set equal to the valuable lowest-bid-index and the procedure ends at block 2226.

An alternative embodiment of the procedure minimum bid extend is shown in the pseudocode below.

```
Procedure Minimum Bid Extend (Index)
   Assign lowest-bid-index = 0;
   Assign lowest-bid = 0;
   Loop over each term T_i in {T_1,T_2,...,T_k}
      If index(T_i) < #ranks(T_i)
         Assign index(T_i) = index(T_i) + 1;
         Assign clicks/bid/cost/profit = current-combination(index);
         If lowest-bid-index = 0 or bid < lowest-bid
            Assign lowest-bid-index = index;
            Assign lowest-bid = bid;
         End If;
         Assign index(T_i) = index(T_i) – 1;
      End If;
   End Loop;
   Assign index = lowest-bid-index;
End Procedure;
```

Optimizations

In a third variation of automatic flight management, the system further improves the performance by discarding ranks of the terms $\{T_1, T_2, \ldots, T_k\}$ that are not likely to be a part of the optimal solution. By reducing the number of ranks, the combination of ranks to consider is reduced exponentially. This results in greatly improved performance. These optimizations can be applied to both Optimal Flight Management and Guided Flight Management.

There is tradeoff in the number of ranks to discard for each term. If more ranks are discarded then the improvement in performance is exponentially greater, however, if too many ranks are discarded then the optimal solution may be missed. The marketplace operator can control the optimization parameters to make the best tradeoff.

The optimizations are realized by replacing the previously defined procedure Initialize Calculation Parameters with the procedure Initialize Filtered Calculation Parameters.

There are two changes in the new procedure (shown in boldface). First, before the initial execution of automatic flight management, the system estimates the bid $b_o$, which if assigned to all terms $\{T_1, T_2, \ldots, T_k\}$ results in spending the flight budget B. This estimated optimal bid $b_o$ is used to select a band of ranks to consider for every term. The procedure Estimate Original Bids performs this computation.

The second change is that the result of finding the possible ranks and bids for all the terms $\{T_1, T_2, \ldots, T_k\}$ is filtered to only consider some of the ranks of each term. This is accomplished by the procedure Filter.

Figure 23:
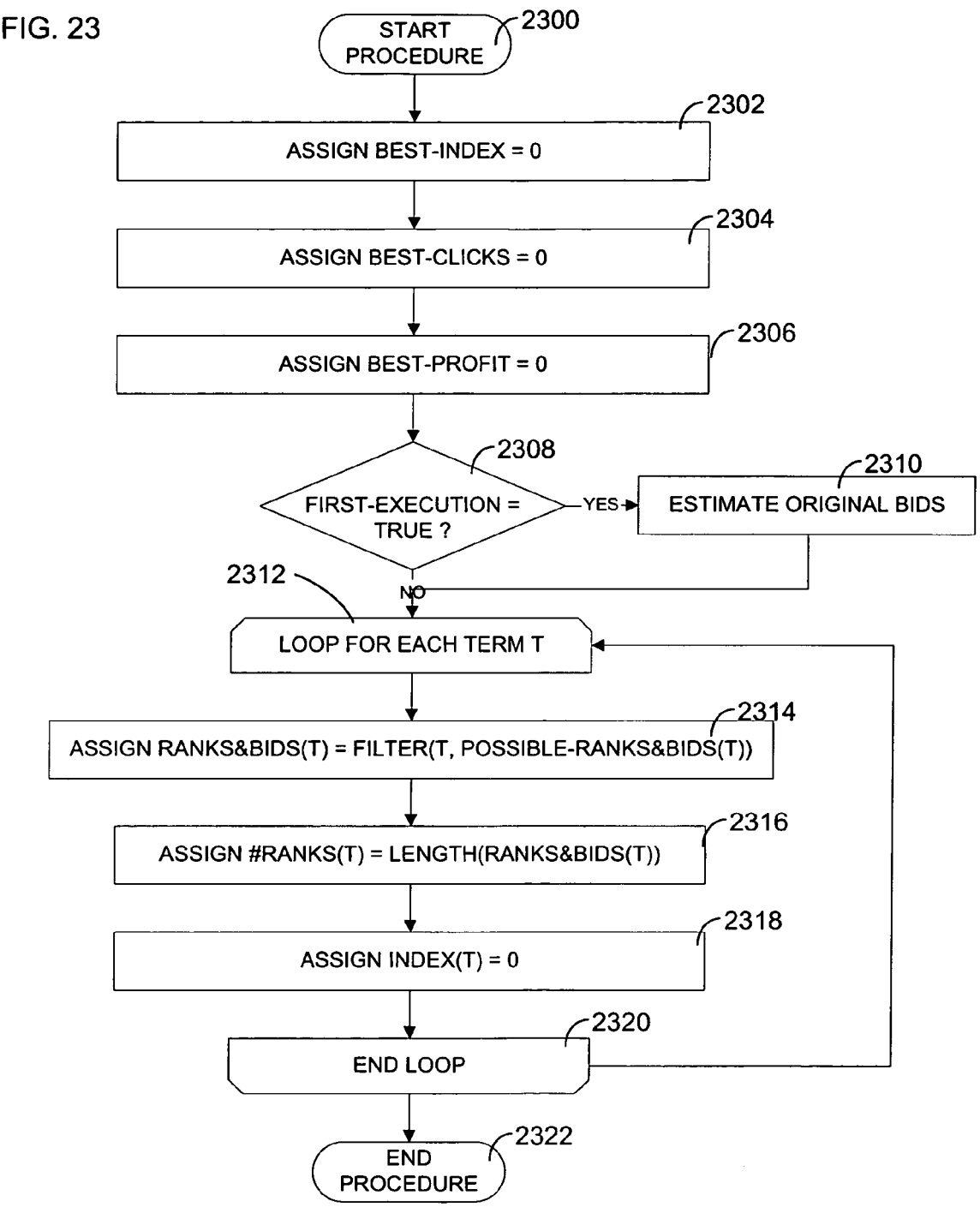

FIG. 23 is a flow diagram illustrating one embodiment of the procedure initialize filtered calculation parameters. The procedure begins at block 2300. At block 2302, the variable best-index is initialized to a value 0. Similarly, at block 2304 and block 2306, the variables best-clicks and best-profit are initialized to the value 0. The test is performed at block 2308 to determine if the variable first-execution is a logical value True. If so, at block 2310, a procedure estimate original bids is called. One embodiment of this procedure will be described below in conjunction with FIG. 24. At block 2312, a loop is entered. At block 2314, the value of the array variable ranks&bids at the index of the current term T is set equal to the value returned by the procedure filter. One embodiment of this procedure will be described below in conjunction with FIG. 27. At block 2316, the array variable #ranks at the index of the current term T is set equal to the length of the array value for the current search term. At block 2318, the index for the current search term is set equal to 0 and at block 2320 the loop ends. Control is returned to block 2312 until all search terms have been processed. After processing all search terms, the procedure ends at block 2322.

An alternative embodiment of the procedure initialize filtered calculation parameters is in illustrated in the pseudocode.

```
Procedure Initialize Filtered Calculation Parameters( )
   Assign best-index = { };
   Assign best-clicks = 0;
   Assign best-profit = 0;
   If first-execution = true
      Estimate original bids;
   End If;
   For each term T_i in {T_1,T_2,...,T_k}
      Assign ranks&bids(T_i) = filter(T_i,possible-ranks&bids(T_i));
      Assign #ranks(T_i) = length(ranks&bids(T_i));
      Assign index(T_i) = 0;
   End For;
End Procedure;
```

The procedure Estimate Original Bids computes the bid $b_o$, which if assigned to all terms $\{T_1, T_2, \ldots, T_k\}$ results in spending the flight budget B. The variable "best-under" is the highest value of $b_o$ that has been found, which results in spending less than the budget B. Similarly, the variable "best-over" is the lowest value of $b_o$ that has been found, which results in spending more than the budget B. Initially best-under is zero, best-over is the highest bid to be at rank 1 for any term $\{T_1, T_2, \ldots, T_k\}$, and the initial estimate of $b_o$ is "best-over" divided by two.

The procedure loops through a number of iterations, where each iteration adjusts the current bid ($b_o$) so that the total cost gets closer to the flight budget B. The loop terminates if the current value of "bid" results in spending approximately the budget B. The window of approximation is defined by the variable δ, which must be between zero and one. If δ is 0, then the total cost must be exactly B, and if δ is 1, then any total cost less than 2×B is acceptable.

If the total cost with all terms $\{T_1, T_2, \ldots, T_k\}$ having the bid "bid" is greater than the budget ((1+δ)×B<cost), then "bid" is adjusted to be halfway in between its current value and "best-under." Also, if the current "bid" is less than "best-over," then "best-over" is replaced with "bid."

Similarly, if the total cost with all terms $\{T_1, T_2, \ldots, T_k\}$ having the bid "bid" is less than the budget ((1−δ)×B>cost), then "bid" is adjusted to be halfway in between its current value and "best-over." Also, if the current "bid" is greater than "best-under," then "best-under" is replaced with "bid."

Each iteration of the loop brings the estimated "bid" closer to the average optimal bid $b_o$, which results in spending the budget B. Eventually the value of "bid" will be close enough, and the procedure will terminate and assign this "bid" to original-bid-estimate.

Figure 24:
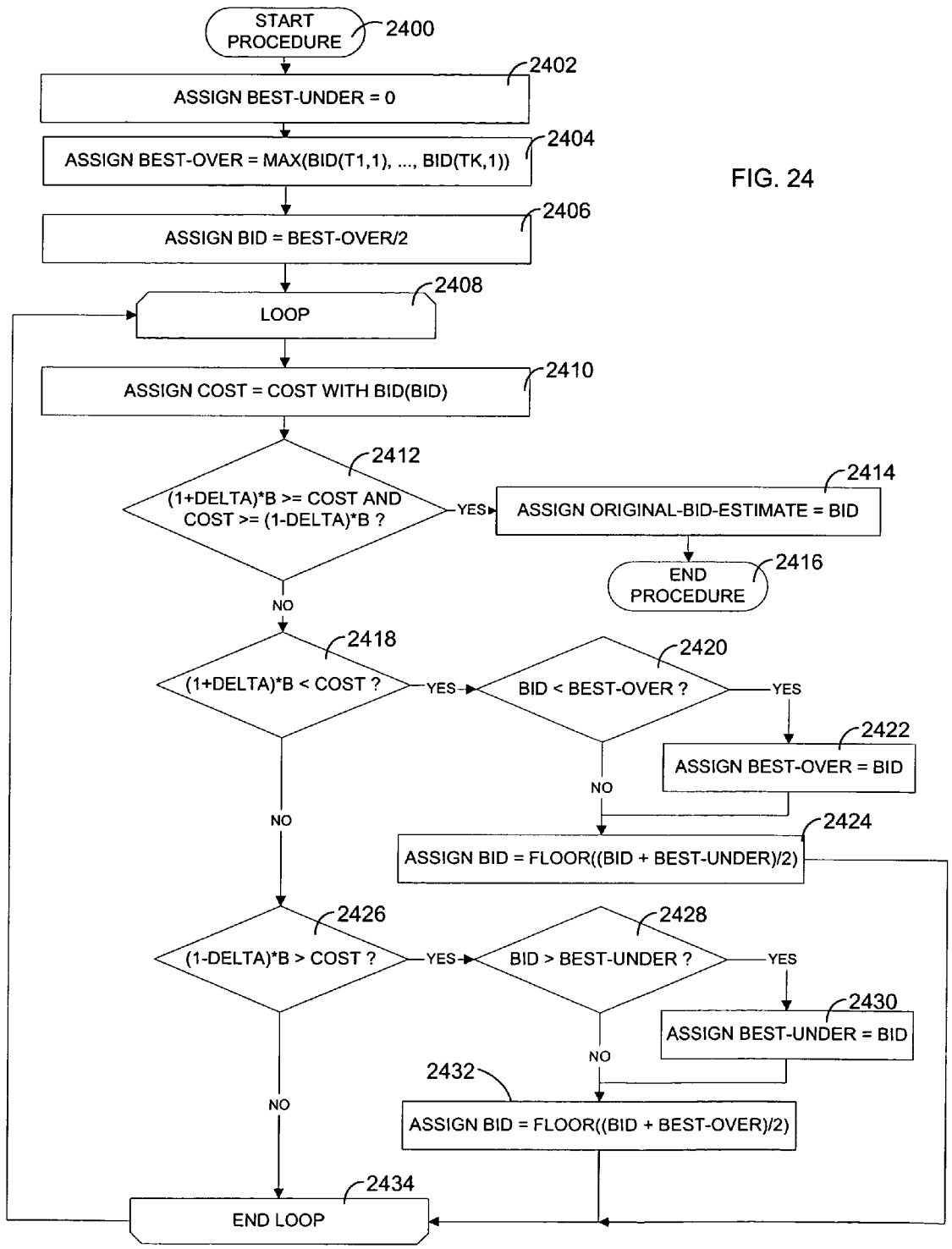

FIG. 24 is a flow diagram illustrating one embodiment of the procedure estimate original bids. The procedure begins at block 2400. At block 2402, the variable best-under is initialized to a value 0. At block 2404, the variable best-over is initialized to be the maximum bid to be at rank 1 for any search term of the advertiser. At block 2406, the variable bid is initialized to one-half the value of the variable best-over.

A loop is under that block 2408. At block 2410, the variable cost is set equal to the result returned by procedure cost with bid. One embodiment of this procedure will be described below in conjunction with FIG. 25. At block 2412, a test is performed to determine if the product of the budget B and the sum of the variable delta and 1 is greater than or equal to the value of the variable cost, and if the variable cost is greater than or equal to the product of the budget B and 1 minus the value of the variable delta. If so, at block 2414, the variable original-bid-estimate is set equal to the current value of the variable bid and the procedure ends at block 2416. Otherwise, at block 2418, it is determined if the product of the budget B and 1 plus the variable delta is less than the value of the variable cost.

At block 2420, it is determined if the value of the variable bid is less than the variable best-over. If so, at block 2422, the value of the variable best-over is set equal to the value of the variable bid. At block 2424, the value of the variable bid is set equal to the floor of the sum of the variable bid and the variable best-under divided by 2. Control then proceeds to block 2434. Otherwise, at block 2426, it is determined if the product of the budget B and 1 minus the variable delta is greater than the variable cost. If so, at block 2428, it is determined if the variable bid is greater than the variable best-under. If so, at block 2430, the variable best-under is set equal to the current value of the variable bid and, at block 2432, the variable bid is set equal to the floor of the sum of the variables bid and best-over divided by 2. Control then proceeds to block 2434 which is the end of the loop.

A second embodiment of the procedure Estimate Original Bids is shown in accordance with the pseudo code below.

```
Procedure Estimate Original Bids( )
    Assign best-under = 0;
    Assign best-over = max(bid(T₁,1),bid(T₂,1),...,bid(Tₖ,1));
    Assign bid = best-over/2;
    Loop
        Assign cost = cost with bid(bid);
        If (1+δ)×B >= cost >= (1−δ)×B
            Exit Loop;
        Else If (1+δ)×B < cost
            If bid < best-over
                Assign best-over = bid;
            End If;
            Assign bid = floor((bid + best-under)/2);
        Else If (1−δ)×B > cost
            If bid > best-under
                Assign best-under = bid;
            End If;
            Assign bid = floor((bid + best-over)/2);
        End If;
    End Loop;
    Assign original-bid-estimate = bid;
End Procedure;
```

The procedure Cost With Bid computes the cost to the advertiser, if all terms $\{T_1, T_2, \ldots, T_k\}$ have the bid "bid." It does this by summing the costs of each individual term with this bid.

Figure 25:
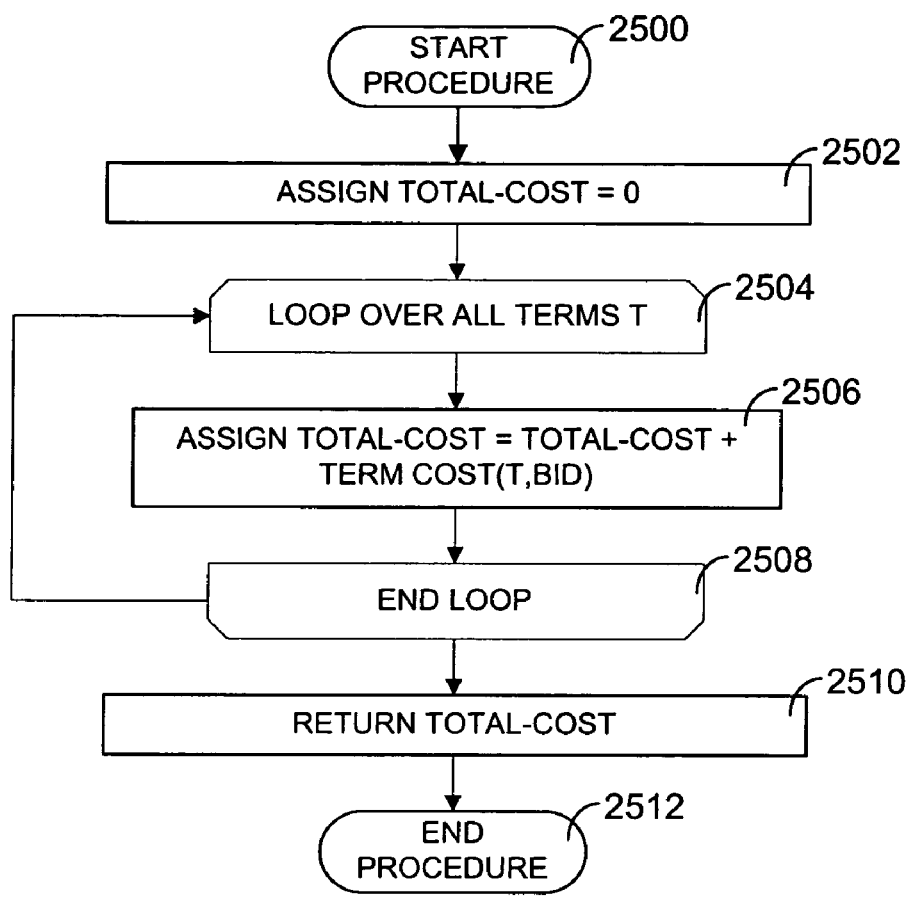

FIG. 25 is a flow diagram illustrating one embodiment of the procedure Cost With Bid. The procedure begins at block 2500. At block 2502, the variable total-cost is initialized to a value of zero. The loop begins at block 2504. At block 2506, the variable total-cost is incremented by the result returned by the procedure Term Cost One embodiment of the procedure Term Cost will be described below in conjunction with FIG. 26. The end of the loop is reached at block 2508, and the loop is repeated until all such terms associated with the advertiser have been processed. At block 2510, the procedure returns the value of the variable total-cost. The procedure ends at block 2512.

An alternative embodiment of the procedure Cost With Bid is illustrated in accordance with the pseudo code below.

```
Procedure Cost with Bid(bid)
    Assign total-cost = 0;
    For each term Tᵢ in {T₁,T₂,...,Tₖ}
        Assign total-cost = total-cost + term cost(Tᵢ,bid);
    End For;
    Return total-cost;
End Procedure;
```

The procedure Term Cost takes as input a term $T_i$ in $\{T_1, T_2, \ldots, T_k\}$ and a bid. It computes the cost to the advertiser of bidding at "bid" for $T_i$. The procedure first finds all the possible ranks that an advertiser can be at, and the minimum bid for these ranks. It next loops over all possible rank/bids and selects the rank/bid which has the bid closest to the input "bid." The cost for this rank is the bid times the historical clicks in the marketplace for this rank.

Figure 26:
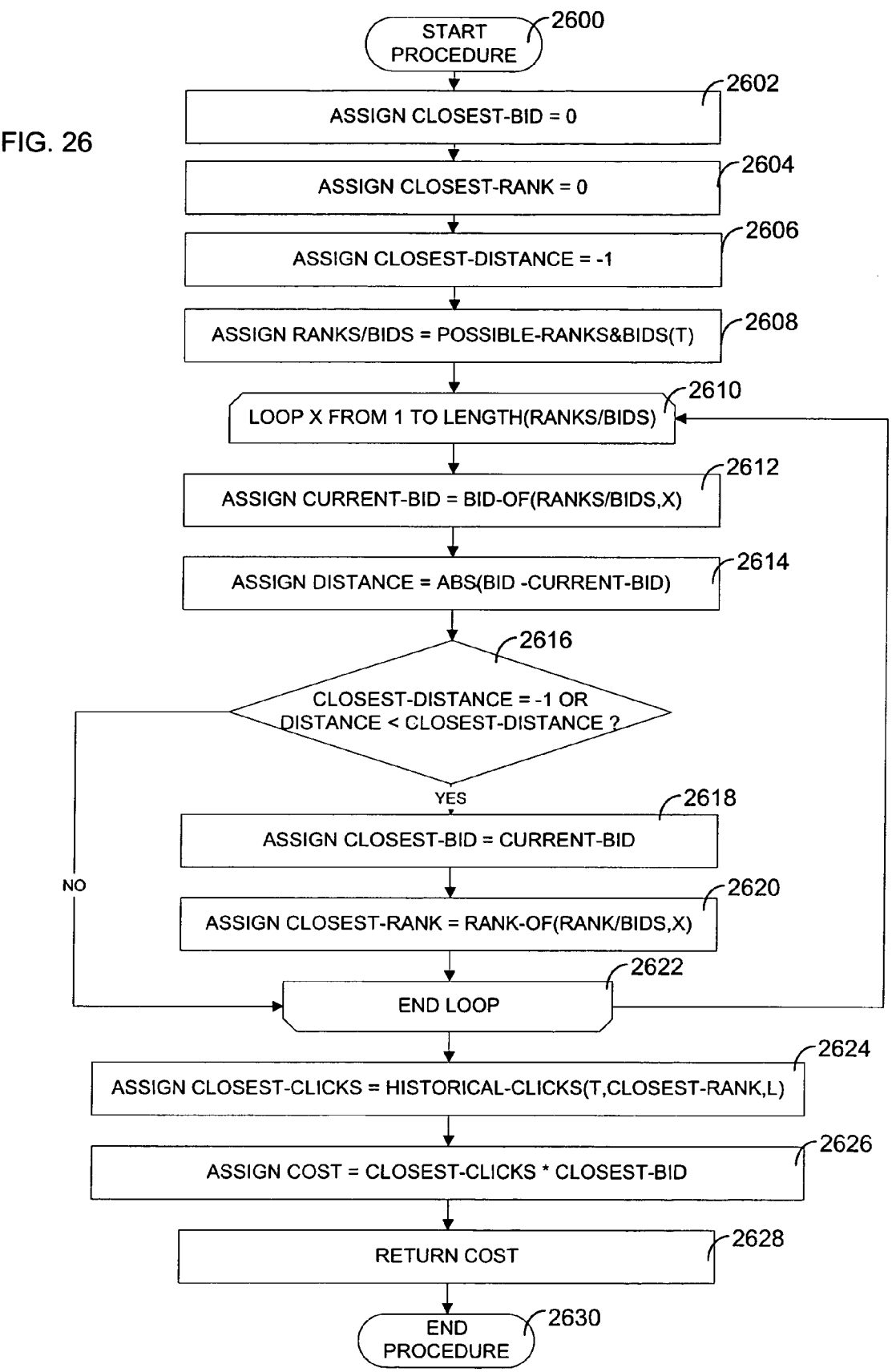

FIG. 26 is a flow diagram illustrating one embodiment of the procedure Term Cost. The procedure begins at block 2600. Several variables are initialized, including the variable closest-bid initialized to the value zero, block 2602, the variable closest-rank initialized to the value zero, block 2604, the variable closest-distance initialized to the value minus one, block 2606, and the variable ranks/bids is set equal to the value returned by the procedure possible-ranks&bids. One embodiment of the procedure Possible-Ranks&Bids is described above in conjunction with FIG. 16.

At block 2610, a looping operation begins using a looping variable x having values between one and the length of the variable ranks/bids. At block 2612, the value of the variable current bid is set equal to the bid for entry X in the listing of ranks/bids. At block 2614, the value of the variable distance is set equal to the absolute value of the difference between the variable bid and the variable current-bid. At block 2616, a test is performed to determine if the value of the variable closest-distance is equal to minus one or if the value of the variable distance is less than the value of the variable closest-distance. If neither condition is true, control proceeds to the end of the loop, block 2622. If either condition of block 2616 is true, at block 2618, the variable closest bid is assigned a value equal to the current-bid. At block 2620, the variable closest-rank is set equal to the rank of the Xth entry of the array rank/bids. At block 2622, looping control returns to block 2610.

After the loop is exited, at block 2624, the variable closest-clicks is set equal to the value returned by a procedure Historical-Clicks. At block 2626, the cost is set equal to the product of variables closest-clicks and closest-bid. At block 2628, the value of the variable cost is returned by the procedure. The procedure ends at block 2630.

An alternative embodiment of the procedure Term Cost is illustrated by the pseudo code below.

```
Procedure Term Cost(T_i,bid)
    Assign closest-bid = 0;
    Assign closest-rank = 0;
    Assign closest-distance = -1;
    Assign ranks/bids = possible-ranks&bids(T_i);
    Loop x from 1 to length(ranks/bids)
        Assign current-bid = bid-of(ranks/bids,x);
        Assign distance = abs(bid - current-bid);
        If closest-distance = -1 or distance < closest-distance
            Assign closest-bid = current-bid;
            Assign closest-rank = rank-of(rank/bids,x);
        End If;
    End Loop;
    Assign closest-clicks = historical-clicks(T_i,closest-rank,L);
    Assign cost = closest-clicks * closest-bid;
    Return cost;
End Procedure;
```

The procedure Filter takes as input a term $T_i$ and a list of <rank,bid> tuples. The procedure filters some of the tuples, thus removing the ranks of the eliminated tuples of $T_i$ from consideration. This filtering is controlled by information provided by the advertiser and/or the marketplace operator.

There are three types of filtering, and one or more of these can be applied in any combination. The advertiser can specify that he wishes to eliminate all ranks of every term, if the rank has fewer clicks than some threshold. The advertiser constraint of the minimum clicks is specified by the value of min-clicks($T_i$).

An advertiser can specify a range of ranks to consider—from a best rank to a worst rank (inclusive). The advertiser constraint for the worst rank of $T_i$ is defined by worst-rank ($T_i$), and the advertiser constraint for the best rank of $T_i$ is defined by best-rank($T_i$).

Auto-filter is the third type of filtering, in which the marketplace operator can use the results of the previous execution of automatic flight management to eliminate ranks that are not close to the ranks of the previous execution for each term $\{T_1, T_2, \ldots, T_k\}$.

Figure 27:
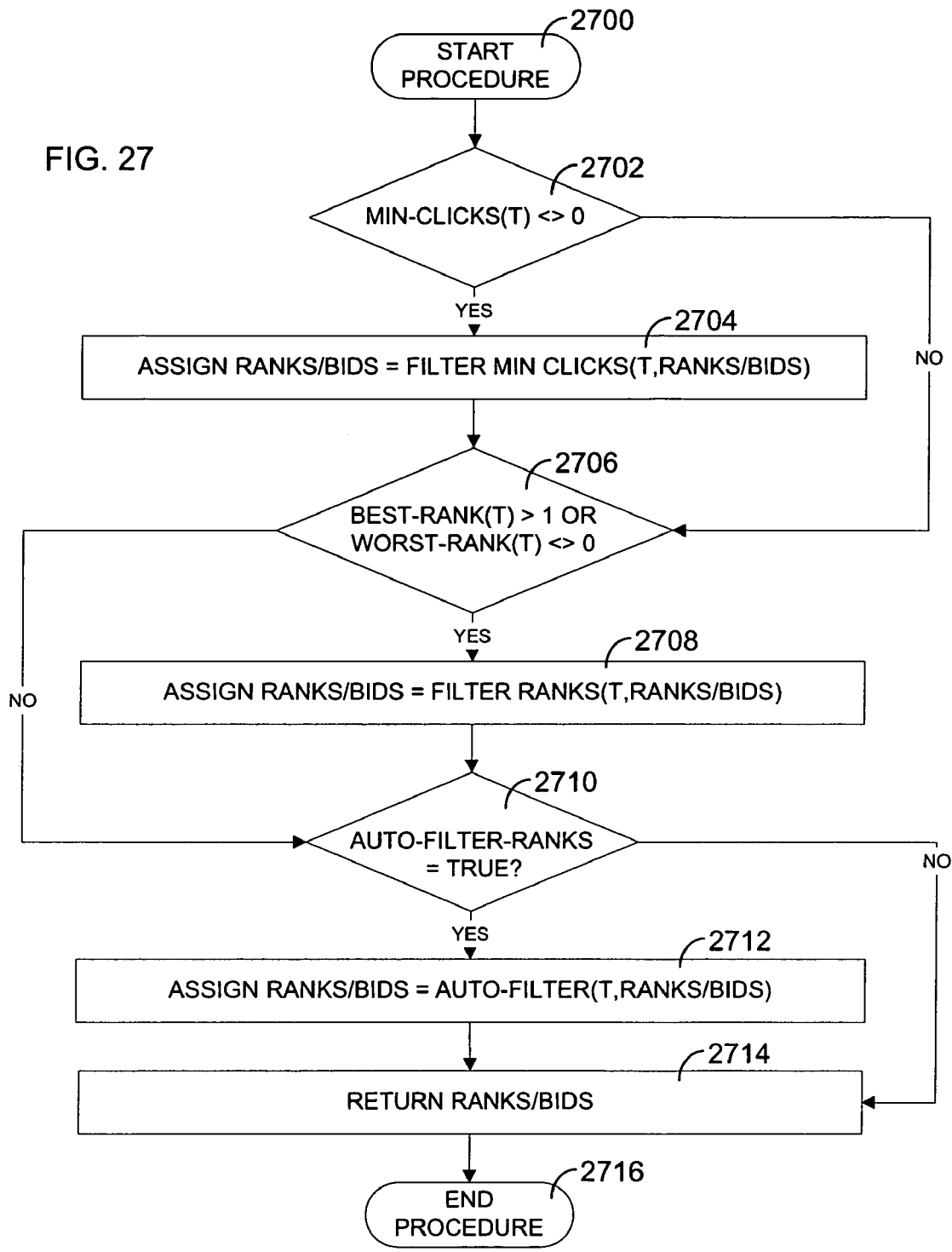

FIG. 27 is a flow diagram illustrating one embodiment of the procedure Filter. The procedure begins at block 2700. At block 2702, it is determined if the value of the variable min-clicks for the current search term is not equal to zero. If so, at block 2704, the value of the array ranks/bids is set equal to the result returned by the procedure Filter Min Clicks. One embodiment of this procedure is described below in conjunction with FIG. 28. At block 2706, it is determined if either the best rank for the search term T is greater than one or if the worst rank for the search term is a value other than zero. If so, at block 2708, the contents of the array ranks/bids is set equal to the result returned by the procedure Filter Ranks. One embodiment of this procedure is described below in conjunction with FIG. 29. At block 2710, it is determined if the result returned by the procedure Auto-Filter-Ranks is a logical value true. One embodiment of this procedure is described below in conjunction with FIG. 32. If the test of block 2710 is true, at block 2712, the value of the array ranks/bids is set equal to the result returned by the procedure Auto-Filter. One embodiment of this procedure is described below in conjunction with FIG. 30. At block 2714, the procedure returns the value of the array ranks/bids. The procedure ends at block 2716.

An alternative embodiment of the procedure Filter is shown in conjunction with the pseudo code below.

```
Procedure Filter(T_i,ranks/bids)
    If min-clicks(T_i) <> 0
        Assign ranks/bids = filter min clicks(T_i,ranks/bids);
    End If;
    If best-rank(T_i) > 1 or worst-rank(T_i) <> 0
        Assign ranks/bids = filter ranks(T_i,ranks/bids);
    End If;
    If auto-filter-ranks = true;
        Assign ranks/bids = auto-filter(T_i,ranks/bids);
    End If;
    Return ranks/bids;
End Procedure;
```

The procedure Filter Min Clicks takes as input a term $T_i$ and a list of <rank,bid> tuples. It eliminates all tuples whose ranks have fewer clicks than the click threshold specified by the advertiser for the term $T_i$.

Figure 28:
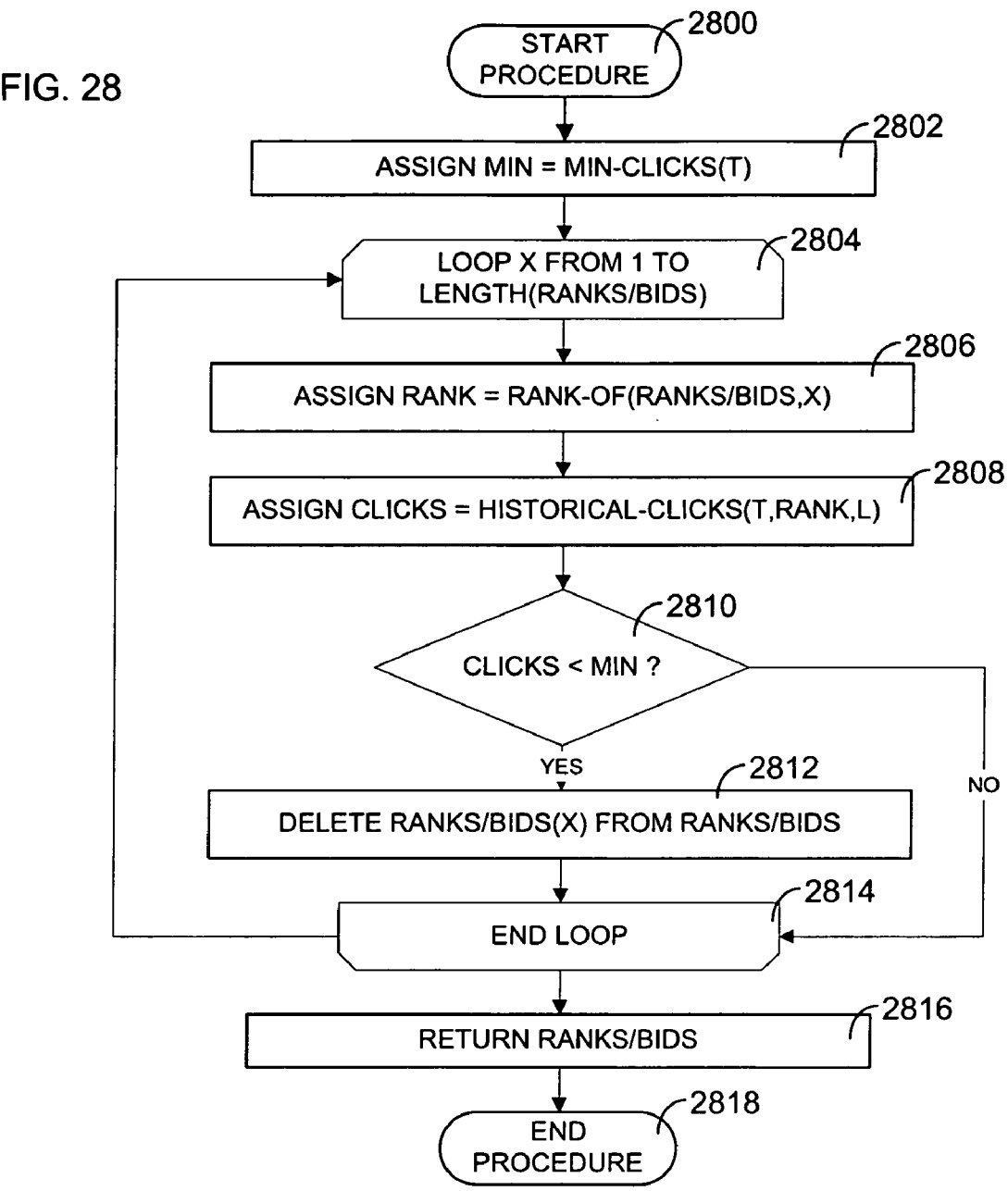

FIG. 28 is a flow diagram illustrating one embodiment of a procedure Filter Min Clicks. The procedure begins at block 2800. At block 2802, the variable min is set equal to the value returned by the procedure Min-Clicks. A looping operation begins at block 2804, looping over the variable x extending from the value one to a value equal to the length of the array ranks/bids. At block 2806, the variable rank is set equal to the rank of entry x of the array ranks/bids. At block 2808, the variable clicks is set equal to the value returned by the procedure Historical-Clicks. At block 2810, a test is performed to determine if the value of the variable clicks is less than the variable min. If so, at block 2812, the Xth entry of the array ranks/bids is deleted from the array. Control of the loop returns, block 2814, to block 2804. After the loop has been completely processed, at block 2816, the value of the array ranks/bids is returned by the procedure. The procedure ends at block 2818.

An alternative embodiment of the procedure Filter-Min-Clicks is illustrated in accordance with the pseudo code shown below.

```
Procedure Filter Min Clicks(T_i,ranks/bids)
    Assign min = min-clicks(T_i);
    Loop x from 1 to length(ranks/bids);
    Assign rank = rank-of(ranks/bids,x);
        Assign clicks = historical-clicks(T_i,rank,L);
        If clicks < min
            delete ranks/bids(x) from ranks/bids;
        End If;
    End Loop;
    Return ranks/bids;
End Procedure;
```

The procedure Filter Ranks takes as input a term $T_i$ and a list of <rank,bid> tuples. It eliminates all tuples whose rank is greater than the worst-rank specified by the advertiser or whose rank is less than the best-rank specified by the advertiser.

Figure 29:
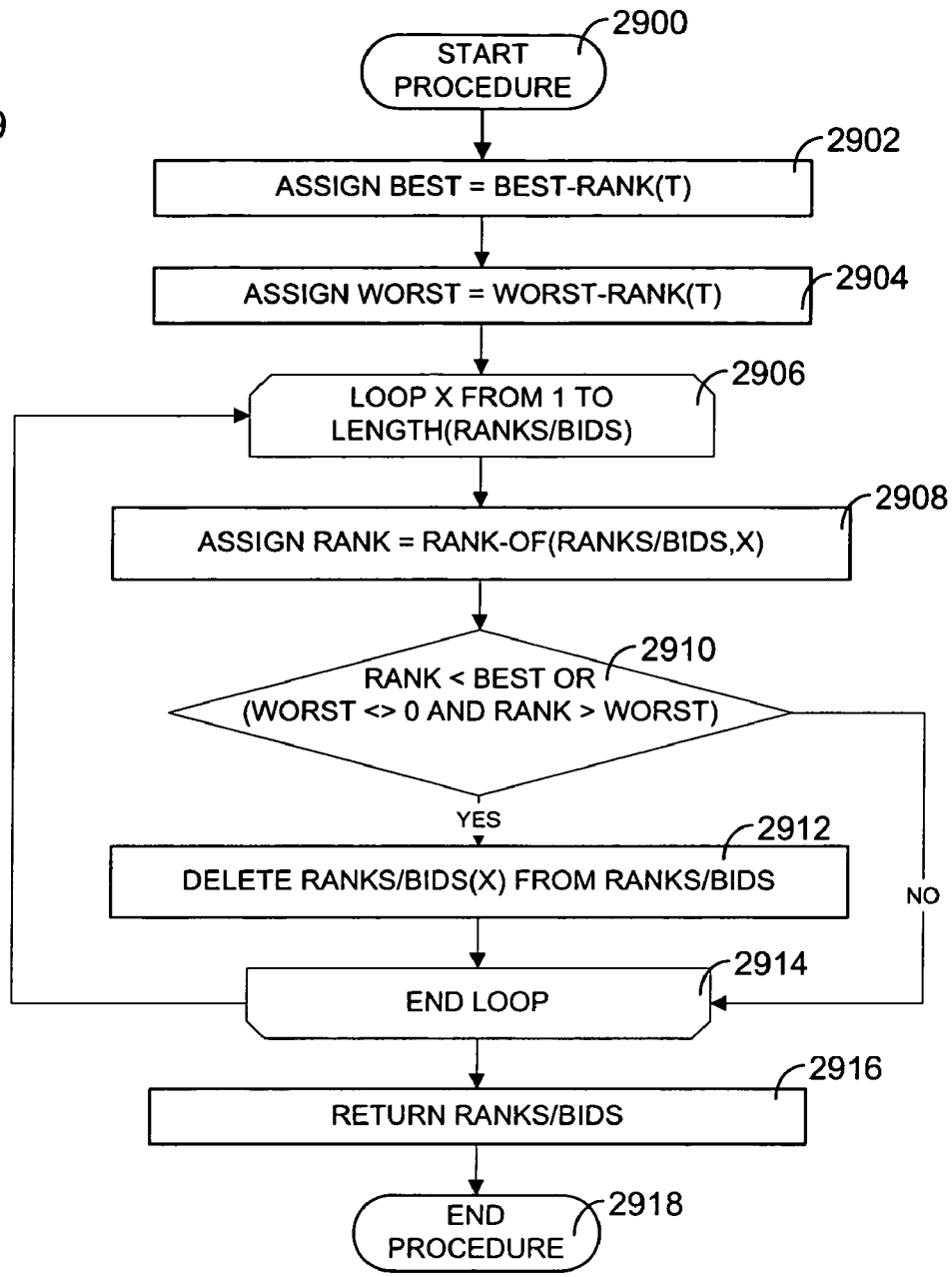

FIG. 29 is a flow diagram illustrating one embodiment of a procedure Filter Ranks. The procedure begins at block 2900. At block 2902, the variable best is assigned the value of the best-rank of any search term of the advertiser. At block 2904, the variable worst is assigned the worst rank of any such term of the advertiser. A looping operation begins at block 2906, looping over the variable x from a value one to a value equal to the length of the array ranks/bids. At block 2908, the variable rank is set equal to the rank of the Xth entry of the array ranks/bids. At block 2910, a test is performed to determine if the variable rank is less than the value of the variable best or if the variable worst is not equal to zero and the variable rank is greater than the value of worst. If so, at block 2912, the Xth entry of the array ranks/bids is deleted from the array ranks/bids. At block 2914, control returns to the start of the loop, block 2906. At block 2916, the procedure returns the value of the array ranks/bids. The procedure ends at block 2918.

A second embodiment of the procedure Filter Ranks is illustrated in accordance with the pseudo code below.

```
Procedure Filter Ranks(T_i,ranks/bids)
    Assign best = best-rank(T_i);
    Assign worst = worst-rank(T_i);
    Loop x from 1 to length(ranks/bids)
        Assign rank = rank-of(ranks/bids,x);
        If rank < best or (worst <> 0 and rank > worst)
            delete ranks/bids(x) from ranks/bids;
        End If;
    End Loop;
    Return ranks/bids;
End Procedure;
```

The procedure Auto Filter takes as input a term $T_i$ and a list of <rank,bid> tuples. It eliminates all tuples whose rank is outside the range of ranks in which the optimal solution is likely to exist. The filtering is controlled by parameters that can be adjusted by the marketplace operator.

There are two types of auto filters. The first filters the ranks based on their bids—ranks whose bid is far from the bids of the previous execution of automatic flight management are discarded. If this is the very first execution of automatic flight management, the system uses the estimate of the average optimal bid $b_o$, which is computed by the procedure Estimate Original Bids. The second filters the ranks that are far from the ranks of the previous execution of automatic flight management. This second filtering step is not performed if this is the first execution of automatic flight management.

Figure 30:
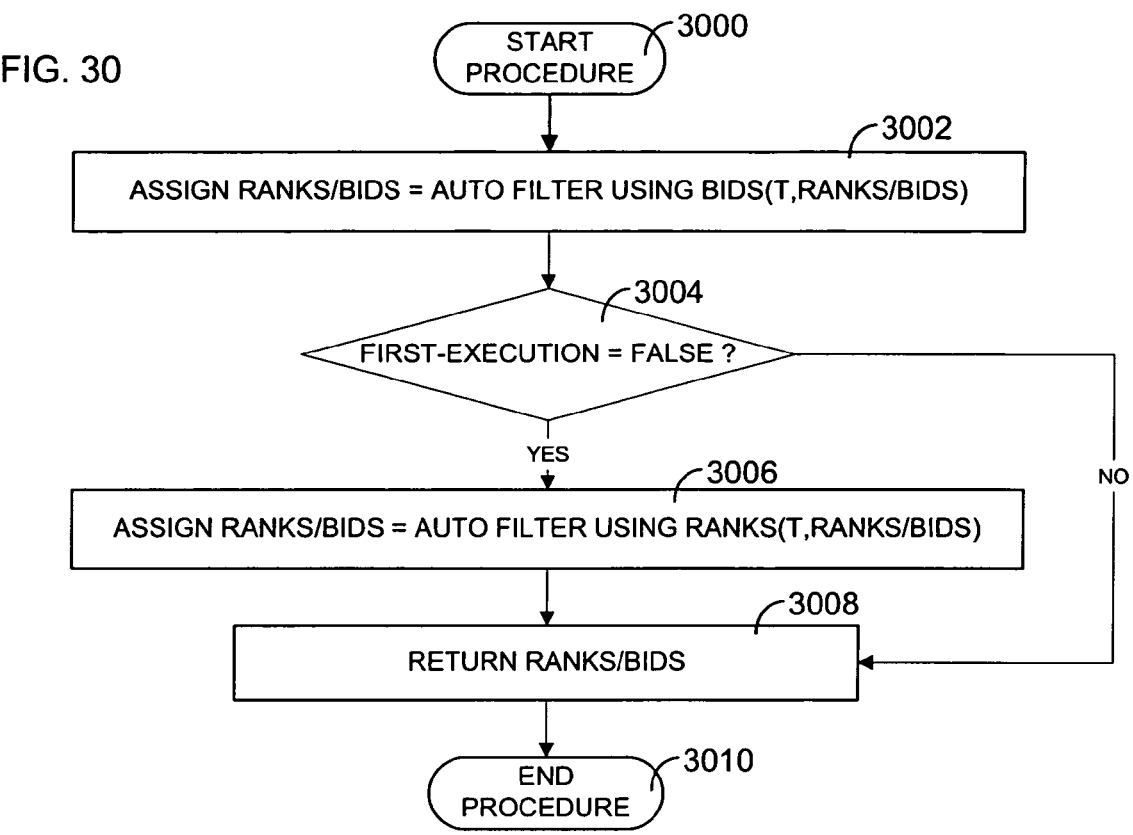

FIG. 30 is a flow diagram illustrating one embodiment of the procedure Auto Filter. The procedure begins at block 3000. At block 3002, the array ranks/bids is set equal to the result returned by the procedure Auto Filter Using Bids. One embodiment of the procedure Auto Filter Using Bids is illustrated below in conjunction with FIG. 31. At block 3004, it is determined if the variable first-execution has the logical value false. If so, at block 3006, the array ranks/bids is set equal to the value returned by the procedure Auto Filter Using Ranks. One embodiment of the procedure Auto Filter Using Ranks is illustrated below in connection with FIG. 32. At block 3008, the procedure returns the value of the array ranks/bids. The procedure ends at block 3010.

A second embodiment of the procedure Auto Filter is shown in conjunction with the pseudo code below.

```
Procedure Auto Filter(T_i,ranks/bids)
    Assign ranks/bids = auto filter using bids(T_i,ranks/bids);
    If first-execution = false
        Assign ranks/bids = auto filter using ranks(T_i,ranks/bids);
    End If;
    Return ranks/bids;
End Procedure;
```

The procedure Auto Filter Using Bids takes as input a term $T_i$ and a list of <rank,bid> tuples. It eliminates all tuples whose bid is not close to the optimal bid of $T_i$ which was computed in the previous execution of automatic flight management. If this is the very first execution of automatic flight management, the system uses the estimate of the average optimal bid $b_o$, which is computed by the procedure Estimate Original Bids.

The procedure loops over the list of <rank,bid> tuples and checks if the bid of the tuple is "close" to the optimal bid computed in the previous execution of automatic flight management. The current tuple is eliminated if its bid is not close. The closeness is controlled by the parameter β, which is between zero and one. If β is zero then the current tuple is eliminated if its bid is not exactly equal to the optimal bid computed for $T_i$ in the previous execution of automatic flight management. If β is one, then the current tuple is eliminated if its bid is more than twice the optimal bid of the previous execution.

Figure 31:
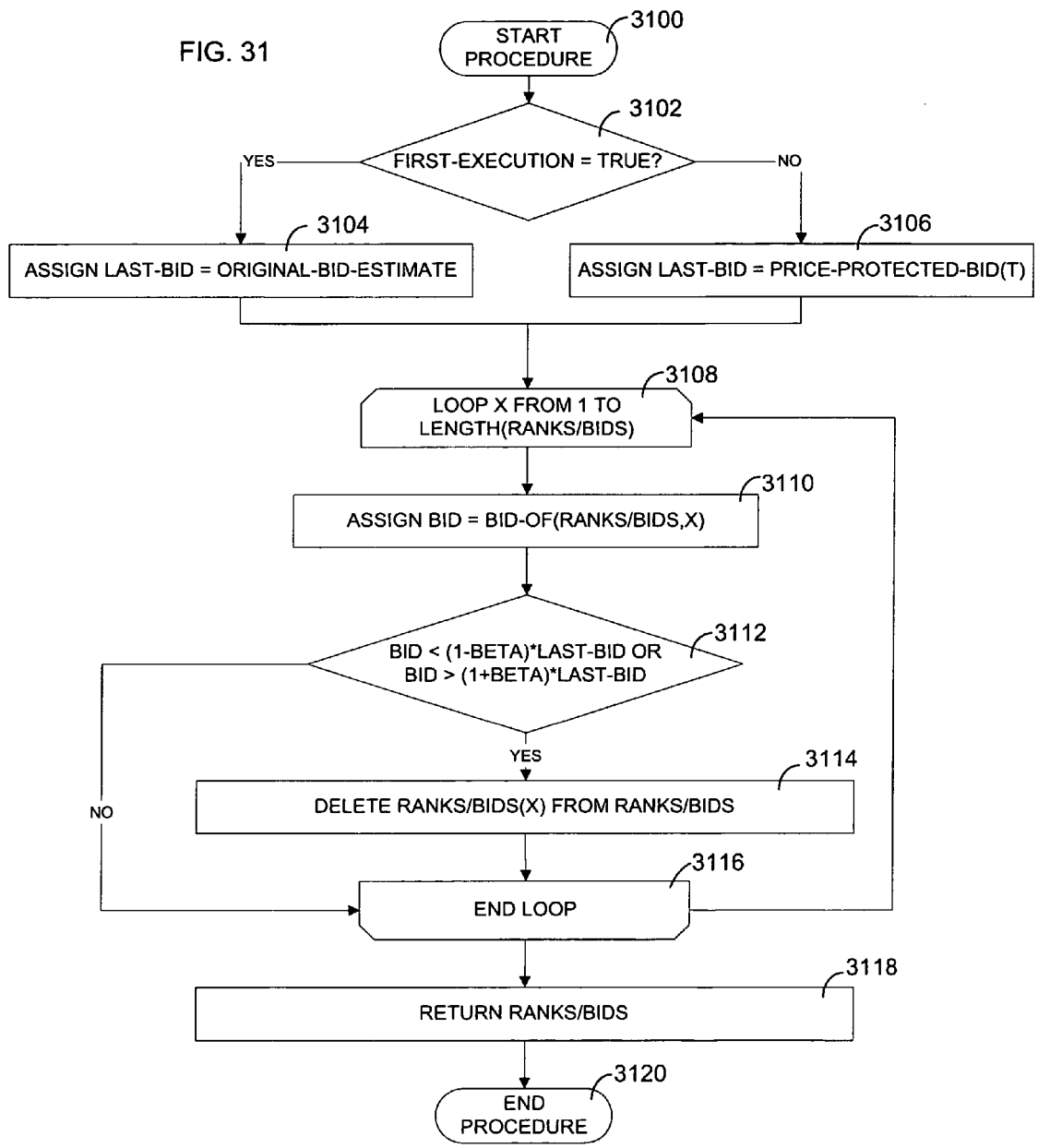

FIG. 31 is a flow diagram illustrating one embodiment of the procedure Auto Filter Using Bids. The procedure begins at block 3100. At block 3102, it is determined if the logical variable first execution has the logical value true. If so, at block 3104, the variable last-bid is set equal to the value of the variable original-bid-estimate. Otherwise, at block 3106, the variable last-bid is set equal to the value of the array price-protected-bid for the current search term.

At block 3108, a loop operation begins, looping over the variable x from a value of one to a value equal to the length of the array ranks/bids. At block 3110, the variable bid is set equal to the bid value of the Xth entry of the array bid-of. At block 3112, it is determined if the value of the bid is less than the product of one minus beta and the variable last-bid or if the value of the variable bid is greater than one plus beta multiplied by the value of the variable last-bid. If so, at block 3114, the Xth entry is deleted from the array bid-of(ranks/bids,X). Otherwise, at block 3116, control returns to the start of the loop block 3108. After processing all values in the loop, at block 3118, the array ranks/bids is returned. The procedure ends at block 3120.

An alternative embodiment of the procedure Auto Filter Using Bids is illustrated below in conjunction with the following pseudo code.

```
Procedure Auto Filter Using Bids(T_i,ranks/bids)
    If fist-execution = true
        Assign last-bid = original-bid-estimate;
    Else
        Assign last-bid = price-protected-bid(T_i);
    End If;
    Loop x from 1 to length(ranks/bids)
        Assign bid = bid-of(ranks/bids,x);
        If bid < (1 − β)* last-bid or bid > (1 + β)* last-bid
            delete ranks/bids(x) from ranks/bids;
        End If;
    End Loop;
    Return ranks/bids;
End Procedure;
```

The procedure Auto Filter Using Ranks takes as input a term $T_i$ and a list of <rank,bid> tuples. It eliminates all tuples whose rank is not close to the optimal rank of $T_i$ which was computed in the previous execution of automatic flight management.

The procedure loops over the list of <rank,bid> tuples and checks if the rank of the tuple is "close" to the optimal rank computed in the previous execution of automatic flight management. The current tuple is eliminated if its rank is at a distance greater than α from the optimal rank computed for $T_i$ in the previous execution of automatic flight management.

Figure 32:
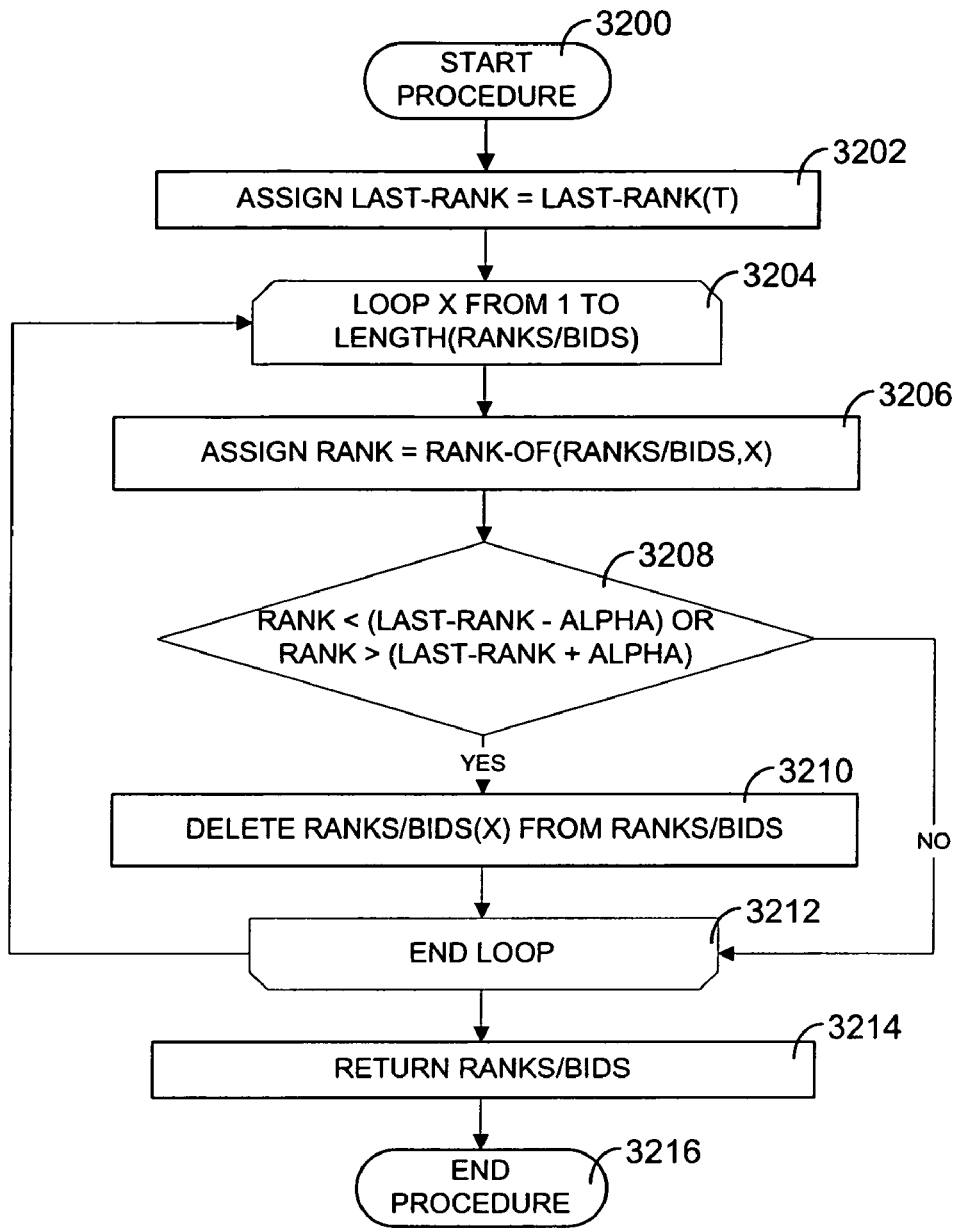

FIG. 32 is a flow diagram illustrating the procedure Auto Filter Using Ranks. The procedure begins at block 3200. At block 3202, the variable last-rank is assigned the value of the entry corresponding to the current search term in the array last/rank. At block 3204, a looping operation begins, looping over the variable x from a value one to a value equal to the length of the array ranks/bids. At block 3206, the variable rank is given the value of the rank of the Xth entry of the array ranks/bids. At block 3208, it is determined if the variable rank has a value less than the variable last-rank minus alpha or if the variable rank has a value greater than the sum of last-rank and alpha. If so, at block 3210, the Xth entry is deleted from the array ranks/bids. Otherwise, at block 3212, control returns to the start of the loop at block 3204. At block 3214, after all entries have been processed in the loop, the procedure returns the value of the array ranks/bids. The procedure ends at block 3216.

An alternative embodiment of the procedure Auto Filter Using Ranks is shown below in connection with the following pseudo code.

```
Procedure Auto Filter Using Ranks(T_i,ranks/bids)
    Assign last-rank = last-rank(T_i);
    Loop x from 1 to length(ranks/bids)
        Assign rank = rank-of(ranks/bids,x);
        If rank < (last-rank − α) or rank > (last-rank + α)
            delete ranks/bids(x) from ranks/bids;
        End If;
    End Loop;
    Return ranks/bids;
End Procedure;
```

From the foregoing, it can be seen that the present embodiments provide a method and apparatus providing an automated flight management system for advertisers with an on-line marketplace system. The system receives as input parameters an advertising budget, duration of the advertising flight, applicable search terms of the advertiser, a maximum average cost per action, conversion rates and the advertiser's average profit per action for each term. The system automatically sets the cost per click or other action for every listing in order to maximize the advertiser's profit and fully spend the budget over the duration of the flight. Periodically, the system automatically recomputes the cost per action of listings. This system thus enhances the convenience and efficiency experienced by the advertiser with the marketplace system.

While a particular embodiment of the present invention has been shown and described, modifications may be made. For example, the system may be applied to any on-line marketplace system using payment schemes other than cost per click, such as cost per impression, where economic value is given by an advertiser when the advertiser's search listing is displayed to a user, or pay for inclusion, where economic value is given by the advertiser just to be included in the search database. It is therefore intended in the appended claims to cover such changes and modifications, which follow in the true spirit and scope of the invention.

The invention claimed is:

1. A method for automating management in an online marketplace among a plurality of advertisers and searchers, the method comprising:

maintaining a computer network-accessible database of advertiser search listings, each search listing including at least a bid amount and a search term associated therewith, the bid amount corresponding to economic value given by the associated advertiser to an operator of the online marketplace when network locations of the associated advertiser are referred to a searcher in response to a database query from the searcher;

initializing an automated advertising flight of an advertiser that owns a plurality of search listings by determining a remaining budget and a remaining flight period; and iteratively and periodically performed by a computer, for each search term ($T_i$) and rank (j), the following to execute the advertising flight while a time period runs or until an occurrence of a specified event automatically updating a plurality of flight parameters based on a current state of the marketplace and any updates from the advertiser, wherein the flight parameters are selected from the group consisting of a conversion rate, the bid amount and a corresponding rank, a maximum average cost per click (CPC), and a historical number of clicks for each search term;

maximizing a total profit by iteratively and automatically adjusting the bid amounts associated with at least some of the plurality of search terms until an optimal combination of bid amounts and corresponding plurality of search terms is determined, wherein each iteration calculates an estimated total number of clicks, the bid amounts, a total cost, and a total profit for the advertising flight for comparison with previous iterations;

computing $R_{max}$, a highest conversion rate of conversion rates $R(T_i, j)$, of each search term $T_i$ in a set $\{T_1, T_2, \ldots, T_k\}$ at any rank j;

normalizing the number of clicks and the bid amount of each search term at every rank so that all search terms at all ranks have the same conversion rate $R_{max}$;

assigning a conversion rate $(T_i, j) = R_{max}$ at every rank j;

setting a number of variable clicks for the current search term and rank equal to the ratio of the conversion rate for the current term and rank to $R_{max}$ multiplied by the total number of clicks for the current search term, rank, and the current remaining length of the flight;

setting the current bid for the search term T at rank j as equal to the ratio of $R_{max}$ to the current conversion rate for the search term T at rank j multiplied by the current bid for the search term T at the current rank j;

re-computing the remaining budget based on a budget amount spent during a current iteration; and re-computing the remaining flight period based on a flight period expired during the current iteration.

2. The method of claim 1, further comprising:

determining the estimated total number of clicks, the bid amounts, a total cost, and a total profit as the optimal combination such that the bid amounts are minimized, yet simultaneously achieve a plurality of corresponding best possible ranks to maximize profit within the remaining budget.

3. The method of claim 1, further comprising:

sending a report to the advertiser that includes a summary of bid amount changes made automatically on behalf of the advertiser.

4. The method of claim 1, wherein the time period is the remaining flight period.

5. The method of claim 1, further comprising:

ignoring a current combination within an iteration of automatically adjusting the bid amounts if its average bid is greater than the maximum average CPC specified by the advertiser.

6. The method of claim 1, further comprising:

ignoring a current combination within an iteration of automatically adjusting the bid amounts if the total cost is greater than the remaining budget.

7. The method of claim 1, wherein the optimal combination of the plurality of search terms and a plurality of possible ranks is determined by comparing the average bid, which is the total cost divided by the total number of clicks, with the total profit.

8. The method of claim 1, further comprising:

searching for a lowest average bid while iteratively adjusting the bid amounts, wherein the average bid is defined as the total cost divided by the total number of estimated clicks; and returning a current combination as the optimal combination if the average bid of the current combination of search terms and corresponding bid amounts is less than that of any previous combination.

9. The method of claim 1, further comprising:

removing a plurality of ranks associated with at least some of the plurality of search terms that are likely to not be a part of the optimal combination, to optimize the iterations required within the advertising flight.

10. The method of claim 9, further comprising:

estimating an original bid amount that is the same for each of the plurality of search terms such that the remaining budget is approximately spent during the remainder of the flight period wherein "approximately spent" is defined by the remaining budget being spent within a predetermined amount of economic value above or below a budget specified by the advertiser; and selecting a band of ranks for each of the plurality of search terms that corresponds to the original bid, wherein ranks outside of each band are removed.

* * * * *

UNITED STATES PATENT AND TRADEMARK OFFICE
CERTIFICATE OF CORRECTION

| | |
|---|---|
| PATENT NO. | : 7,499,874 B2 |
| APPLICATION NO. | : 11/318243 |
| DATED | : March 3, 2009 |
| INVENTOR(S) | : Narinder Pal Singh et al. |

It is certified that error appears in the above-identified patent and that said Letters Patent is hereby corrected as shown below:

In the Claims

In column 54, claim 1, line 37, after "iteratively and periodically" replace "performed" with --performing--.

Signed and Sealed this
Thirtieth Day of October, 2012

David J. Kappos
*Director of the United States Patent and Trademark Office*